United States Patent
Forenza et al.

(10) Patent No.: US 8,160,121 B2
(45) Date of Patent: *Apr. 17, 2012

(54) SYSTEM AND METHOD FOR DISTRIBUTED INPUT-DISTRIBUTED OUTPUT WIRELESS COMMUNICATIONS

(75) Inventors: Antonio Forenza, Austin, TX (US); Robert W. Heath, Jr., Austin, TX (US); Stephen G. Perlman, Palo Alto, CA (US)

(73) Assignee: Rearden, LLC, San Francisco, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/143,503

(22) Filed: Jun. 20, 2008

(65) Prior Publication Data
US 2009/0067402 A1    Mar. 12, 2009

Related U.S. Application Data

(63) Continuation-in-part of application No. 11/894,394, filed on Aug. 20, 2007, now Pat. No. 7,599,420.

(51) Int. Cl.
*H04L 27/30* (2006.01)
(52) U.S. Cl. ........ 375/141; 375/220; 375/267; 375/285; 375/299; 370/278; 370/282; 370/465; 455/501; 455/67.13; 455/103; 455/114.3; 455/126
(58) Field of Classification Search .................. 375/140, 375/141, 146, 219, 220, 222, 261, 267, 285, 375/296, 298, 299; 455/501, 67.13, 69, 561, 455/103, 114.2, 114.3, 126; 370/278, 282, 370/286, 464, 465
See application file for complete search history.

(56) References Cited

U.S. PATENT DOCUMENTS
4,253,193 A    2/1981 Kennard et al.
(Continued)

FOREIGN PATENT DOCUMENTS
EP    1 359 683    11/2003
(Continued)

OTHER PUBLICATIONS
"AIRGO, Home page", *AIRGO, Home page*, 1 page, printed Apr. 9, 2004, http://www.airgonetworks.com/, 1.
(Continued)

*Primary Examiner* — Dac V Ha
(74) *Attorney, Agent, or Firm* — Blakely Sokoloff Taylor & Zafman LLP

(57) ABSTRACT

A system and method are described for dynamically adapting the communication characteristics of a multiple antenna system (MAS) with multi-user (MU) transmissions ("MU-MAS"). For example, a method according to one embodiment of the invention comprises: transmitting a training signal from each antenna of a base station to each of a plurality of wireless client devices, each of the client devices analyzing each training signal to generate channel characterization data, and receiving the channel characterization data at the base station; computing a plurality of MU-MAS precoder weights based on the channel characterization data, the combined MU-MAS precoder weights comprising a MU-MAS channel matrix; determining instantaneous or statistical channel quality ("link quality metric") for the wireless client devices using mutual information of MU-MAS links or singular values of the MU-MAS composite channel matrix; determining a subset of users and a MU-MAS transmission mode based on the link quality metric; precoding data using the MU-MAS precoder weights to generate precoded data signals for each antenna of the base station; and transmitting the precoded data signals through each antenna of the base station to each respective client device within the selected subset.

15 Claims, 52 Drawing Sheets

U.S. PATENT DOCUMENTS

| | | | |
|---|---|---|---|
| 4,564,935 A | 1/1986 | Kaplan | |
| 5,472,467 A | 12/1995 | Pfeffer et al. | |
| 5,838,671 A | 11/1998 | Ishikawa et al. | |
| 5,872,814 A | 2/1999 | McMeekin et al. | |
| 6,252,912 B1 | 6/2001 | Salinger | |
| 6,400,761 B1 | 6/2002 | Smee et al. | |
| 6,442,151 B1 | 8/2002 | H'mimy et al. | |
| 6,473,467 B1 | 10/2002 | Wallace et al. | |
| 6,760,388 B2 | 7/2004 | Ketchum et al. | |
| 6,771,706 B2 | 8/2004 | Ling et al. | |
| 6,785,341 B2 | 8/2004 | Walton et al. | |
| 6,791,508 B2 | 9/2004 | Berry et al. | |
| 6,801,580 B2 | 10/2004 | Kadous | |
| 6,862,271 B2 | 3/2005 | Medvedev et al. | |
| 7,006,043 B1 | 2/2006 | Nalbandian | |
| 7,013,144 B2 | 3/2006 | Yamashita et al. | |
| 7,072,413 B2 | 7/2006 | Walton et al. | |
| 7,072,693 B2 | 7/2006 | Farlow et al. | |
| 7,116,723 B2 | 10/2006 | Kim et al. | |
| 7,154,936 B2 | 12/2006 | Bjerke et al. | |
| 7,154,960 B2 | 12/2006 | Liu et al. | |
| 7,167,684 B2 | 1/2007 | Kadous et al. | |
| 7,197,082 B2 | 3/2007 | Alexiou et al. | |
| 7,197,084 B2 | 3/2007 | Ketchum | |
| 7,248,879 B1 | 7/2007 | Walton et al. | |
| 7,272,294 B2 | 9/2007 | Zhou et al. | |
| 7,310,680 B1 | 12/2007 | Graham et al. | |
| 7,412,212 B2 | 8/2008 | Hottinen | |
| 7,418,053 B2 | 8/2008 | Perlman et al. | |
| 7,437,177 B2 | 10/2008 | Ozluturk et al. | |
| 7,486,931 B2 | 2/2009 | Cho et al. | |
| 7,548,752 B2 | 6/2009 | Sampath et al. | |
| 7,630,337 B2 * | 12/2009 | Zheng et al. | 370/329 |
| 7,636,381 B2 * | 12/2009 | Forenza et al. | 375/141 |
| 7,729,443 B2 | 6/2010 | Fukuoka et al. | |
| 7,751,843 B2 | 7/2010 | Butala | |
| 2003/0043929 A1 | 3/2003 | Sampath | |
| 2003/0048753 A1 | 3/2003 | Jalali | |
| 2003/0125040 A1 | 7/2003 | Walton et al. | |
| 2003/0156056 A1 | 8/2003 | Perry | |
| 2004/0136349 A1 | 7/2004 | Walton et al. | |
| 2004/0179627 A1 | 9/2004 | Ketchum et al. | |
| 2004/0185909 A1 | 9/2004 | Alexiou et al. | |
| 2004/0190636 A1 | 9/2004 | Oprea | |
| 2004/0252632 A1 | 12/2004 | Bourdoux et al. | |
| 2005/0003865 A1 | 1/2005 | Lastinger et al. | |
| 2005/0020237 A1 | 1/2005 | Alexiou | |
| 2005/0041750 A1 | 2/2005 | Lau | |
| 2005/0041751 A1 | 2/2005 | Nir et al. | |
| 2005/0043031 A1 | 2/2005 | Cho et al. | |
| 2005/0047515 A1 | 3/2005 | Walton et al. | |
| 2005/0058217 A1 | 3/2005 | Sandhu | |
| 2005/0101259 A1 | 5/2005 | Tong et al. | |
| 2005/0111599 A1 | 5/2005 | Walton et al. | |
| 2005/0169396 A1 | 8/2005 | Baier et al. | |
| 2006/0050804 A1 | 3/2006 | Leclair | |
| 2007/0082674 A1 | 4/2007 | Pedersen et al. | |
| 2008/0080631 A1 | 4/2008 | Forenza et al. | |
| 2008/0125051 A1 * | 5/2008 | Kim et al. | 455/67.13 |
| 2008/0181285 A1 | 7/2008 | Hwang et al. | |
| 2008/0214185 A1 | 9/2008 | Cho et al. | |
| 2008/0227422 A1 | 9/2008 | Hwang et al. | |
| 2008/0233902 A1 * | 9/2008 | Pan et al. | 455/114.3 |
| 2009/0227249 A1 | 9/2009 | Ylitalo | |
| 2009/0316807 A1 * | 12/2009 | Kim et al. | 375/260 |
| 2010/0098030 A1 | 4/2010 | Wang et al. | |
| 2010/0195527 A1 | 8/2010 | Gorokhov et al. | |

FOREIGN PATENT DOCUMENTS

| | | |
|---|---|---|
| WO | WO 02099995 A2 | 12/2002 |
| WO | WO-03094460 | 11/2003 |
| WO | WO-03107582 | 12/2003 |

OTHER PUBLICATIONS

"Electromagnetic-Wave Propagation", *HW Sams Publishers, Reference Data for Radio Engineers, "Electromagnetic-Wave Propagation"*, 5th Edition, 1973, Chapter 26., (1973), 1-32.

"High Frequency Active Auroroal Research Program", *HAARP, Home page, "High Frequency Active Auroroal Research Program"*, 1 page printed Apr. 9, 2004, http://www.haarp.alaska.edu/, 1.

"IntelliCell: A Fully Adaptive Approach to Smart Antennas", ArrayComm, (2002), 1-18.

"MIMO System Uses SDMA for IEEE802.11n", http://www.electronicstalk.com/news/ime/ime149.html, (Jul. 14, 2004), 1-3.

"Vivato, Home page", *VIVATO, Home page*, 1 page, printed Apr. 9, 2004, http://www.vivato.net/, 1.

Dohler, M., et al., "A Step Towards MIMO: Virtual antenna Arrays", Dohler, M., et al. "A Step Towards MIMO: Virtual antenna Arrays", pages 9, *European Cooperation in the field of Scientific and Technical Research*, Jan. 15-17, 2003., (Jan. 2003), 9.

Fella, Adlane, "Adaptive WiMAX Antennas: The promise of higher ROI", http://www.wimax.com/commentary/spotlight/spotlight08-08-2005/?searchterm=Adlane Fella, (Aug. 8, 2005), 1-3.

Gesbert, David, et al., "From Theory to Practice: An Overview of MIMO Space-Time Coded Wireless Systems", *IEEE Journal on Selected Areas in Communications*, vol. 21, No. 3, (Apr. 2003), 281-302.

Gesbert, D., et al., "Outdoor MIMO Wireless Channels: Models and Perfomance Prediction", Gesbert, D., et al., "From Theory to Practice: An Overview of MIMO Space-Time Coded Wireless Systems", pp. 1926-1934, *IEEE Transactions on Commucnations*, vol. 50, No. 12, Dec. 2002., 1926-1934.

Spencer, Quentin H., et al., "Adaptive Antennas and MIMO Systems for Wireless Communications", IEEE Communications Magazine, (Oct. 2004), 62-67.

Office Action from U.S. Appl. No. 10/817,731 mailed Jan. 21, 2009, 23 pgs.

Office Action from U.S. Appl. No. 11/894,394 mailed Oct. 28, 2008, 13 pgs.

Office Action from U.S. Appl. No. 11/894,540 mailed Oct. 29, 2008, 13 pgs.

Office Action from U.S. Appl. No. 11/894,362 mailed Oct. 29, 2008, 17 pgs.

Office Action from U.S. Appl. No. 11/256,478 mailed Sep. 19, 2008, 14 pgs.

Office Action from Foreign Counterpart China Patent Application No. 200510088676.1 mailed Mar. 20, 2009, 24 pgs. (Translation included).

Benedetto, M.D., et al., "Analysis of the effect of the I/Q baseband filter mismatch in an OFDM modem", Wireless personal communications, (2000), 175-186.

Besson, O., et al., "On parameter estimation of MIMO flat-fading channels with frequency offsets", Signal Processing, IEEE Transactions on [see also Acoustics, Speech, and Signal Processing, IEEE Transactions on], vol. 51, No. 3, (Mar. 2003), 602-613.

Catreux, Severine, et al., "Adaptive modulation and MIMO coding for broadband wireless data networks", IEEE Comm. Mag., vol. 2, (Jun. 2002), 108-115.

Chen, Runhua, et al., "Transmit selection diversity for unitary precoded multiuser spatial multiplexing systems with linear receivers", accepted to IEEE Trans. on Signal Processing, (Aug. 2005), 1-30.

Choi, L.U., et al., "A transmit preprocessing technique for multiuser MIMO systems using a decomposition approach", IEEE Trans. Wireless Comm., vol. 3, (Jan. 2004), 20-24.

Choi, Wan, et al., "Opportunistic space division multiple access with beam selection", to appear in IEEE Trans. on Communications, (May 19, 2006), 1-23.

Chu, D., et al., "Polyphase codes with good periodic correlation properties (corresp.)", IEEE Trans. Inform. Theory, vol. 18, No. 4, (Jul. 1972), 531-532.

Coulson, J., et al., "Maximum likelihood synchronization for OFDM using a pilot symbol: analysis", IEEE J. Select. Areas Commun., vol. 19, No. 12, (Dec. 2001), 2495-2503.

Dai, X., et al., "Carrier frequency offset estimation for OFDM/SDMA systems using consecutive pilots", IEEE Proceedings- Communications, vol. 152, (Oct. 2005), 624-632.

Dietrich, Carl B., et al., "Spatial, polarization, and pattern diversity for wireless handheld terminals", Proc. IEEE Antennas and Prop. Symp., vol. 49, (Sep. 2001), 1271-1281.

Dong, Liang, et al., "Multiple-input multiple-output wireless communication systems using antenna pattern diversity", Proc. IEEE Glob. Telecom. Conf., vol. 1, (Nov. 2002), 997-1001.

Fakhereddin, M.J., et al., "Combined effect of polarization diversity and mutual coupling on MIMO capacity", Proc. IEEE Antennas and Prop. Symp., vol. 2, (Jun. 2003), 495-498.

Fletcher, P.N., et al., "Mutual coupling in multi-element array antennas and its influence on MIMO channel capacity", IEEE Electronics Letters, vol. 39, (Feb. 2003), 342-344.

Forenza, Antonio, et al., "Adaptive MIMO transmission for exploiting the capacity of spatially correlated channels", IEEE Trans. on Veh. Tech., vol. 56, n. 2, (Mar. 2007), 619-630.

Forenza, Antonio, et al., "Benefit of Pattern Diversity Via 2-element Array of Circular Patch Antennas in Indoor Clustered MIMO Channels'", IEEE Trans. on Communications, vol. 54, No. 5, (May 2006), 943-954.

Forenza, Antonio, et al., "Impact of antenna geometry on MIMO communication in indoor clustered channels", Proc. IEEE Antennas and Prop. Symp., vol. 2, (Jun. 2004), 1700-1703.

Forenza, Antonio, et al., "Switching Between OSTBC and Spatial Multiplexing with Linear Receivers in Spatially Correlated MIMO Channels", IEEE, (2006), 1-5.

Foschini, G.J., et al., "Simplified processing for high spectral efficiency wireless communication employing multi-element arrays", IEEE Jour. Select. Areas in Comm., vol. 17, No. 11, (Nov. 1999), 1841-1852.

Fusco, T., et al., "Blind Frequency-offset Estimation for OFDM/OQAM Systems", IEEE Transactions on [see also Acoustics, Speech, and Signal Processing, IEEE Transactions on] vol. 55, (2007), 1828-1838.

Ghogho, M., et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), 3957-3965.

Haring, L., "Residual carrier and sampling frequency synchronization in multiuser OFDM systems", VTC-Spring. IEEE 63rd Vehicular Technology Conference, vol. 4, (2006), 1937-1941.

Heath, Robert W., et al., "Antenna selection for spatial multiplexing systems with linear receivers", IEEE Trans. Comm., vol. 5, (Apr. 2001), 142-144.

Heath, Robert W., et al., "Switching between diversity and multiplexing in MIMO systems", IEEE Trans. Comm., vol. 53, No. 6, (Jun. 2005), 962-968.

Jungnickel, V., et al., "Capacity of MIMO systems with closely spaced antennas", IEEE Comm. Lett., vol. 7, (Aug. 2003), 361-363.

Kannan, T.P., et al., "Separation of cochannel signals under imperfect timing and carrier synchronization", IEEE Trans. Veh. Technol., vol. 50, No. 1, (Jan. 2001), 79-96.

Lang, S., et al., "Design and development of a 5.25 GHz software defined wireless OFDM communication platform", IEEE Communications Magazine, vol. 42, No. 6, (Jun. 2004), 6-12.

Lee, K., et al., "Frequency-offset estimation for MIMO and OFDM systems using orthogonal training sequences", IEEE Trans. Veh. Technol., vol. 56, No. 1, (Jan. 2007), 146-156.

Luise, M., et al., "Carrier frequency acquisition and tracking for OFDM systems", IEEE Trans. Commun., vol. 44, No. 11, (Nov. 1996), 1590-1598.

Luise, M., et al., "Low-complexity blind carrier frequency recovery for OFDM signals over frequency-selective radio channels", IEEE Trans. Commun., vol. 50, No. 7, (Jul. 2002), 1182-1188.

Mattheijssen, Paul, "Antenna-pattern diversity versus space diversity for use at handhelds", IEEE Trans. on Veh. Technol., vol. 53, (Jul. 2004), 1035-1042.

McKay, Matthew R., et al., "A throughput-based adaptive MIMO—BICM approach for spatially correlated channels", to appear in Proc. IEEE ICC, (Jun. 2006), 1-5.

McKay, Matthew R., et al., "Multiplexing/beamforming switching for coded MIMO in spatially correlated Rayleigh channels", IEEE Transactions on Vehicular Technology, vol. 56, No. 5, (Sep. 2007).

McLean, James S., et al., "A re-examination of the fundamental limits on the radiation Q of electrically small antennas", IEEE Trans. Antennas Propagat., vol. 44, n. 5, (May 1996), 672-676.

Minn, et al., "A robust timing and frequency synchronization for OFDM systems", IEEE Trans. Wireless Commun., vol. 2, No. 4, (Jul. 2003), 822-839.

Moose, Paul H., et al., "A technique for orthogonal frequency division multiplexing frequency offset correction", IEEE Trans. Commun., vol. 42, No. 10, (Oct. 1994), 2908-2914.

Morelli, M., et al., "An improved frequency offset estimator for OFDM applications", IEEE Commun. Lett., vol. 3, No. 3, (Mar. 1999), 75-77.

Morelli, M., et al., "Frequency ambiguity resolution in OFDM systems", IEEE Commun. Lett., vol. 4, No. 4, (Apr. 2000), 134-136.

Morris, Matthew L., et al., "Network model for MIMO systems with coupled antennas and noisy amplifiers", IEEE Trans. Antennas Propagat., vol. 53, (Jan. 2005), 545-552.

Oberli, C., et al., "Maximum likelihood tracking algorithms for MIMOOFDM," in Communications, IEEE International Conference on, vol. 4, Jun. 20-24, 2004, 2468-2472.

Pohl, V., et al., "Antenna spacing in MIMO indoor channels", Proc. IEEE Veh. Technol. Conf., vol. 2, (May 2002), 749-753.

Rao, R., et al., "I/Q mismatch cancellation for MIMO-OFDM systems", in Personal, Indoor and Mobile Radio Communications, PIMRC 2004. 15th IEEE International Symposium on, vol. 4, (2004), 2710-2714.

Rao, R.M., et al., "Multi-antenna testbeds for research and education in wireless communications", IEEE Communications Magazine, vol. 42, No. 12, (Dec. 2004), 72-81.

Schmidl, T.M., et al., "Robust frequency and timing synchronization for OFDM", IEEE Trans. Commun., vol. 45, No. 12, (Dec. 1997), 1613-1621.

Schuchert, S., et al., "A novel I/Q imbalance compensation scheme for the reception of OFDM signals", IEEE Transaction on Consumer Electronics, (Aug. 2001).

Serpedin, E, et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, (Aug. 2000), 2389-2405.

Sharif, M., et al., "On the capacity of MIMO broadcast channel with partial side information", IEEE Trans. Info. Th., vol. 51, (Feb. 2005), 506-522.

Shen, Zukang, et al., "Low complexity user selection algorithms for multiuser MIMO systems with block diagonalization", accepted for publication in IEEE Trans. Sig. Proc., (Sep. 2005), 1-12.

Shen, Aukang, et al., "Sum capacity of multiuser MIMO broadcast channels with block diagonalization", submitted to IEEE Trans. Wireless Comm., (Oct. 2005), 1-12.

Shi, K., et al., "Coarse frame and carrier synchronization of OFDM systems: a new metric and comparison", IEEE Trans. Wireless Commun., vol. 3, No. 4, (Jul. 2004), 1271-1284.

Shiu, Da-Shan, et al., "Fading correlation and its effect on the capacity of multielement antenna systems", IEEE Trans. Comm., vol. 48, No. 3, (Mar. 2000), 502-513.

Spencer, Quentin H., et al., "Zero-forcing methods for downlink spatial multiplexing in multiuser MIMO channels", IEEE Trans. Sig. Proc., vol. 52, (Feb. 2004), 461-471.

Stoytchev, M., et al., "Compact antenna arrays for MIMO applications", Proc. IEEE Antennas and Prop. Symp., vol. 3, (Jul. 2001), 708-711.

Tang, T., et al., "Joint frequency offset estimation and interference cancellation for MIMO-OFDM systems [mobile radio]", VTC2004-Fall. 2004 IEEE 60th Vehicular Technology Conference, vol. 3, Sep. 26-29, 2004, 1553-1557.

Tarighat, Alireza, et al., "Compensation schemes and performance analysis of IQ imbalances in OFDM receivers", Signal Processing, IEEE Transactions on [see also Acoustics, Speech, and Signal Processing, IEEE Transactions on], vol. 53, (Aug. 2005), 3257-3268.

Tarighat, et al., "MIMO OFDM receivers for systems with IQ imbalances", IEEE Trans. Sig. Proc., vol. 53, for orthogonal space-time block codes (OSTBC), (Sep. 2005), 3583-3596.

Tarokh, Vahid, et al., "Space-time block codes from orthogonal designs", IEEE Trans. Info. Th., vol. 45, (Jul. 1999), 1456-467.

Tureli, U., et al., "OFDM blind carrier offset estimation: ESPRIT", IEEE Trans. Commun., vol. 48, No. 9, (Sep. 2000), 1459-1461.

Valkama, M., et al., "Advanced methods for I/Q imbalance compensation in communication receivers", IEEE Trans. Sig. Proc., (Oct. 2001).
Van De Beek, Jan-Jaap, et al., "ML estimation of time and frequency offset in OFDM systems", Signal Processing, IEEE Transactions on [see also Acoustics, Speech, and Signal Processing, IEEE Transactions on] vol. 45, No. 7, (Jul. 1997), 1800-1805.
Vaughn, Rodney, et al., "Switched parasitic elements for antenna diversity", IEEE Trans. Antennas Propagat., vol. 47, (Feb. 1999), 399-405.
Waldschmidt, Christian, et al., "Complete RF system model for analysis of compact MIMO arrays," IEEE Trans. on Vehicular Technologies, vol. 53, (May 2004), 579-586.
Wallace, Jon W., et al., "Termination-dependent diversity performance of coupled antennas: Network theory analysis," IEEE Trans. Antennas Propagat., vol. 52, (Jan. 2004), 98-105.
Wheeler, Harold A., et al., "Small antennas", IEEE Trans. Antennas Propagat., vol. AP-23, n. 4, (Jul. 1975), 462-469.
Wong, Kai-Kit, et al., "A joint channel diagonalization for multiuser MIMO antenna systems", IEEE Trans. Wireless Comm., vol. 2, (Jul. 2003), 773-786.
Zheng, Lizhong, et al., "Diversity and multiplexing: a fundamental tradeoff in multiple antenna channels", IEEE Trans. Info. Th., vol. 49, No. 5, (May 2003), 1073-1096.
Zhuang, X., et al., "Channel models for link and system level simulations", IEEE 802.16 Broadband Wireless Access Working Group, (Sep. 2004).
Office Action from U.S. Appl. No. 10/817,731 mailed Sep. 11, 2009, 36 pgs.
Notice of Allowance from U.S. Appl. No. 11/894,362 mailed Sep. 3, 2009, 6 pgs.
Notice of Allowance from U.S. Appl. No. 11/894,540 mailed Sep. 14, 2009, 6 pgs.
Notice of Allowance from U.S. Appl. No. 11/256,478 mailed Jan. 26, 2010, 6 pgs.
Office Action from foreign counterpart Australian Patent Application Serial No. 2004203336 mailed Jun. 5, 2009, 2 pages.
Office Action from Foreign Counterpart China Patent Application No. 200510088676.1 mailed Feb. 5, 2010, 18 pgs. (Translation included).
Office Action from U.S. Appl. No. 10/817,731 mailed Mar. 15, 2010, 26 pages.
Warrington, E.M, et al. "Measurement and Modeling of HF Channel Directional Spread Characteristics For Northerly Paths", Radio Science, vol. 41, RS2006, DOI:10.1029/2005RS003294, 2006, pp. 1-13.
Foreign counterpart Office Action from China Patent Application No. 20051008867.1 mailed Oct. 26, 2010, 4 pages.
EP Notification of Transmittal of the European Search Report, Application No. 10156954.9-2411, mailed Sep. 2, 2010, 5 pages.
Office Action from foreign counterpart China Patent Application No. 200510088676 mailed Jan. 25, 2011, 8 pages.
3GPP TR 25.876 V7.0.0 (Mar. 2007), Technical Report, 3rd Generation Partnership Project; Technical Specification Group Radio Access Network; Multiple Input Multiple Output in UTRA; (Release 7), pp. 2-76.
3GPP TS 36.211 V8.7.0 (May 2009), Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, ETSI 136 212 V9.1.0 (2010-, Technical Specification, LTE; Evolved Universal Terrestrial Radio Access (E-UTRA); Multiplexing and Channel Coding (3GPP TS 36.212 Verion 9.1.0 Release 9) p. 63.
3GPP, TS 36.212.V8.7.0 (May 2009), Technical Specification, 3rd Generation Partnership Project; Technical Specification Group Radio Access Network; Evolved Universal Terrestrial Radio Access (E-UTRA); "Multiplexing and channel Coding" (Release 8), p. 60.
Abbasi, N, et al., "Capacity estimation of HF-MIMO systems", International Conference on Ionospheric Systems and Techniques, Apr. 2009, p. 5.
Arraycomm, Improving Wireless Economics Through MAS Software, printed on Mar. 8, 2011, pp. 1-3, http://www.arraycomm.com/serve.php?page+proof.

Bengtsson, M, "A Pragmatic Approach to Multi-User Spatial Multiplexing", IEEE 2002, pp. 130-134.
Caire, et al., "On Achivalbe Rates in a Multi-Antenna Broadcast Downlink", IEEE Trans. Info. Th., vol. 49, pp. 1691-1706, Jul. 2003.
Costa, "Writing on Dirty Paper", IEEE Transactions on Information Theory, vol. IT-29, No. 3, May 1983, pp. 439-441.
Daniel, J, "Introduction to public safety: RF Signal Distribution Using Fiber Optics", 2009, pp. 13, http://www.rfsolutions.com/fiber.pdf.
Devasirvatham, et al., "Time Delay Spread Measurements At 850 MHz and 1 7 GHz Inside A Metropolitan Office Building", Electronics Letters, Feb. 2, 1989, vol. 25, No. 3, pp. 194-196.
Devasirvatham, et al., Radio Propagation Measurements At 850MHz. 1.7GHz and 4GHz Inside Two Dissimilar Office Buildings, Electronics Letter Mar. 29, 1990 vol. 26 No. 7, pp. 445-447.
Devasirvatham, et al., "Time Delay Spread and Signal Level Measurements of 850 MHz Radio Waves in Building Environments", IEEE Transactions on Antennas and Propagation, vol. AP-34, No. 11, Nov. 1986.
Ding, P, et al., "On the Sum Rate of Channel Subspace Feedback for Multi-Antenna Broadcast Channels," in Proc., IEEE Globecom, vol. 5, pp. 2699-2703, Nov. 2005.
Proakis, J, "Digital Communications", Fourth Edition, Department of Electrical and Computer Engineering, Northeastern University, ISBN 0-07-232111-3, Cover page, Title page, Table of Contents, 2001, 9 pages.
Strangeways, www.esaspaceweather.net/spweather/workshops/esw-wll/proc/Session3/StrangewaysHFMIMOposter.pdf.
Wikipedia, "Mobile ad hoc network", printed on Mar. 8, 2011, pp. 1-3, http://en.wikipedia.org/wiki/Mobile ad hoc network.
Wong, et al., "Performance Enhancement of Multiuser MIMO Wireless Communication Systems", IEEE Transactions on Communications, vol. 50, No. 12, Dec. 2002, pp. 1960-1970.
Yoo, et al., "Multi-Antenna Downlink Channels with Limited Feedback and User Selection", IEEE Journal on Selected Areas in Communications, vol. 25, No. 7, Sep. 2007, pp. 1478-1491.
Yu, et al., "Sum Capacity of Gaussian Vector Broadcast Channels", IEEE Transactions on Information Theory, vol. 50, No. 9, Sep. 2004, pp. 1875-1892.
Zhang, et al., "Networked MIMO with Clustered Linear Precoding", IEEE Transactions on Wireless Communications, vol. 8, No. 4, Apr. 2009, pp. 1910-1921.
Zogg, et al., "Multipath Delay Spread in a Hilly Region at 210 MHz", IEEE Transactions On Vehicular Technology, vol. VT-36, No. 4, Nov. 1987, pp. 184-187.
Notice of Allowance from U.S. Appl. No. 10/817,731, mailed Sep. 30, 2010, 6 pgs.
Office Action from U.S. Appl. No. 10/817,731, mailed Jul. 9, 2008, 20 pgs.
Office Action from U.S. Appl. No. 10/817,731, mailed Jan. 4, 2008, 13 pgs.
Office Action from U.S. Appl. No. 10/817,731, mailed May 18, 2007, 12 pgs.
Office Action from U.S. Appl. No. 11/894,540, mailed Apr. 29, 2009, 5 pgs.
Office Action from Korean Patent Application No. 2005-0070079, mailed Jul. 29, 2011, 3 pgs.
Notice of Allowance from U.S. Appl. No. 11/894,394, mailed Jun. 26, 2009, 5 pgs.
European Search Report, Application No. EP 05 25 4757, dated Sep. 14, 2005, 11 pages.
PCT "International Preliminary Report on Patentability Chapter I", Application No. PCT/US2008/073780 mailed Mar. 4, 2010, 10 pgs.
PCT "International Preliminary Report on Patentability Chapter I", Application No. PCT/US2005/11033 dated Jun. 3, 2008, 7 pgs.
PCT "Notification of Transmittal of the International Search Report and the Written Opinion of the International Searching Authority, or the Declaration", Application No. PCT/US 06/41009 mailed May 24, 2007, 6 pages.
PCT "Notification of Transmittal of the International Search Report and the Written Opinion of the International Searching Authority, or the Declaration", Application No. PCT/US05/11033 mailed May 2, 2008, 10 pages.

3GPP TR 25.876 V7.0.0 (Mar. 2007), Technical Report, 3rd Generation Partnership Project; Technical Specification Group Radio Access Network; "Multiple Input Multiple Output in UTRA"; (Release 7), pp. 2-76.

"Propagation", printed Oct. 21, 2005, http://home.planet.nl/~alphe078/propagat1.htm, 2 pgs.

Garcia, C.R , et al., "Channel Model for Train to Train Communication Using the 400 MHz Band", in Proc. Of IEEE Vehicular Technology Conference, pp. 3082-3086, May 2008.

Gunashekar, G, et al., "Investigations into the Feasibility of MIMO Techniques within the HF Band: Preliminary Results", Radio Science (Special Issue), 2009, (in Press) 33 pages.

Hewlett Packard, "GPS and Precision Timing Applications", Application Note 1272, pp. 1-28.

Jindal, N., "MIMO Broadcast Channels With Finite-Rate Feedback," IEEE Trans. on Info. Theory, vol. 52, pp. 5045-60, Nov. 2006.

Montgomery, B.G, et al., "Analog RF-over-fiber technology", Syntonics LLC, Jan. 2008, pp. 2-51, http://chesapeakebayaoc.org/documents/Syntonics_AOC_RF_over-Fiber_19_Jan_08.pdf.

Oda, Y., et al., "Measured Path Loss and Multipath Propagation Characteristics in UHF and Microwave Frequency Bands for Urban Mobile Communications", IEEE, VIC 2001, pp. 337-341.

Strohmer, T., et al., "Application of Time-Reversal with MMSE Equalizer to UWB Communications", Proc. of IEEE Globecom, vol. 5, pp. 3123-3127, Nov. 2004.

Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.

Viswanath, et al., "Sum Capacity of the Vector Gaussian Broadcast Channel and Uplink-Downlink Duality", IEEE Transactions on Information Theory, vol. 49, No. 8, Aug. 2003, pp. 1912-1921.

Zhang, et al., "Networked MIMO with Clustered Linear Precoding", IEEE Transactions on Wireless Communications, vol. 8, No. 4, Apr. 2009, pp. 1910-1921.

Strangeways, Hal J. "Investigation of Signal Correlation for Spaced and Co-Located Antennas on Multipath HF Links and Implications for the Design of SIMO and MIMO Aystems", IEEE First European Conf. on Antennas and Propagation (EuCAP 2006), vol. , N. 6-10, pp. 1-6, Nov. 2006.

* cited by examiner

N-antenna Base Station with Single-antenna Client Devices

3-Antenna Base Station with 3 Single-Antenna Client Devices

Cycling With Different Client Groups

Grouping Clients Based on Proximity

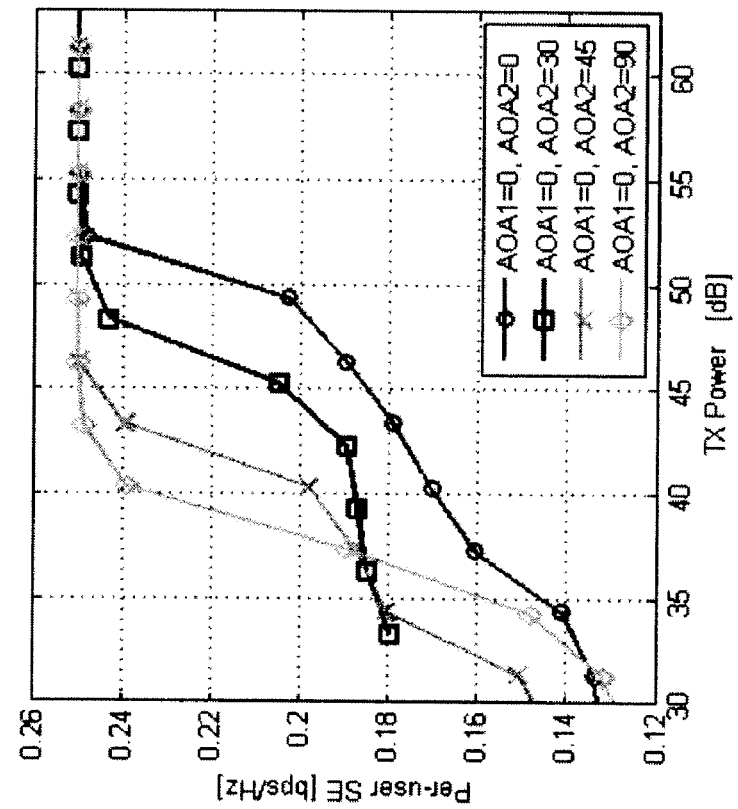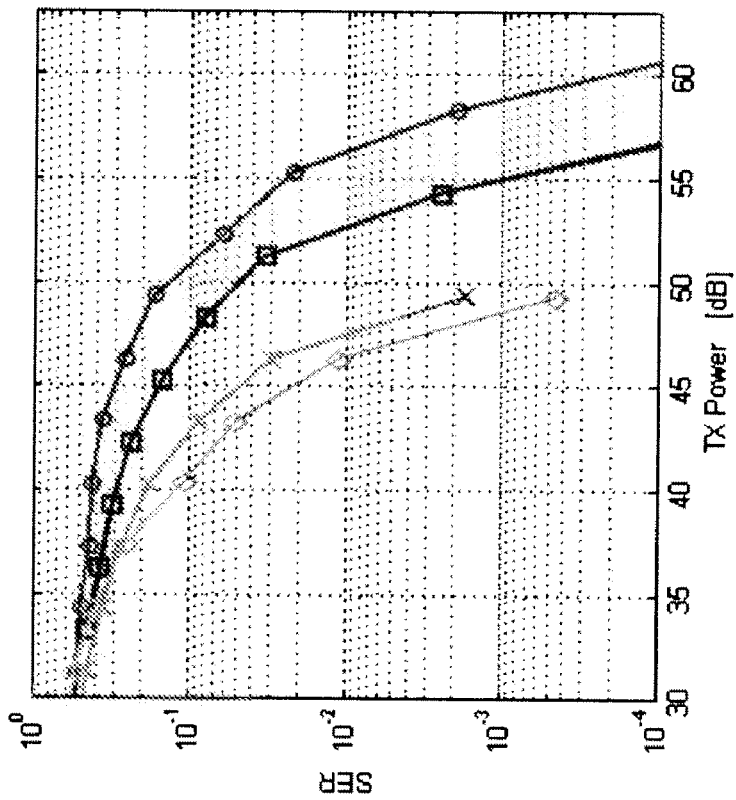
FIG. 26

| Method | # of Symbols | Run Time (1,000 iterations) | Max Correct. Offset |
|---|---|---|---|
| Old | 14208 | 600s | ? |
| New ($N_t/\underline{M_t} = 1$) | 288 | 60s | 1500Hz |
| New ($N_t/\underline{M_t} = 4$ length $N_t$) | 1056 | 600s | 1500Hz |

*FIG. 50*

SYSTEM AND METHOD FOR DISTRIBUTED INPUT-DISTRIBUTED OUTPUT WIRELESS COMMUNICATIONS

CLAIM TO PRIORITY

This application is a continuation in part of application Ser. No. 11/894,394 filed Aug. 20, 2007 now U.S. Pat. No. 7,599,420.

BACKGROUND OF THE INVENTION

1. Field of the Invention

This invention relates generally to the field of communication systems. More particularly, the invention relates to a system and method for distributed input-distributed output wireless communications using space-time coding techniques.

2. Description of the Related Art

Space-Time Coding of Communication Signals

A relatively new development in wireless technology is known as spatial multiplexing and space-time coding. One particular type of space-time coding is called MIMO for "Multiple Input Multiple Output" because several antennas are used on each end. By using multiple antennas to send and receive, multiple independent radio waves may be transmitted at the same time within the same frequency range. The following articles provide an overview of MIMO:

*IEEE JOURNAL ON SELECTED AREAS IN COMMUNICATIONS*, VOL. 21, NO. 3, April 2003: "From Theory to Practice: An Overview of MIMO Space-Time Coded Wireless Systems", by David Gesbert, Member, IEEE, Mansoor Shafi, Fellow, IEEE, Da-shan Shiu, Member, IEEE, Peter J. Smith, Member, IEEE, and Ayman Naguib, Senior Member, IEEE.

IEEE TRANSACTIONS ON COMMUNICATIONS, VOL. 50, NO. 12, December 2002: "Outdoor MIMO Wireless Channels: Models and Performance Prediction", David Gesbert, Member, IEEE, Helmut Bölcskei, Member, IEEE, Dhananjay A. Gore, and Arogyaswami J. Paulraj, Fellow, IEEE.

Fundamentally, MIMO technology is based on the use of spatially distributed antennas for creating parallel spatial data streams within a common frequency band. The radio waves are transmitted in such a way that the individual signals can be separated at the receiver and demodulated, even though they are transmitted within the same frequency band, which can result in multiple statistically independent (i.e. effectively separate) communications channels. Thus, in contrast to standard wireless communication systems which attempt to inhibit multi-path signals (i.e., multiple signals at the same frequency delayed in time, and modified in amplitude and phase), MIMO can rely on uncorrelated or weakly-correlated multi-path signals to achieve a higher throughput and improved signal-to-noise ratio within a given frequency band. By way of example, MIMO technology achieves much higher throughput in comparable power and signal-to-noise ratio (SNR) conditions where a conventional non-MIMO system can achieve only lower throughput. This capability is described on Qualcomm Incorporated's (Qualcomm is one of the largest providers of wireless technology) website on a page entitled "What MIMO Delivers" at http://www.cdmatech.com/products/what_mimo_delivers.jsp: "MIMO is the only multiple antenna technique that increases spectral capacity by delivering two or more times the peak data rate of a system per channel or per MHz of spectrum. To be more specific, for wireless LAN or Wi-Fi® applications QUAL-COMM's fourth generation MIMO technology delivers speeds of 315 Mbps in 36 MHz of spectrum or 8.8 Mbps/MHz. Compare this to the peak capacity of 802.11a/g (even with beam-forming or diversity techniques) which delivers only 54 Mbps in 17 MHz of spectrum or 3.18 Mbps/MHz."

MIMO systems typically face a practical limitation of fewer than 10 antennas per device (and therefore less than 10× throughput improvement in the network) for several reasons:

1. Physical limitations: MIMO antennas on a given device must have sufficient separation between them so that each receives a statistically independent signal. Although MIMO throughput improvements can be seen with antenna spacing of even fractions of the wavelength, the efficiency rapidly deteriorates as the antennas get closer, resulting in lower MIMO throughput multipliers.

See, for example, the following references:

[1] D.-S. Shiu, G. J. Foschini, M. J. Gans, and J. M. Kahn, "Fading correlation and its effect on the capacity of multielement antenna systems," *IEEE Trans. Comm.*, vol. 48, no. 3, pp. 502-513, March 2000.

[2] V. Pohl, V. Jungnickel, T. Haustein, and C. von Helmolt, "Antenna spacing in MIMO indoor channels," *Proc. IEEE Veh. Technol. Conf.*, vol. 2, pp. 749-753, May 2002.

[3] M. Stoytchev, H. Safar, A. L. Moustakas, and S. Simon, "Compact antenna arrays for MIMO applications," *Proc. IEEE Antennas and Prop. Symp.*, vol. 3, pp. 708-711, July 2001.

[4] A. Forenza and R. W. Heath Jr., "Impact of antenna geometry on MIMO communication in indoor clustered channels," *Proc. IEEE Antennas and Prop. Symp.*, vol. 2, pp. 1700-1703, June 2004.

Also, for small antenna spacing, mutual coupling effects may degrade the performance of MIMO systems.

See, for example, the following references:

[5] M. J. Fakhereddin and K. R. Dandekar, "Combined effect of polarization diversity and mutual coupling on MIMO capacity," Proc. IEEE Antennas and Prop. Symp., vol. 2, pp. 495-498, June 2003.

[6] P. N. Fletcher, M. Dean, and A. R. Nix, "Mutual coupling in multi-element array antennas and its influence on MIMO channel capacity," IEEE Electronics Letters, vol. 39, pp. 342-344, February 2003.

[7] V. Jungnickel, V. Pohl, and C. Von Helmolt, "Capacity of MIMO systems with closely spaced antennas," IEEE Comm. Lett., vol. 7, pp. 361-363, August 2003.

[8] J. W. Wallace and M. A. Jensen, "Termination-dependent diversity performance of coupled antennas: Network theory analysis," IEEE Trans. Antennas Propagat., vol. 52, pp. 98-105, January 2004.

[9] C. Waldschmidt, S. Schulteis, and W. Wiesbeck, "Complete RF system model for analysis of compact MIMO arrays," IEEE Trans. on Veh. Technol., vol. 53, pp. 579-586, May 2004.

[10] M. L. Morris and M. A. Jensen, "Network model for MIMO systems with coupled antennas and noisy amplifiers," IEEE Trans. Antennas Propagat., vol. 53, pp. 545-552, January 2005.

Moreover, as the antennas are crowded together, the antennas typically must be made smaller, which can impact the antenna efficiency as well.

See, for example, the following reference

[11] H. A. Wheeler, "Small antennas," IEEE Trans. Antennas Propagat., vol. AP-23, n. 4, pp. 462-469, July 1975.

[12] J. S. McLean, "A re-examination of the fundamental limits on the radiation Q of electrically small antennas," IEEE Trans. Antennas Propagat., vol. 44, n. 5, pp. 672-676, May 1996.

Finally, with lower frequencies and longer wavelengths, the physical size of a single MIMO device can become unmanageable. An extreme example is in the HF band, where MIMO device antennas may have to be separated from each other by 10 meters or more.

2. Noise limitations. Each MIMO receiver/transmitter subsystem produces a certain level of noise. As more and more of these subsystems are placed in close proximity to each other, the noise floor increases. Meanwhile, as increasingly more distinct signals need to be distinguished from each other in a many-antenna MIMO system, an increasingly lower noise floor is required.

3. Cost and power limitations. Although there are MIMO applications where cost and power consumption are not an issue, in a typical wireless product, both cost and power consumption are critical constraints in developing a successful product. A separate RF subsystem is required for each MIMO antenna, including separate Analog-to-Digital (A/D) and Digital-to-Analog (D/A) converters. Unlike many aspects of digital systems which scale with Moore's Law (an empirical observation, made by Intel co-founder Gordon Moore, that the number of transistors on an integrated circuit for minimum component cost doubles about every 24 months; source: http://www.intel.com/technology/mooreslaw/), such analog-intensive subsystems typically have certain physical structural size and power requirements, and scale in cost and power linearly. So, a many-antenna MIMO device would become prohibitively expensive and power consumptive compared to a single-antenna device.

As a result of the above, most MIMO systems contemplated today are on the order of 2-to-4 antennas, resulting in a 2-to-4× increase in throughput, and some increase in SNR due to the diversity benefits of a multi-antenna system. Up to 10 antenna MIMO systems have been contemplated (particularly at higher microwave frequencies due to shorter wavelengths and closer antenna spacing), but much beyond that is impractical except for very specialized and cost-insensitive applications.

Virtual Antenna Arrays

One particular application of MIMO-type technology is a virtual antenna array. Such a system is proposed in a research paper presented at European Cooperation in the field of Scientific and Technical Research, EURO-COST, Barcelona, Spain, Jan. 15-17, 2003: Center for Telecommunications Research, King's College London, UK: "A step towards MIMO: Virtual Antenna Arrays", Mischa Dohler & Hamid Aghvami.

Virtual antenna arrays, as presented in this paper, are systems of cooperative wireless devices (such as cell phones), which communicate amongst each other (if and when they are near enough to each other) on a separate communications channel than their primary communications channel to the their base station so as to operate cooperatively (e.g. if they are GSM cellular phones in the UHF band, this might be a 5 GHz Industrial Scientific and Medical (ISM) wireless band). This allows single antenna devices, for example, to potentially achieve MIMO-like increases in throughput by relaying information among several devices in range of each other (in addition to being in range of the base station) to operate as if they are physically one device with multiple antennas.

In practice, however, such a system is extremely difficult to implement and of limited utility. For one thing, there are now a minimum of two distinct communications paths per device that must be maintained to achieve improved throughput, with the second relaying link often of uncertain availability. Also, the devices are more expensive, physically larger, and consume more power since they have at a minimum a second communications subsystem and greater computational needs. In addition, the system is reliant on very sophisticated real-time of coordination of all devices, potentially through a variety of communications links. Finally, as the simultaneous channel utilization (e.g. the simultaneous phone call transmissions utilizing MIMO techniques) grows, the computational burden for each device grows (potentially exponentially as channel utilization increases linearly), which may very well be impractical for portable devices with tight power and size constraints.

BRIEF DESCRIPTION OF THE DRAWINGS

A better understanding of the present invention can be obtained from the following detailed description in conjunction with the drawings, in which:

FIG. 26 illustrates one embodiment of the DIDO 2×2 performance with 4-QAM and FEC rate ½ as function of the user device location.

FIG. 39 illustrates the SNR thresholds for a BD scheme with different values of AS.

FIG. 50 compares the amount of overhead required for different embodiments of methods.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Figure 1:
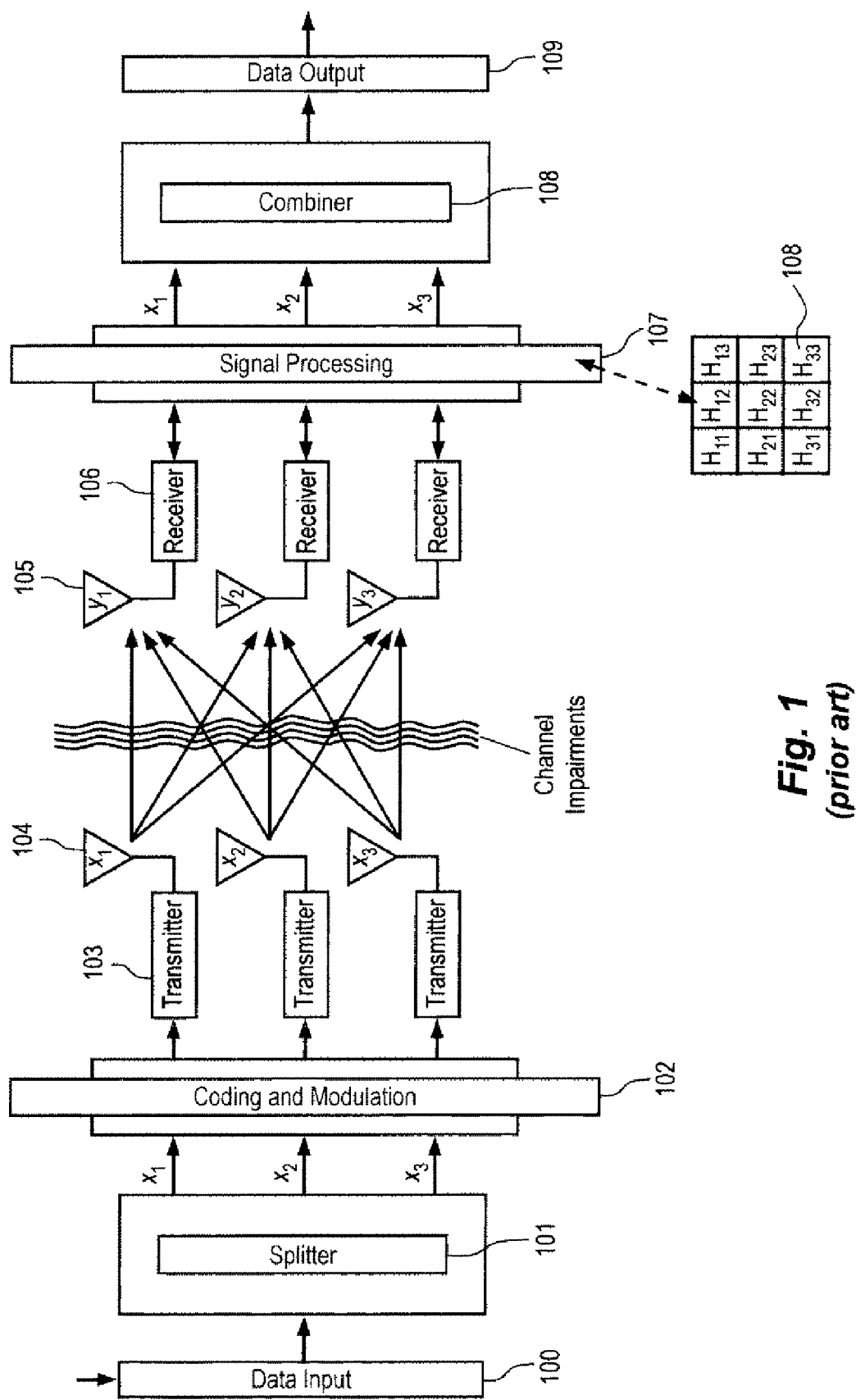
FIG. 1 illustrates a prior art MIMO system.

FIG. 1 shows a prior art MIMO system with transmit antennas 104 and receive antennas 105. Such a system can achieve up to 3× the throughput that would normally be achievable in the available channel. There are a number of different approaches in which to implement the details of such a MIMO system which are described in published literature on the subject, and the following explanation describes one such approach.

Before data is transmitted in the MIMO system of FIG. 1, the channel is "characterized." This is accomplished by initially transmitting a "training signal" from each of the transmit antennas 104 to each of the receivers 105. The training signal is generated by the coding and modulation subsystem 102, converted to analog by a D/A converter (not shown), and then converted from baseband to RF by each transmitter 103, in succession. Each receive antenna 105 coupled to its RF Receiver 106 receives each training signal and converts it to baseband. The baseband signal is converted to digital by a D/A converter (not shown), and the signal processing subsystem 107 characterizes the training signal. Each signal's characterization may include many factors including, for example, phase and amplitude relative to a reference internal to the receiver, an absolute reference, a relative reference, characteristic noise, or other factors. Each signal's characterization is typically defined as a vector that characterizes phase and amplitude changes of several aspects of the signal when it is transmitted across the channel. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum.

The signal processing subsystem 107 stores the channel characterization received by each receiving antenna 105 and corresponding receiver 106. After all three transmit antennas 104 have completed their training signal transmissions, then the signal processing subsystem 107 will have stored three channel characterizations for each of three receiving antennas 105, resulting in a 3×3 matrix 108, designated as the channel characterization matrix, "H." Each individual matrix element $H_{i,j}$ is the channel characterization (which is typically a vector, as described above) of the training signal transmission of transmit antenna 104 i as received by the receive antenna 105 j.

At this point, the signal processing subsystem 107 inverts the matrix H 108, to produce $H^{-1}$, and awaits transmission of actual data from transmit antennas 104. Note that various prior art MIMO techniques described in available literature, can be utilized to ensure that the H matrix 108 can be inverted.

In operation, a payload of data to be transmitted is presented to the data Input subsystem 100. It is then divided up into three parts by splitter 101 prior to being presented to coding and modulation subsystem 102. For example, if the payload is the ASCII bits for "abcdef," it might be divided up into three sub-payloads of ASCII bits for "ad," "be," and "cf" by Splitter 101. Then, each of these sub-payloads is presented individually to the coding and modulation subsystem 102.

Each of the sub-payloads is individually coded by using a coding system suitable for both statistical independence of each signal and error correction capability. These include, but are not limited to Reed-Solomon coding, Viterbi coding, and Turbo Codes. Finally, each of the three coded sub-payloads is modulated using an appropriate modulation scheme for the channel. Examples of modulation schemes are differential phase shift key ("DPSK") modulation, 64-QAM modulation and OFDM. It should be noted here that the diversity gains provided by MIMO allow for higher-order modulation constellations that would otherwise be feasible in a SISO (Single Input-Single Output) system utilizing the same channel. Each coded and modulated signal is then transmitted through its own antenna 104 following D/A conversion by a D/A conversion unit (not shown) and RF generation by each transmitter 103.

Assuming that adequate spatial diversity exists amongst the transmit and receive antennas, each of the receiving antennas 105 will receive a different combination of the three transmitted signals from antennas 104. Each signal is received and converted down to baseband by each RF receiver 106, and digitized by an A/D converter (not shown). If $y_n$ is the signal received by the nth receive antenna 105, and $x_n$ is the signal transmitted by nth transmit antenna 104, and N is noise, this can be described by the following three equations:

$$y_1 = x_1 H_{11} + x_2 H_{12} + x_3 H_{13} + N$$

$$y_2 = x_1 H_{21} + x_2 H_{22} + x_3 H_{23} + N$$

$$y_3 = x_1 H_{31} + x_2 H_{32} + x_3 H_{33} + N$$

Given that this is a system of three equations with three unknowns, it is a matter of linear algebra for the signal processing subsystem 107 to derive $x_1$, $x_2$, and $x_3$ (assuming that N is at a low enough level to permit decoding of the signals):

$$x_1 = y_1 H^{-1}{}_{11} + y_2 H^{-1}{}_{12} + y_3 H^{-1}{}_{13}$$

$$x_2 = y_1 H^{-1}{}_{21} + y_2 H^{-1}{}_{22} + y_3 H^{-1}{}_{23}$$

$$x_3 = y_1 H^{-1}{}_{31} + y_2 H^{-1}{}_{32} + y_3 H^{-1}{}_{33}$$

Once the three transmitted signals $x_n$ are thus derived, they are then demodulated, decoded, and error-corrected by signal processing subsystem 107 to recover the three bit streams that were originally separated out by splitter 101. These bit streams are combined in combiner unit 108, and output as a single data stream from the data output 109. Assuming the robustness of the system is able to overcome the noise impairments, the data output 109 will produce the same bit stream that was introduced to the data Input 100.

Although the prior art system just described is generally practical up to four antennas, and perhaps up to as many as 10, for the reasons described in the Background section of this disclosure, it becomes impractical with large numbers of antennas (e.g. 25, 100, or 1000).

Typically, such a prior art system is two-way, and the return path is implemented exactly the same way, but in reverse, with each side of the communications channels having both transmit and receive subsystems.

Figure 2:
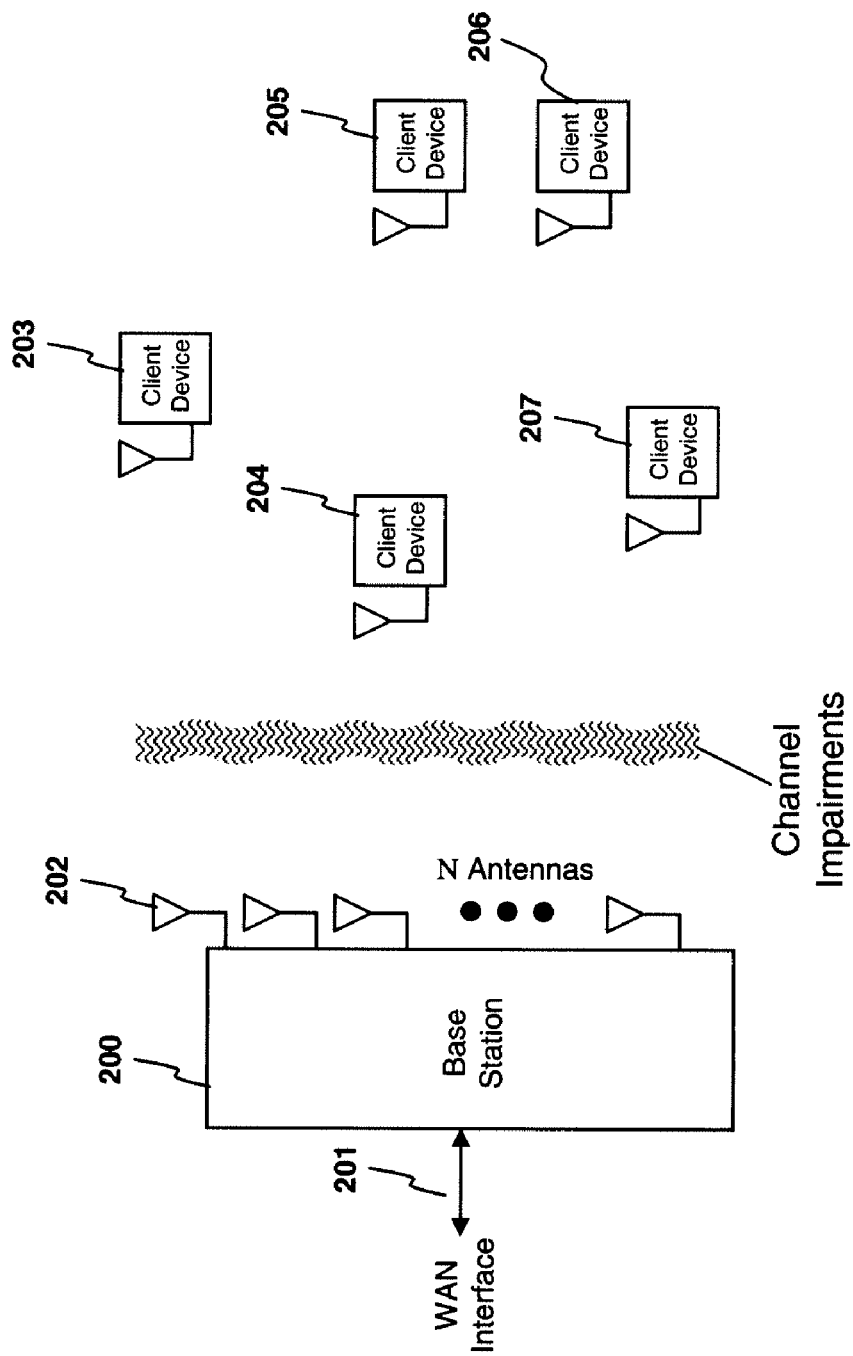
FIG. 2 illustrates an N-antenna Base Station communicating with a plurality of Single-antenna Client Devices.

FIG. 2 illustrates one embodiment of the invention in which a Base Station (BS) 200 is configured with a Wide Area Network (WAN) interface (e.g. to the Internet through a T1 or other high speed connection) 201 and is provisioned with a number (N) of antennas 202. For the time being, we use the term "Base Station" to refer to any wireless station that communicates wirelessly with a set of clients from a fixed location. Examples of Base Stations are access points in wireless local area networks (WLANs) or WAN antenna tower or antenna array. There are a number of Client Devices 203-207, each with a single antenna, which are served wirelessly from the Base Station 200. Although for the purposes of this example it is easiest to think about such a Base Station as being located in an office environment where it is serving Client Devices 203-207 that are wireless-network equipped personal computers, this architecture will apply to a large number of applications, both indoor and outdoor, where a Base Station is serving wireless clients. For example, the Base Station could be based at a cellular phone tower, or on a television broadcast tower. In one embodiment, the Base Station 200 is positioned on the ground and is configured to transmit upward at HF frequencies (e.g., frequencies up to 24 MHz) to bounce signals off the ionosphere as described in co-pending application entitled SYSTEM AND METHOD FOR ENHANCING NEAR VERTICAL INCIDENCE SKY-WAVE ("NVIS") COMMUNICATION USING SPACE-TIME CODING, Ser. No. 10/817,731, Filed Apr. 2, 2004, which is assigned to the assignee of the present application and which is incorporated herein by reference.

Certain details associated with the Base Station 200 and Client Devices 203-207 set forth above are for the purpose of illustration only and are not required for complying with the underlying principles of the invention. For example, the Base Station may be connected to a variety of different types of wide area networks via WAN interface 201 including application-specific wide area networks such as those used for digital video distribution. Similarly, the Client Devices may be any variety of wireless data processing and/or communication devices including, but not limited to cellular phones, personal digital assistants ("PDAs"), receivers, and wireless cameras.

In one embodiment, the Base Station's n Antennas 202 are separated spatially such that each is transmitting and receiving signals which are not spatially correlated, just as if the Base Station was a prior art MIMO transceiver. As described in the Background, experiments have been done where antennas placed within λ/6 (i.e. ⅙ wavelength) apart successfully achieve an increase in throughput from MIMO, but generally speaking, the further apart these Base Station antennas are placed, the better the system performance, and λ/2 is a desirable minimum. Of course, the underlying principles of the invention are not limited to any particular separation between antennas.

Note that a single Base Station 200 may very well have its antennas located very far apart. For example, in the HF spectrum, the antennas may be 10 meters apart or more (e.g., in an NVIS implementation mentioned above). If 100 such antennas are used, the Base Station's antenna array could well occupy several square kilometers.

In addition to spatial diversity techniques, one embodiment of the invention polarizes the signal in order to increase the effective throughput of the system. Increasing channel capacity through polarization is a well known technique which has been employed by satellite television providers for years. Using polarization, it is possible to have multiple (e.g., three) Base Station or users' antennas very close to each other, and still be not spatially correlated. Although conventional RF systems usually will only benefit from the diversity of two dimensions (e.g. x and y) of polarization, the architecture described herein may further benefit from the diversity of three dimensions of polarization (x, y and z).

In addition to space and polarization diversity, one embodiment of the invention employs antennas with near-orthogonal radiation patterns to improve link performance via pattern diversity. Pattern diversity can improve the capacity and error-rate performance of MIMO systems and its benefits over other antenna diversity techniques have been shown in the following papers:

[13] L. Dong, H. Ling, and R. W. Heath Jr., "Multiple-input multiple-output wireless communication systems using antenna pattern diversity," *Proc. IEEE Glob. Telecom. Conf.*, vol. 1, pp. 997-1001, November 2002.

[14] R. Vaughan, "Switched parasitic elements for antenna diversity," *IEEE Trans. Antennas Propagat.*, vol. 47, pp. 399-405, February 1999.

[15] P. Mattheijssen, M. H. A. J. Herben, G. Dolmans, and L. Leyten, "Antenna-pattern diversity versus space diversity for use at handhelds," *IEEE Trans. on Veh. Technol.*, vol. 53, pp. 1035-1042, July 2004.

[16] C. B. Dietrich Jr, K. Dietze, J. R. Nealy, and W. L. Stutzman, "Spatial, polarization, and pattern diversity for wireless handheld terminals," *Proc. IEEE Antennas and Prop. Symp.*, vol. 49, pp. 1271-1281, September 2001.

[17] A. Forenza and R. W. Heath, Jr., "Benefit of Pattern Diversity Via 2-element Array of Circular Patch Antennas in Indoor Clustered MIMO Channels", *IEEE Trans. on Communications*, vol. 54, no. 5, pp. 943-954, May 2006. Using pattern diversity, it is possible to have multiple Base Station or users' antennas very close to each other, and still be not spatially correlated.

Figure 3:
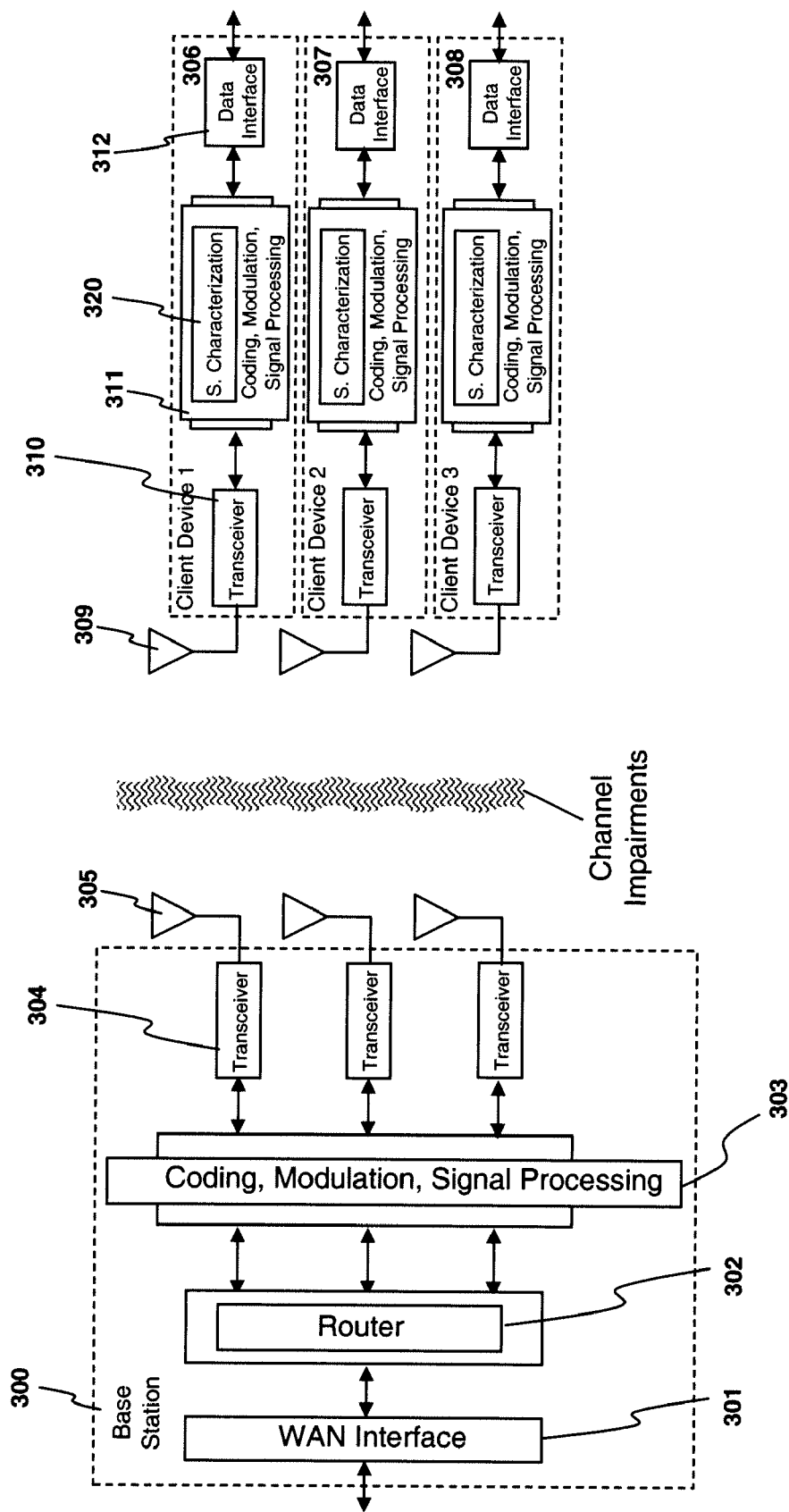
FIG. 3 illustrates a three Antenna Base Station communicating with three Single-Antenna Client Devices

FIG. 3 provides additional detail of one embodiment of the Base Station 200 and Client Devices 203-207 shown in FIG. 2. For the purposes of simplicity, the Base Station 300 is shown with only three antennas 305 and only three Client Devices 306-308. It will be noted, however, that the embodiments of the invention described herein may be implemented with a virtually unlimited number of antennas 305 (i.e., limited only by available space and noise) and Client Devices 306-308.

FIG. 3 is similar to the prior art MIMO architecture shown in FIG. 1 in that both have three antennas on each sides of a communication channel. A notable difference is that in the prior art MIMO system the three antennas 105 on the right side of FIG. 1 are all a fixed distance from one another (e.g., integrated on a single device), and the received signals from each of the antennas 105 are processed together in the Signal Processing subsystem 107. By contrast, in FIG. 3, the three antennas 309 on the right side of the diagram are each coupled to a different Client Device 306-308, each of which may be distributed anywhere within range of the Base Station 305. As such, the signal that each Client Device receives is processed independently from the other two received signals in its Coding, Modulation, Signal Processing subsystem 311. Thus, in contrast to a Multiple-Input (i.e. antennas 105) Multiple-Output (i.e. antennas 104) "MIMO" system, FIG. 3 illustrates a Multiple Input (i.e. antennas 305) Distributed Output (i.e. antennas 305) system, referred to hereinafter as a "MIDO" system.

Note that this application uses different terminology than previous applications, so as to better conform with academic and industry practices. In previously cited co-pending application, SYSTEM AND METHOD FOR ENHANCING NEAR VERTICAL INCIDENCE SKYWAVE ("NVIS") COMMUNICATION USING SPACE-TIME CODING, Ser. No. 10/817,731, Filed Apr. 2, 2004, and application Ser. No. 10/902,978 filed Jul. 30, 2004 for which this is application is a continuation-in-part, the meaning of "Input" and "Output" (in the context of SIMO, MISO, DIMO and MIDO) is reversed from how the terms are used in this application. In the prior applications, "Input" referred to the wireless signals as they are input to the receiving antennas (e.g. antennas 309 in FIG. 3), and "Output" referred to the wireless signals as they are output by the transmitting antennas (e.g. antennas 305). In academia and the wireless industry, the reverse meaning of "Input" and "Output" is commonly used, in which "Input" refers to the wireless signals as they are input to the channel (i.e. the transmitted wireless signals from antennas 305) and "Output" refers to the wireless signals as they are output from the channel (i.e. wireless signals received by antennas 309). This application adopts this terminology, which is the reverse of the applications cited previously in this paragraph. Thus, the following terminology equivalences shall be drawn between applications:

| 10/817,731 and 10/902,978 | | Current Application |
|---|---|---|
| SIMO | = | MISO |
| MISO | = | SIMO |
| DIMO | = | MIDO |
| MIDO | = | DIMO |

The MIDO architecture shown in FIG. 3 achieves a similar capacity increase as MIMO over a SISO system for a given number of transmitting antennas. However, one difference between MIMO and the particular MIDO embodiment illustrated in FIG. 3 is that, to achieve the capacity increase provided by multiple base station antennas, each MIDO Client Device 306-308 requires only a single receiving antenna, whereas with MIMO, each Client Device requires as least as many receiving antennas as the capacity multiple that is hoped to be achieved. Given that there is usually a practical limit to how many antennas can be placed on a Client Device (as explained in the Background), this typically limits MIMO systems to between four to ten antennas (and 4× to 10× capacity multiple). Since the Base Station 300 is typically serving many Client Devices from a fixed and powered location, is it practical to expand it to far more antennas than ten, and to separate the antennas by a suitable distance to achieve spatial diversity. As illustrated, each antenna is equipped with a transceiver 304 and a portion of the processing power of a Coding, Modulation, and Signal Processing section 303. Significantly, in this embodiment, no matter how much Base Station 300 is expanded, each Client Device 306-308 only will require one antenna 309, so the cost for an individual user Client Device 306-308 will be low, and the cost of Base Station 300 can be shared among a large base of users.

Figure 4:
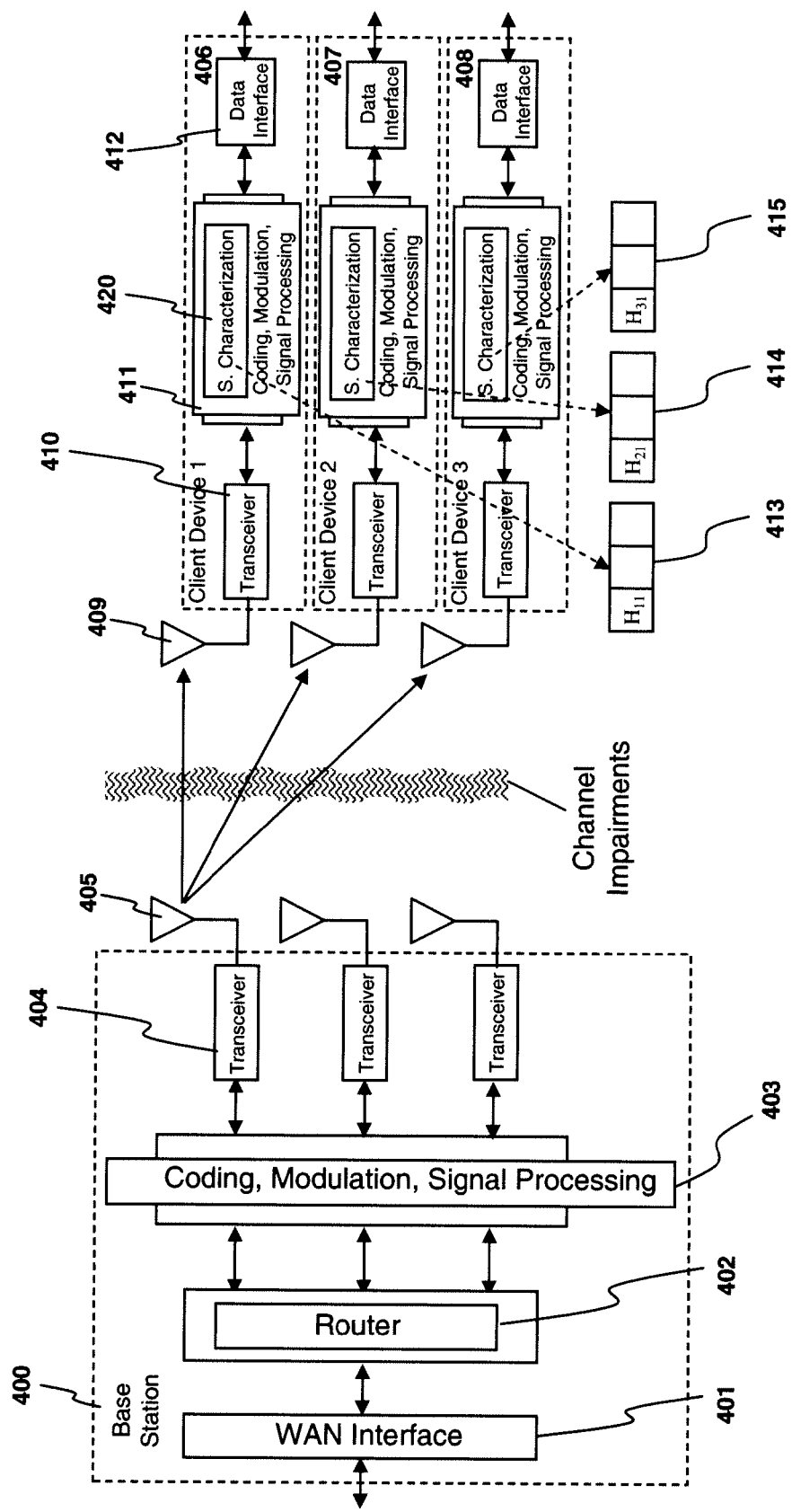
FIG. 4 illustrates training signal techniques employed in one embodiment of the invention.
Figure 5:
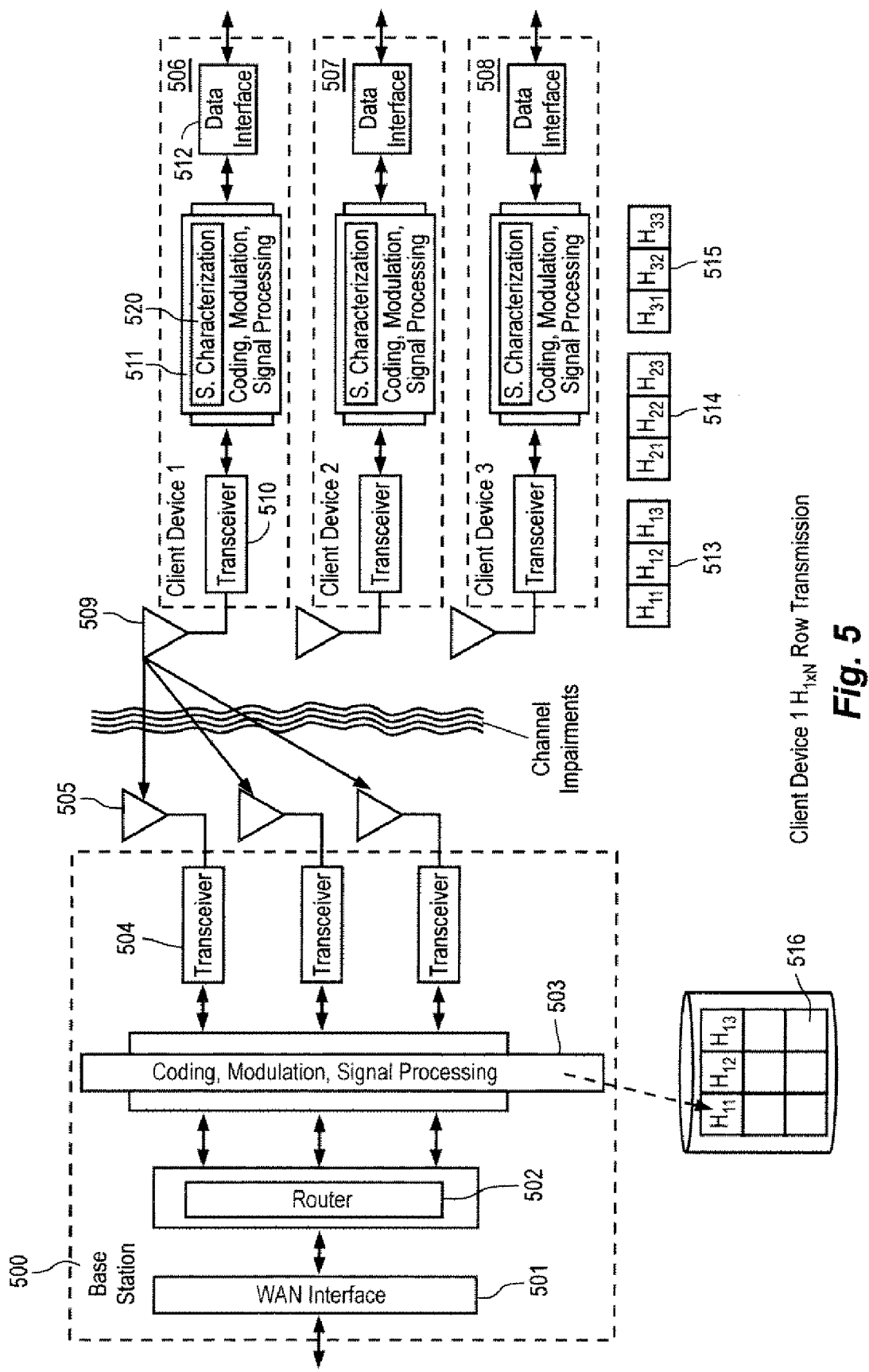
FIG. 5 illustrates channel characterization data transmitted from a client device to a base station according to one embodiment of the invention.
Figure 6:
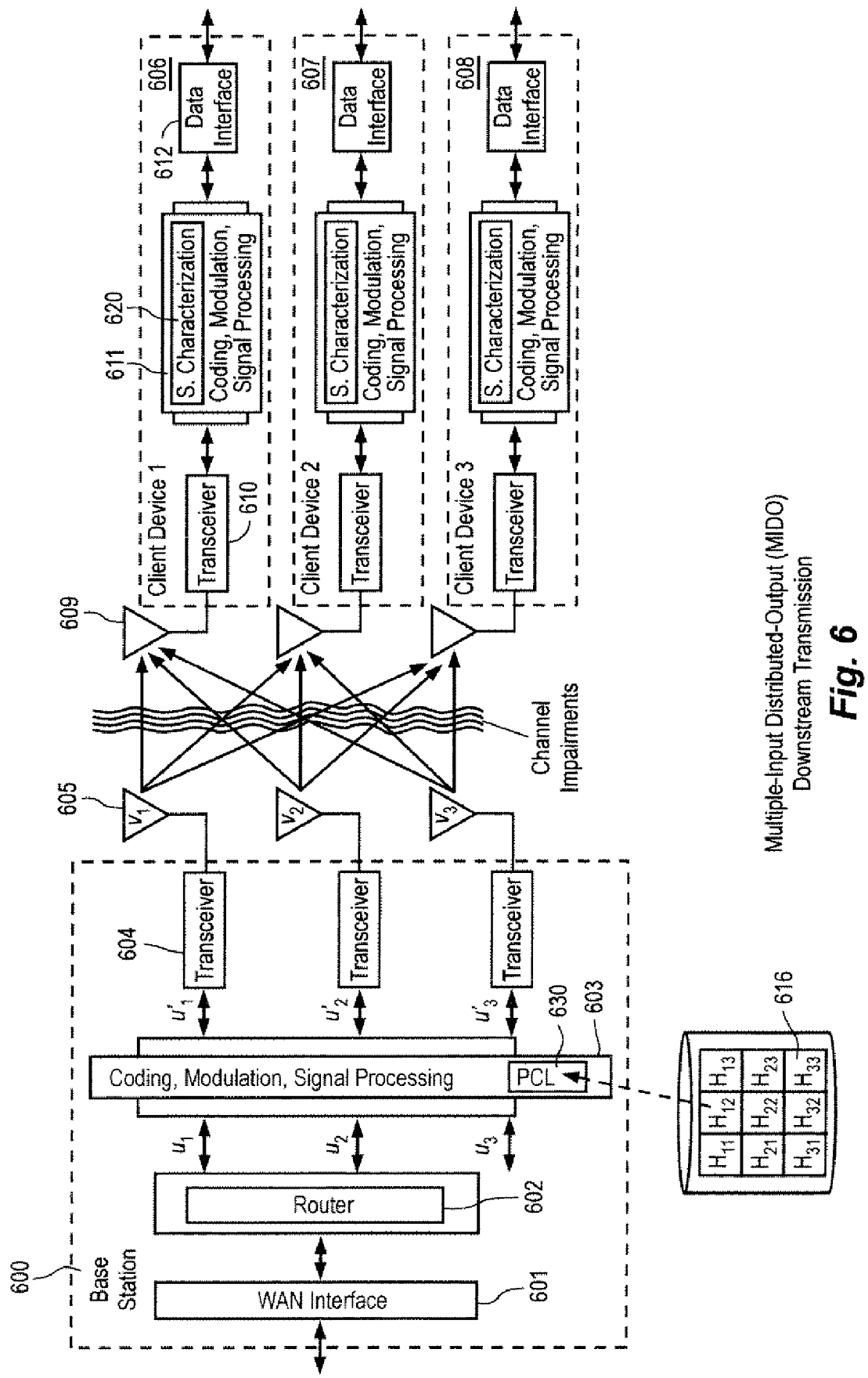
FIG. 6 illustrates a Multiple-Input Distributed-Output ("MIDO") downstream transmission according to one embodiment of the invention.

An example of how a MIDO transmission from the Base Station 300 to the Client Devices 306-308 can be accomplished is illustrated in FIGS. 4 through 6.

In one embodiment of the invention, before a MIDO transmission begins, the channel is characterized. As with a MIMO system, a training signal is transmitted (in the embodiment herein described), one-by-one, by each of the antennas 405. FIG. 4 illustrates only the first training signal transmission, but with three antennas 405 there are three separate transmissions in total. Each training signal is generated by the Coding, Modulation, and Signal Processing subsystem 403, converted to analog through a D/A converter, and transmitted as RF through each RF Transceiver 404. Various different coding, modulation and signal processing techniques may be employed including, but not limited to, those described above (e.g., Reed Solomon, Viterbi coding; QAM, DPSK, QPSK modulation, . . . etc).

Each Client Device 406-408 receives a training signal through its antenna 409 and converts the training signal to baseband by Transceiver 410. An A/D converter (not shown)

converts the signal to digital where is it processed by each Coding, Modulation, and Signal Processing subsystem 411. Signal characterization logic 320 then characterizes the resulting signal (e.g., identifying phase and amplitude distortions as described above) and stores the characterization in memory. This characterization process is similar to that of prior art MIMO systems, with a notable difference being that the each client device only computes the characterization vector for its one antenna, rather than for n antennas. For example, the Coding Modulation and Signal Processing subsystem 420 of client device 406 is initialized with a known pattern of the training signal (either at the time of manufacturing, by receiving it in a transmitted message, or through another initialization process). When antenna 405 transmits the training signal with this known pattern, Coding Modulation and Signal Processing subsystem 420 uses correlation methods to find the strongest received pattern of the training signal, it stores the phase and amplitude offset, then it subtracts this pattern from the received signal. Next, it finds then second strongest received pattern that correlates to the training signal, it stores the phase and amplitude offset, then it subtracts this second strongest pattern from the received signal. This process continues until either some fixed number of phase and amplitude offsets are stored (e.g. eight), or a detectable training signal pattern drops below a given noise floor. This vector of phase/amplitude offsets becomes element $H_{11}$ of the vector 413. Simultaneously, Coding Modulation and Signal Processing subsystems for Client Devices 407 and 408 implement the produce their vector elements $H_{21}$ and $H_{31}$.

The memory in which the characterization is stored may be a non-volatile memory such as a Flash memory or a hard drive and/or a volatile memory such as a random access memory (e.g., SDRAM, RDAM). Moreover, different Client Devices may concurrently employ different types of memories to store the characterization information (e.g., PDA's may use Flash memory whereas notebook computers may use a hard drive). The underlying principles of the invention are not limited to any particular type of storage mechanism on the various Client Devices or the Base Station.

As mentioned above, depending on the scheme employed, since each Client Device 406-408 has only one antenna, each only stores a 1×3 row 413-415 of the H matrix. FIG. 4 illustrates the stage after the first training signal transmission where the first column of 1×3 rows 413-415 has been stored with channel characterization information for the first of the three Base Station antennas 405. The remaining two columns are stored following the channel characterization of the next two training signal transmissions from the remaining two base station antennas. Note that for the sake of illustration the three training signals are transmitted at separate times. If the three training signal patterns are chosen such as not to be correlated to one another, they may be transmitted simultaneously, thereby reducing training time.

As indicated in FIG. 5, after all three pilot transmissions are complete, each Client Device 506-508 transmits back to the Base Station 500 the 1×3 row 513-515 of matrix H that it has stored. To the sake of simplicity, only one Client Device 506 is illustrated transmitting its characterization information in FIG. 5. An appropriate modulation scheme (e.g. DPSK, 64QAM, OFDM) for the channel combined with adequate error correction coding (e.g. Reed Solomon, Viterbi, and/or Turbo codes) may be employed to make sure that the Base Station 500 receives the data in the rows 513-515 accurately.

Although all three antennas 505 are shown receiving the signal in FIG. 5, it is sufficient for a single antenna and transceiver of the Base Station 500 to receive each 1×3 row 513-515 transmission. However, utilizing many or all of antennas 505 and Transceivers 504 to receive each transmission (i.e., utilizing prior art Single-Input Multiple-Output ("SIMO") processing techniques in the Coding, Modulation and Signal Processing subsystem 503) may yield a better signal-to-noise ratio ("SNR") than utilizing a single antenna 505 and Transceiver 504 under certain conditions.

As the Coding, Modulation and Signal Processing subsystem 503 of Base Station 500 receives the 1×3 row 513-515, from each Client Device 507-508, it stores it in a 3×3H matrix 516. As with the Client Devices, the Base Station may employ various different storage technologies including, but not limited to non-volatile mass storage memories (e.g., hard drives) and/or volatile memories (e.g., SDRAM) to store the matrix 516. FIG. 5 illustrates a stage at which the Base Station 500 has received and stored the 1×3 row 513 from Client Device 509. The 1×3 rows 514 and 515 may be transmitted and stored in H matrix 516 as they are received from the remaining Client Devices, until the entire H matrix 516 is stored.

One embodiment of a MIDO transmission from a Base Station 600 to Client Devices 606-608 will now be described with reference to FIG. 6. Because each Client Device 606-608 is an independent device, typically each device is receiving a different data transmission. As such, one embodiment of a Base Station 600 includes a Router 602 communicatively positioned between the WAN Interface 601 and the Coding, Modulation and Signal Processing subsystem 603 that sources multiple data streams (formatted into bit streams) from the WAN interface 601 and routes them as separate bit streams $u_1$-$u_3$ intended for each Client Device 606-608, respectively. Various well known routing techniques may be employed by the router 602 for this purpose.

The three bit streams, $u_1$-$u_3$, shown in FIG. 6 are then routed into the Coding, Modulation and Signal Processing subsystem 603 and coded into statistically distinct, error correcting streams (e.g. using Reed Solomon, Viterbi, or Turbo Codes) and modulated using an appropriate modulation scheme for the channel (such as DPSK, 64QAM or OFDM). In addition, the embodiment illustrated in FIG. 6 includes signal precoding logic 630 for uniquely coding the signals transmitted from each of the antennas 605 based on the signal characterization matrix 616. More specifically, rather than routing each of the three coded and modulated bit streams to a separate antenna (as is done in FIG. 1), in one embodiment, the precoding logic 630 multiplies the three bit streams $u_1$-$u_3$ in FIG. 6 by the inverse of the H matrix 616, producing three new bit streams, $u'_1$-$u'_3$. The three precoded bit streams are then converted to analog by D/A converters (not shown) and transmitted as RF by Transceivers 604 and antennas 605.

Before explaining how the bit streams are received by the Client Devices 606-608, the operations performed by the precoding module 630 will be described. Similar to the MIMO example from FIG. 1 above, the coded and modulated signal for each of the three source bit streams will be designated with $u_n$. In the embodiment illustrated in FIG. 6, each $u_i$ contains the data from one of the three bit streams routed by the Router 602, and each such bit stream is intended for one of the three Client Devices 606-608.

However, unlike the MIMO example of FIG. 1, where each $x_i$ is transmitted by each antenna 104, in the embodiment of the invention illustrated in FIG. 6, each $u_i$ is received at each Client Device antenna 609 (plus whatever noise N there is in the channel). To achieve this result, the output of each of the three antennas 605 (each of which we will designate as $v_i$) is a function of $u_i$ and the H matrix that characterizes the channel for each Client Device. In one embodiment, each $v_i$ is calculated by the precoding logic 630 within the Coding, Modulation and Signal Processing subsystem 603 by implementing the following formulas:

$$v_1 = u_1 H^{-1}{}_{11} + u_2 H^{-1}{}_{12} + u_3 H^{-1}{}_{13}$$

$$v_2 = u_1 H^{-1}{}_{21} + u_2 H^{-1}{}_{22} + u_3 H^{-1}{}_{23}$$

$$v_3 = u_1 H^{-1}{}_{31} + u_2 H^{-1}{}_{32} + u_3 H^{-1}{}_{33}$$

Thus, unlike MIMO, where each $x_i$ is calculated at the receiver after the signals have been transformed by the channel, the embodiments of the invention described herein solve for each $v_i$ at the transmitter before the signals have been transformed by the channel. Each antenna 609 receives $u_i$ already separated from the other $u_{n-1}$ bit streams intended for the other antennas 609. Each Transceiver 610 converts each received signal to baseband, where it is digitized by an A/D converter (now shown), and each Coding, Modulation and Signal Processing subsystem 611, demodulates and decodes the $x_i$ bit stream intended for it, and sends its bit stream to a Data Interface 612 to be used by the Client Device (e.g., by an application on the client device).

The embodiments of the invention described herein may be implemented using a variety of different coding and modulation schemes. For example, in an OFDM implementation, where the frequency spectrum is separated into a plurality of sub-bands, the techniques described herein may be employed to characterize each individual sub-band. As mentioned above, however, the underlying principles of the invention are not limited to any particular modulation scheme.

If the Client Devices 606-608 are portable data processing devices such as PDAs, notebook computers, and/or wireless telephones the channel characterization may change frequently as the Client Devices may move from one location to another. As such, in one embodiment of the invention, the channel characterization matrix 616 at the Base Station is continually updated. In one embodiment, the Base Station 600 periodically (e.g., every 250 milliseconds) sends out a new training signal to each Client Device, and each Client Device continually transmits its channel characterization vector back to the Base Station 600 to ensure that the channel characterization remains accurate (e.g. if the environment changes so as to affect the channel or if a Client Device moves). In one embodiment, the training signal is interleaved within the actual data signal sent to each client device. Typically, the training signals are much lower throughput than the data signals, so this would have little impact on the overall throughput of the system. Accordingly, in this embodiment, the channel characterization matrix 616 may be updated continuously as the Base Station actively communicates with each Client Device, thereby maintaining an accurate channel characterization as the Client Devices move from one location to the next or if the environment changes so as to affect the channel.

Figure 7:
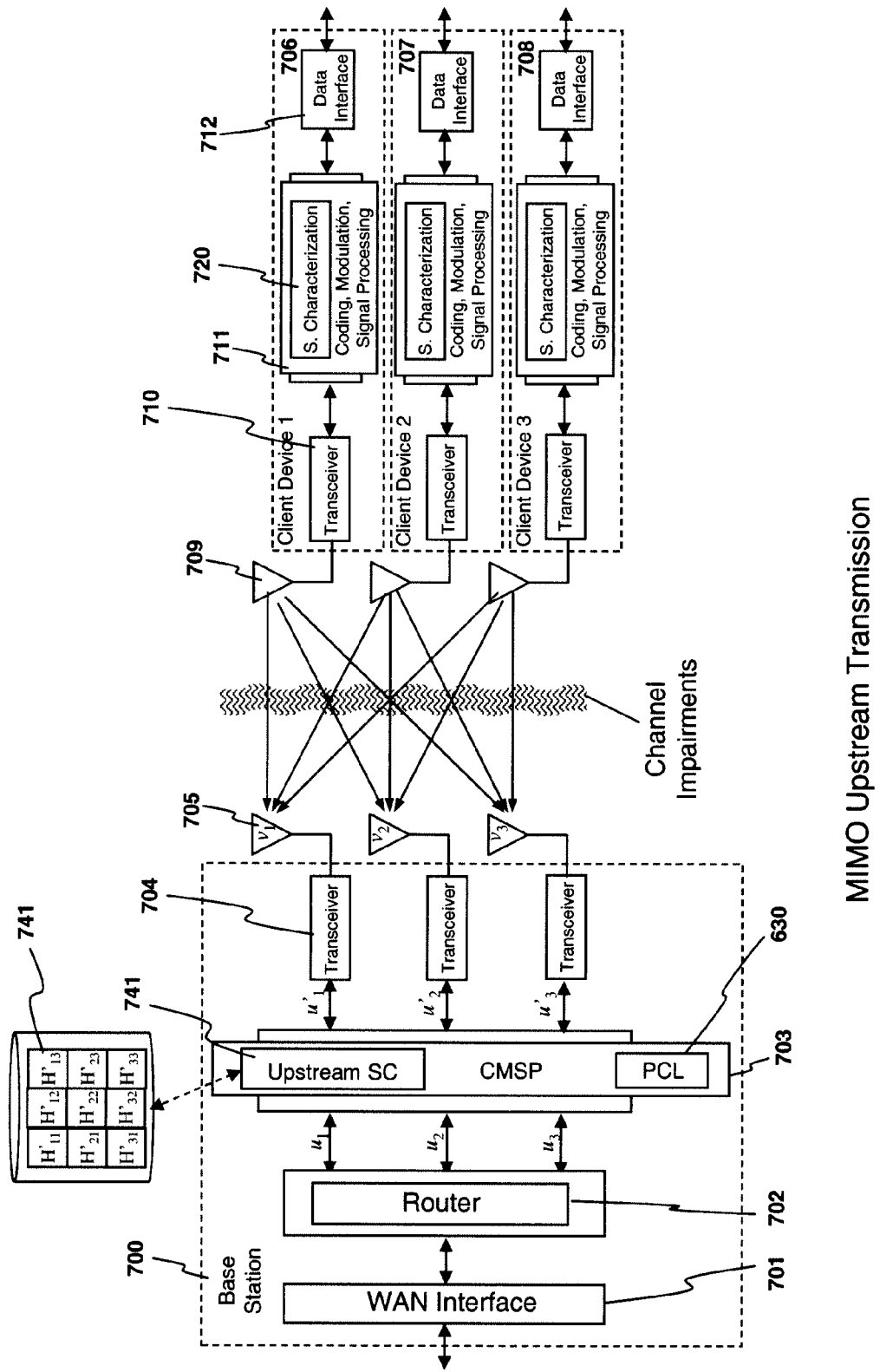
FIG. 7 illustrates a Multiple-Input Multiple Output ("MIMO") upstream transmission according to one embodiment of the invention.

One embodiment of the invention illustrated in FIG. 7 employs MIMO techniques to improve the upstream communication channel (i.e., the channel from the Client Devices 706-708 to the Base Station 700). In this embodiment, the channel from each of the Client Devices is continually analyzed and characterized by upstream channel characterization logic 741 within the Base Station. More specifically, each of the Client Devices 706-708 transmits a training signal to the Base Station 700 which the channel characterization logic 741 analyzes (e.g., as in a typical MIMO system) to generate an N×M channel characterization matrix 741, where N is the number of Client Devices and M is the number of antennas employed by the Base Station. The embodiment illustrated in FIG. 7 employs three antennas 705 at the Base Station and three Client Devices 706-608, resulting in a 3×3 channel characterization matrix 741 stored at the Base Station 700. The MIMO upstream transmission illustrated in FIG. 7 may be used by the Client Devices both for transmitting data back to the Base Station 700, and for transmitting channel characterization vectors back to the Base Station 700 as illustrated in FIG. 5. But unlike the embodiment illustrated in FIG. 5 in which each Client Device's channel characterization vector is transmitted at a separate time, the method shown in FIG. 7 allows for the simultaneous transmission of channel characterization vectors from multiple Client Devices back to the Base Station 700, thereby dramatically reducing the channel characterization vectors' impact on return channel throughput.

As mentioned above, each signal's characterization may include many factors including, for example, phase and amplitude relative to a reference internal to the receiver, an absolute reference, a relative reference, characteristic noise, or other factors. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum. The training signal may be generated by each Client Device's coding and modulation subsystem 711, converted to analog by a D/A converter (not shown), and then converted from baseband to RF by each Client Device's transmitter 709. In one embodiment, in order to ensure that the training signals are synchronized, Client Devices only transmit training signals when requested by the Base Station (e.g., in a round robin manner). In addition, training signals may be interleaved within or transmitted concurrently with the actual data signal sent from each client device. Thus, even if the Client Devices 706-708 are mobile, the training signals may be continuously transmitted and analyzed by the upstream channel characterization logic 741, thereby ensuring that the channel characterization matrix 741 remains up-to-date.

The total channel capacity supported by the foregoing embodiments of the invention may be defined as min (N, M) where M is the number of Client Devices and N is the number of Base Station antennas. That is, the capacity is limited by the number of antennas on either the Base Station side or the Client side. As such, one embodiment of the invention employs synchronization techniques to ensure that no more than min (N, M) antennas are transmitting/receiving at a given time.

Figure 8:
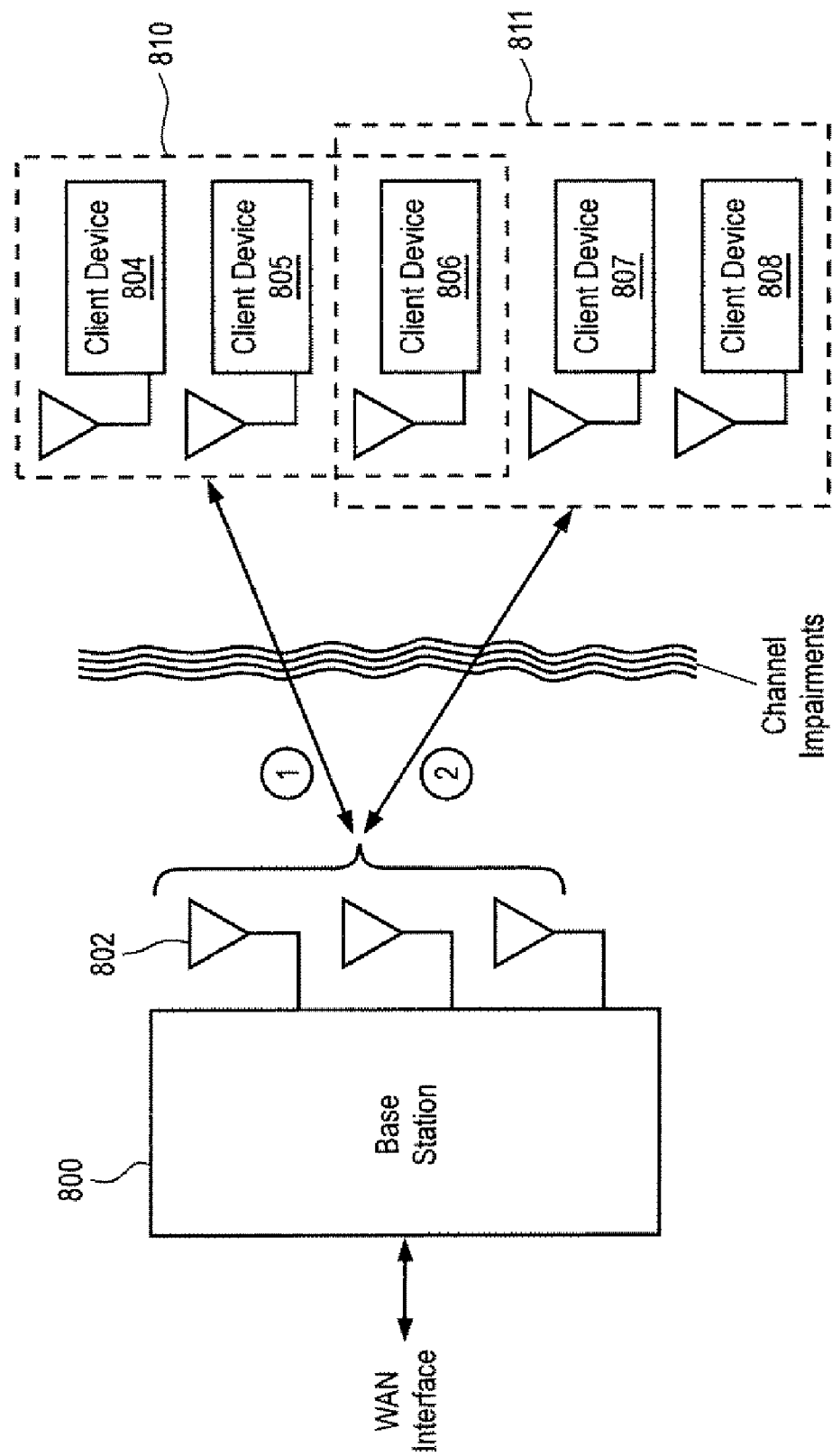
FIG. 8 illustrates a base station cycling through different client groups to allocate throughput according to one embodiment of the invention.

In a typical scenario, the number of antennas 705 on the Base Station 700 will be less than the number of Client Devices 706-708. An exemplary scenario is illustrated in FIG. 8 which shows five Client Devices 804-808 communicating with a base station having three antennas 802. In this embodiment, after determining the total number of Client Devices 804-808, and collecting the necessary channel characterization information (e.g., as described above), the Base Station 800 chooses a first group of three clients 810 with which to communicate (three clients in the example because min (N, M)=3). After communicating with the first group of clients 810 for a designated period of time, the Base Station then selects another group of three clients 811 with which to communicate. To distribute the communication channel evenly, the Base Station 800 selects the two Client Devices 807, 808 which were not included in the first group. In addition, because an extra antenna is available, the Base Station 800 selects an additional client device 806 included in the first group. In one embodiment, the Base Station 800 cycles between groups of clients in this manner such that each client is effectively allocated the same amount of throughput over time. For example, to allocate throughput evenly, the Base Station may subsequently select any combination of three Client Devices which excludes Client Device 806 (i.e., because Client Device 806 was engaged in communication with the Base Station for the first two cycles).

In one embodiment, in addition to standard data communications, the Base Station may employ the foregoing techniques to transmit training signals to each of the Client Devices and receive training signals and signal characterization data from each of the Client Devices.

In one embodiment, certain Client Devices or groups of client devices may be allocated different levels of throughput. For example, Client Devices may be prioritized such that relatively higher priority Client Devices may be guaranteed more communication cycles (i.e., more throughput) than relatively lower priority client devices. The "priority" of a Client Device may be selected based on a number of variables including, for example, the designated level of a user's subscription to the wireless service (e.g., user's may be willing to pay more for additional throughput) and/or the type of data being communicated to/from the Client Device (e.g., realtime communication such as telephony audio and video may take priority over non-real time communication such as email).

In one embodiment of the Base Station dynamically allocates throughput based on the Current Load required by each Client Device. For example, if Client Device 804 is streaming live video and the other devices 805-808 are performing non-real time functions such as email, then the Base Station 800 may allocate relatively more throughput to this client 804. It should be noted, however, that the underlying principles of the invention are not limited to any particular throughput allocation technique.

Figure 9:
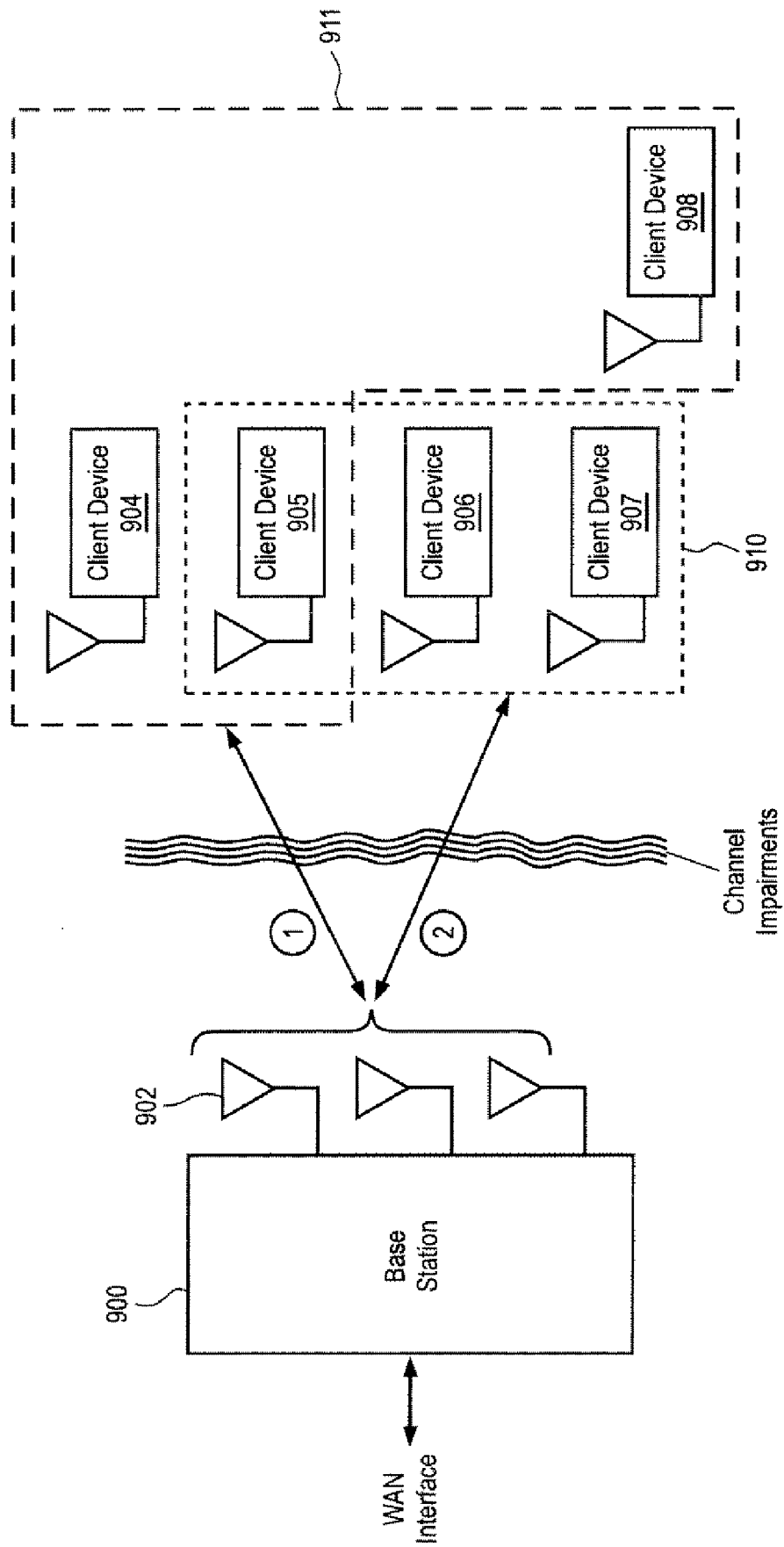
FIG. 9 illustrates a grouping of clients based on proximity according to one embodiment of the invention.

As illustrated in FIG. 9, two Client Devices 907, 908 may be so close in proximity, that the channel characterization for the clients is effectively the same. As a result, the Base Station will receive and store effectively equivalent channel characterization vectors for the two Client Devices 907, 908 and therefore will not be able to create unique, spatially distributed signals for each Client Device. Accordingly, in one embodiment, the Base Station will ensure that any two or more Client Devices which are in close proximity to one another are allocated to different groups. In FIG. 9, for example, the Base Station 900 first communicates with a first group 910 of Client Devices 904, 905 and 908; and then with a second group 911 of Client Devices 905, 906, 907, ensuring that Client Devices 907 and 908 are in different groups.

Alternatively, in one embodiment, the Base Station 900 communicates with both Client Devices 907 and 908 concurrently, but multiplexes the communication channel using known channel multiplexing techniques. For example, the Base Station may employ time division multiplexing ("TDM"), frequency division multiplexing ("FDM") or code division multiple access ("CDMA") techniques to divide the single, spatially-correlated signal between Client Devices 907 and 908.

Although each Client Device described above is equipped with a single antenna, the underlying principles of the invention may be employed using Client Devices with multiple antennas to increase throughput. For example, when used on the wireless systems described above, a client with 2 antennas will realize a 2× increase in throughput, a client with 3 antennas will realize a 3× increase in throughput, and so on (i.e., assuming that the spatial and angular separation between the antennas is sufficient). The Base Station may apply the same general rules when cycling through Client Devices with multiple antennas. For example, it may treat each antenna as a separate client and allocate throughput to that "client" as it would any other client (e.g., ensuring that each client is provided with an adequate or equivalent period of communication).

Figure 10:
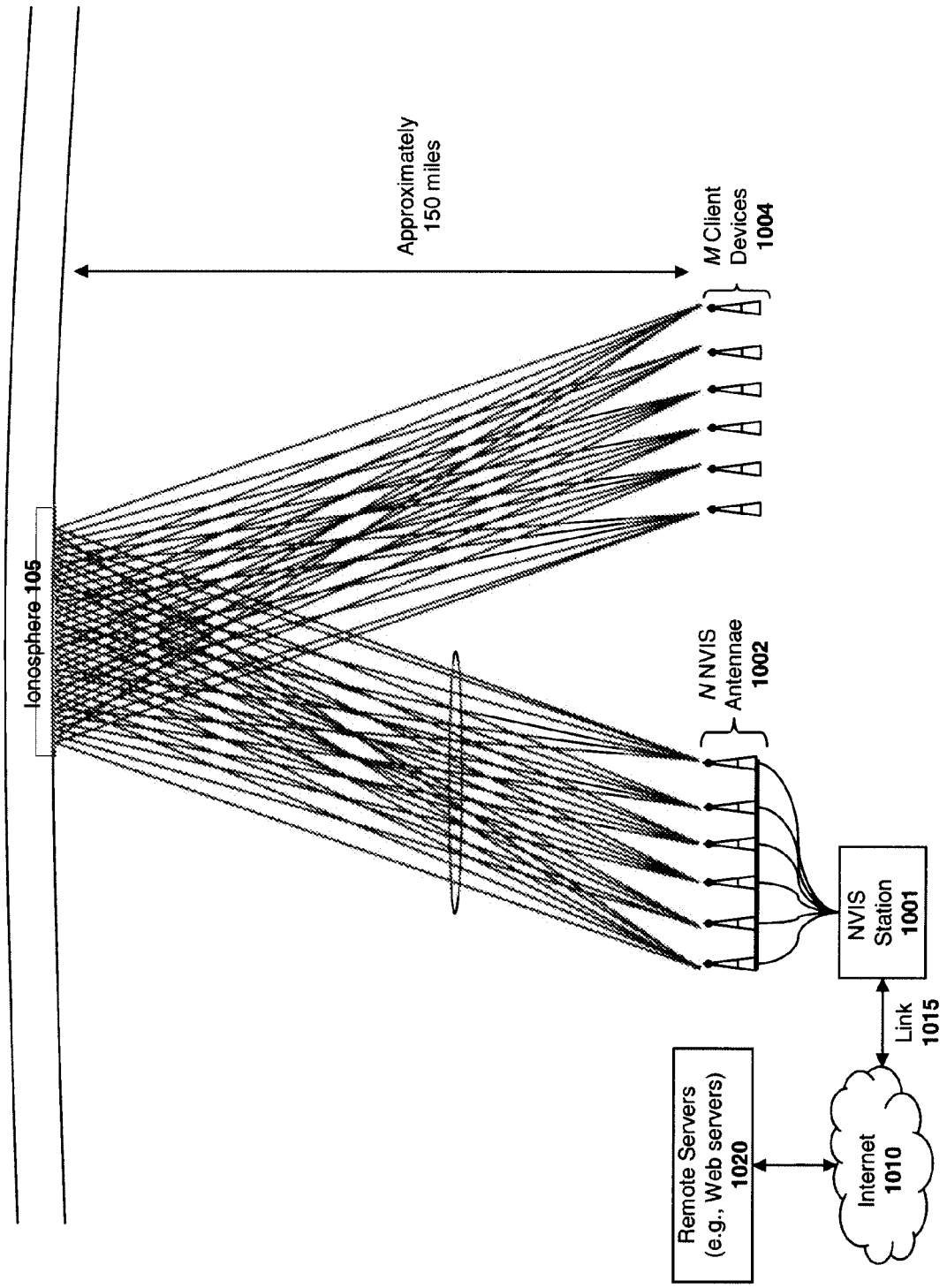
FIG. 10 illustrates an embodiment of the invention employed within an NVIS system.

As mentioned above, one embodiment of the invention employs the MIDO and/or MIMO signal transmission techniques described above to increase the signal-to-noise ratio and throughput within a Near Vertical Incidence Skywave ("NVIS") system. Referring to FIG. 10, in one embodiment of the invention, a first NVIS station 1001 equipped with a matrix of N antennas 1002 is configured to communicate with M client devices 1004. The NVIS antennas 1002 and antennas of the various client devices 1004 transmit signals upward to within about 15 degrees of vertical in order to achieve the desired NVIS and minimize ground wave interference effects. In one embodiment, the antennas 1002 and client devices 1004, support multiple independent data streams 1006 using the various MIDO and MIMO techniques described above at a designated frequency within the NVIS spectrum (e.g., at a carrier frequency at or below 23 MHz, but typically below 10 MHz), thereby significantly increasing the throughput at the designated frequency (i.e., by a factor proportional to the number of statistically independent data streams).

The NVIS antennas serving a given station may be physically very far apart from each other. Given the long wavelengths below 10 MHz and the long distance traveled for the signals (as much as 300 miles round trip), physical separation of the antennas by 100 s of yards, and even miles, can provide advantages in diversity. In such situations, the individual antenna signals may be brought back to a centralized location to be processed using conventional wired or wireless communications systems. Alternatively, each antenna can have a local facility to process its signals, then use conventional wired or wireless communications systems to communicate the data back to a centralized location. In one embodiment of the invention, NVIS Station 1001 has a broadband link 1015 to the Internet 1010 (or other wide area network), thereby providing the client devices 1003 with remote, high speed, wireless network access.

In one embodiment, the Base Station and/or users may exploit polarization/pattern diversity techniques described above to reduce the array size and/or users' distance while providing diversity and increased throughput. As an example, in MIDO systems with HF transmissions, the users may be in the same location and yet their signals be uncorrelated because of polarization/pattern diversity. In particular, by using pattern diversity, one user may be communicating to the Base Station via groundwave whereas the other user via NVIS.

Additional Embodiments of the Invention

I. DIDO-OFDM Precoding with I/Q Imbalance

One embodiment of the invention employs a system and method to compensate for in-phase and quadrature (I/Q) imbalance in distributed-input distributed-output (DIDO) systems with orthogonal frequency division multiplexing (OFDM). Briefly, according to this embodiment, user devices estimate the channel and feedback this information to the Base Station; the Base Station computes the precoding matrix to cancel inter-carrier and inter-user interference caused by I/Q imbalance; and parallel data streams are transmitted to multiple user devices via DIDO precoding; the user devices demodulate data via zero-forcing (ZF), minimum mean-square error (MMSE) or maximum likelihood (ML) receiver to suppress residual interference.

As described in detail below, some of the significant features of this embodiment of the invention include, but are not limited to:

Precoding to cancel inter-carrier interference (ICI) from mirror tones (due to I/Q mismatch) in OFDM systems;

Precoding to cancel inter-user interference and ICI (due to I/Q mismatch) in DIDO-OFDM systems;

Techniques to cancel ICI (due to I/Q mismatch) via ZF receiver in DIDO-OFDM systems employing block diagonalization (BD) precoder;

Techniques to cancel inter-user interference and ICI (due to I/Q mismatch) via precoding (at the transmitter) and a ZF or MMSE filter (at the receiver) in DIDO-OFDM systems;

Techniques to cancel inter-user interference and ICI (due to I/Q mismatch) via pre-coding (at the transmitter) and a non-linear detector like a maximum likelihood (ML) detector (at the receiver) in DIDO-OFDM systems;

The use of pre-coding based on channel state information to cancel inter-carrier interference (ICI) from mirror tones (due to I/Q mismatch) in OFDM systems;

The use of pre-coding based on channel state information to cancel inter-carrier interference (ICI) from mirror tones (due to I/Q mismatch) in DIDO-OFDM systems;

The use of an I/Q mismatch aware DIDO precoder at the station and an IQ-aware DIDO receiver at the user terminal;

The use of an I/Q mismatch aware DIDO precoder at the station, an I/Q aware DIDO receiver at the user terminal, and an I/Q aware channel estimator;

The use of an I/Q mismatch aware DIDO precoder at the station, an I/Q aware DIDO receiver at the user terminal, an I/Q aware channel estimator, and an I/Q aware DIDO feedback generator that sends channel state information from the user terminal to the station;

The use of an I/Q mismatch-aware DIDO precoder at the station and an I/Q aware DIDO configurator that uses I/Q channel information to perform functions including user selection, adaptive coding and modulation, space-time-frequency mapping, or precoder selection;

The use of an I/Q aware DIDO receiver that cancels ICI (due to I/Q mismatch) via ZF receiver in DIDO-OFDM systems employing block diagonalization (BD) precoder;

The use of an I/Q aware DIDO receiver that cancels ICI (due to I/Q mismatch) via pre-coding (at the transmitter) and a nonlinear detector like a maximum likelihood detector (at the receiver) in DIDO-OFDM systems; and The use of an I/Q aware DIDO receiver that cancels ICI (due to I/Q mismatch) via ZF or MMSE filter in DIDO-OFDM systems.

a. Background

The transmit and receive signals of typical wireless communication systems consist of in-phase and quadrature (I/Q) components. In practical systems, the inphase and quadrature components may be distorted due to imperfections in the mixing and baseband operations. These distortions manifest as I/Q phase, gain and delay mismatch. Phase imbalance is caused by the sine and cosine in the modulator/demodulator not being perfectly orthogonal. Gain imbalance is caused by different amplifications between the inphase and quadrature components. There may be an additional distortion, called delay imbalance, due to difference in delays between the I- and Q-rails in the analog circuitry.

In orthogonal frequency division multiplexing (OFDM) systems, I/Q imbalance causes inter-carrier interference (ICI) from the mirror tones. This effect has been studied in the literature and methods to compensate for I/Q mismatch in single-input single-output SISO-OFDM systems have been proposed in M. D. Benedetto and P. Mandarini, "Analysis of the e☐ect of the I/Q baseband filter mismatch in an OFDM modem," Wireless personal communications, pp. 175-186, 2000; S. Schuchert and R. Hasholzner, "A novel I/Q imbalance compensation scheme for the reception of OFDM signals," IEEE Transaction on Consumer Electronics, August 2001; M. Valkama, M. Renfors, and V. Koivunen, "Advanced methods for I/Q imbalance compensation in communication receivers," IEEE Trans. Sig. Proc., October 2001; R. Rao and B. Daneshrad, "Analysis of I/Q mismatch and a cancellation scheme for OFDM systems," IST Mobile Communication Summit, June 2004; A. Tarighat, R. Bagheri, and A. H. Sayed, "Compensation schemes and performance analysis of IQ imbalances in OFDM receivers," Signal Processing, IEEE Transactions on [see also Acoustics, Speech, and Signal Processing, IEEE Transactions on], vol. 53, pp. 3257-3268, August 2005.

An extension of this work to multiple-input multiple-output MIMO-OFDM systems was presented in R. Rao and B. Daneshrad, "I/Q mismatch cancellation for MIMO OFDM systems," in Personal, Indoor and Mobile Radio Communications, 2004; PIMRC 2004. 15th IEEE International Symposium on, vol. 4, 2004, pp. 2710-2714. R. M. Rao, W. Zhu, S. Lang, C. Oberli, D. Browne, J. Bhatia, J. F. Frigon, J. Wang, P; Gupta, H. Lee, D. N. Liu, S. G. Wong, M. Fitz, B. Daneshrad, and O. Takeshita, "Multiantenna testbeds for research and education in wireless communications," IEEE Communications Magazine, vol. 42, no. 12, pp. 72-81, December 2004; S. Lang, M. R. Rao, and B. Daneshrad, "Design and development of a 5.25 GHz software defined wireless OFDM communication platform," IEEE Communications Magazine, vol. 42, no. 6, pp. 6-12, June 2004, for spatial multiplexing (SM) and in A. Tarighat and A. H. Sayed, "MIMO OFDM receivers for systems with IQ imbalances," IEEE Trans. Sig. Proc., vol. 53, pp. 3583-3596, September 2005, for orthogonal space-time block codes (OSTBC).

Unfortunately, there is currently no literature on how to correct for I/Q gain and phase imbalance errors in a distributed-input distributed-output (DIDO) communication system. The embodiments of the invention described below provide a solution to these problems.

DIDO systems consist of one Base Station with distributed antennas that transmits parallel data streams (via pre-coding) to multiple users to enhance downlink throughput, while exploiting the same wireless resources (i.e., same slot duration and frequency band) as conventional SISO systems. A detailed description of DIDO systems was presented in S. G. Perlman and T. Cotter, "System and Method for Distributed Input-Distributed Output Wireless Communications," Ser. No. 10/902,978, filed Jul. 30, 2004 ("Prior Application"), which is assigned to the assignee of the present application and which is incorporated herein by reference.

There are many ways to implement DIDO precoders. One solution is block diagonalization (BD) described in Q. H. Spencer, A. L. Swindlehurst, and M. Haardt, "Zero forcing methods for downlink spatial multiplexing in multiuser MIMO channels," IEEE Trans. Sig. Proc., vol. 52, pp. 461-471, February 2004. K. K. Wong, R. D. Murch, and K. B. Letaief, "A joint channel diagonalization for multiuser MIMO antenna systems," IEEE Trans. Wireless Comm., vol. 2, pp. 773-786, July 2003; L. U. Choi and R. D. Murch, "A transmit preprocessing technique for multiuser MIMO systems using a decomposition approach," IEEE Trans. Wireless Comm., vol. 3, pp. 20-24, January 2004; Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005; Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005; R. Chen, R. W. Heath, and J. G. Andrews, "Transmit selection diversity for unitary precoded multiuser spatial multiplexing systems with linear receivers," accepted to IEEE Trans. on Signal Processing, 2005. The methods for I/Q compensation presented in this document assume BD precoder, but can be extended to any type of DIDO precoder.

In DIDO-OFDM systems, I/Q mismatch causes two effects: ICI and inter-user interference. The former is due to interference from the mirror tones as in SISO-OFDM systems. The latter is due to the fact that I/Q mismatch destroys the orthogonality of the DIDO precoder yielding interference across users. Both of these types of interference can be cancelled at the transmitter and receiver through the methods described herein. Three methods for I/Q compensation in DIDO-OFDM systems are described and their performance is compared against systems with and without I/Q mismatch. Results are presented based both on simulations and practical measurements carried out with the DIDO-OFDM prototype.

The present embodiments are an extension of the Prior Application. In particular, these embodiments relate to the following features of the Prior Application:

The system as described in the prior application, where the I/Q rails are affected by gain and phase imbalance;

The training signals employed for channel estimation are used to calculate the DIDO precoder with I/Q compensation at the transmitter; and The signal characterization data accounts for distortion due to I/Q imbalance and is used at the transmitter to compute the DIDO precoder according to the method proposed in this document.

b. Embodiments of the Invention

First, the mathematical model and framework of the invention will be described.

Before presenting the solution, it is useful to explain the core mathematical concept. We explain it assuming I/Q gain and phase imbalance (phase delay is not included in the description but is dealt with automatically in the DIDO-OFDM version of the algorithm). To explain the basic idea, suppose that we want to multiply two complex numbers $s=s_I+js_Q$ and $h=h_I+jh_Q$ and let $x=h*s$. We use the subscripts to denote inphase and quadrature components. Recall that $$x_I = s_I h_I - s_Q h_Q$$

and $$x_Q = s_I h_Q + s_Q h_I.$$

In matrix form this can be rewritten as $$\begin{bmatrix} x_I \\ x_Q \end{bmatrix} = \begin{bmatrix} h_I & -h_Q \\ h_Q & h_I \end{bmatrix} \begin{bmatrix} s_I \\ s_Q \end{bmatrix}.$$

Note the unitary transformation by the channel matrix (H). Now suppose that s is the transmitted symbol and h is the channel. The presence of I/Q gain and phase imbalance can be modeled by creating a non-unitary transformation as follows $$\begin{bmatrix} x_I \\ x_Q \end{bmatrix} = \begin{bmatrix} h_{11} & h_{12} \\ h_{21} & h_{22} \end{bmatrix} \begin{bmatrix} s_I \\ s_Q \end{bmatrix}. \tag{A}$$

The trick is to recognize that it is possible to write $$\begin{bmatrix} h_{11} & h_{12} \\ h_{21} & h_{22} \end{bmatrix} = \frac{1}{2}\begin{bmatrix} h_{11}+h_{22} & h_{12}-h_{21} \\ -(h_{12}-h_{21}) & h_{11}+h_{22} \end{bmatrix} +$$

$$\frac{1}{2}\begin{bmatrix} h_{11}-h_{22} & h_{12}+h_{21} \\ h_{12}+h_{21} & h_{22}-h_{11} \end{bmatrix}$$

$$= \frac{1}{2}\begin{bmatrix} h_{11}+h_{22} & h_{12}-h_{21} \\ -(h_{12}-h_{21}) & h_{11}+h_{22} \end{bmatrix} +$$

$$\frac{1}{2}\begin{bmatrix} h_{11}-h_{22} & -(h_{12}+h_{21}) \\ h_{12}+h_{21} & h_{11}-h_{22} \end{bmatrix}\begin{bmatrix} 1 & 0 \\ 0 & -1 \end{bmatrix}.$$

Now, rewriting (A)

$$\begin{bmatrix} x_I \\ x_Q \end{bmatrix} = \frac{1}{2}\begin{bmatrix} h_{11}+h_{22} & h_{12}-h_{21} \\ -(h_{12}-h_{21}) & h_{11}+h_{22} \end{bmatrix}\begin{bmatrix} s_I \\ s_Q \end{bmatrix} + \tag{5}$$

$$\frac{1}{2}\begin{bmatrix} h_{11}-h_{22} & -(h_{12}+h_{21}) \\ h_{12}+h_{21} & h_{11}-h_{22} \end{bmatrix}\begin{bmatrix} 1 & 0 \\ 0 & -1 \end{bmatrix}\begin{bmatrix} s_I \\ s_Q \end{bmatrix}$$

$$= \frac{1}{2}\begin{bmatrix} h_{11}+h_{22} & h_{12}-h_{22} \\ -(h_{12}-h_{21}) & h_{11}+h_{22} \end{bmatrix}\begin{bmatrix} s_I \\ s_Q \end{bmatrix} +$$

$$\frac{1}{2}\begin{bmatrix} h_{11}-h_{22} & -(h_{12}+h_{21}) \\ h_{12}+h_{21} & h_{11}-h_{22} \end{bmatrix}\begin{bmatrix} s_I \\ s_Q \end{bmatrix}$$

Let us define $$\mathcal{H}_e = \frac{1}{2}\begin{bmatrix} h_{11}+h_{22} & h_{12}-h_{21} \\ -(h_{12}-h_{21}) & h_{11}+h_{22} \end{bmatrix}$$

and $$\mathcal{H}_e = \frac{1}{2}\begin{bmatrix} h_{11}-h_{22} & -(h_{12}+h_{21}) \\ h_{12}+h_{21} & h_{11}-h_{22} \end{bmatrix}.$$

Both of these matrices have a unitary structure thus can be equivalently represented by complex scalars as $$h_e = h_{11} + h_{22} + j(h_{21} - h_{12})$$

and $$h_c = h_{11} - h_{22} + j(h_{21} + h_{12}).$$

Using all of these observations, we can put the effective equation back in a scalar form with two channels: the equivalent channel $h_e$ and the conjugate channel $h_c$. Then the effective transformation in (5) becomes $$x = h_e s + h_c s^*.$$

We refer to the first channel as the equivalent channel and the second channel as the conjugate channel. The equivalent channel is the one you would observe if there were no I/Q gain and phase imbalance.

Using similar arguments, it can be shown that the input-output relationship of a discrete-time MIMO N×M system with I/Q gain and phase imbalance is (using the scalar equivalents to build their matrix counterparts)

$$x[t] = \sum_{l=0}^{L} h_e[l]s[t-l] + h_c[l]s^*[t-l]$$

where t is the discrete time index, $h_e$, $h_c \in C^{M \times N}$, $s = [s_1, \ldots, s_N]$, $x = [x_1, \ldots, x_M]$ and L is the number of channel taps.

In DIDO-OFDM systems, the received signal in the frequency domain is represented. Recall from signals and systems that if $$FFT_K\{s[t]\} = S[k] \text{ then } FFT_K\{s^*[t]\} = S^*[(-k)] = S^*[K-k] \text{ for } k = 0, 1, \ldots, K-1.$$

With OFDM, the equivalent input-output relationship for a MIMO-OFDM system for subcarrier k is $$\bar{x}[k] = H_e[k]\bar{s}[k] + H_c[k]\bar{s}^*[K-k] \quad (1)$$

where $k = 0, 1, \ldots, K-1$ is the OFDM subcarrier index, $H_e$ and $H_c$ denote the equivalent and conjugate channel matrices, respectively, defined as $$H_e[k] = \sum_{l=0}^{L} h_e[l] e^{-j\frac{2\Pi k}{K}l}$$

and $$H_c[k] = \sum_{l=0}^{L} h_c[l] e^{-j\frac{2\Pi k}{K}l}.$$

The second contribution in (1) is interference from the mirror tone. It can be dealt with by constructing the following stacked matrix system (note carefully the conjugates)

$$\begin{bmatrix} \bar{x}[k] \\ \bar{x}^*[K-k] \end{bmatrix} = \begin{bmatrix} H_e[k] & H_c[k] \\ H_c^*[K-k] & H_e^*[K-k] \end{bmatrix} \begin{bmatrix} \bar{s}[k] \\ \bar{s}^*[K-k] \end{bmatrix}$$

where $\bar{s} = [\bar{s}_1, \bar{s}_2]^T$ and $\bar{x} = [\bar{x}_1, \bar{x}_2]^T$ are the vectors of transmit and receive symbols in the frequency domain, respectively.

Using this approach, an effective matrix is built to use for DIDO operation. For example, with DIDO 2×2 the input-output relationship (assuming each user has a single receive antenna) the first user device sees (in the absence of noise)

$$\begin{bmatrix} \bar{x}_1[k] \\ \bar{x}_1^*[K-k] \end{bmatrix} = \begin{bmatrix} H_e^{(1)}[k] & H_c^{(1)}[k] \\ H_c^{(1)*}[K-k] & H_e^{(1)*}[K-k] \end{bmatrix} W \begin{bmatrix} \bar{s}_1[k] \\ \bar{s}_1^*[K-k] \\ \bar{s}_2[k] \\ \bar{s}_2^*[K-k] \end{bmatrix} \quad (2)$$

while the second user observes $$\begin{bmatrix} \bar{x}_2[k] \\ \bar{x}_2^*[K-k] \end{bmatrix} = \begin{bmatrix} H_e^{(2)}[k] & H_c^{(2)}[k] \\ H_c^{(2)*}[K-k] & H_e^{(2)*}[K-k] \end{bmatrix} W \begin{bmatrix} \bar{s}_1[k] \\ \bar{s}_1^*[K-k] \\ \bar{s}_2[k] \\ \bar{s}_2^*[K-k] \end{bmatrix} \quad (3)$$

where $H_e^{(m)}, H_c^{(m)} \in C^{1 \times 2}$ denote the m-th row of the matrices $H_e$ and $H_c$, respectively, and $W \in C^{4 \times 4}$ is the DIDO pre-coding matrix. From (2) and (3) it is observed that the received symbol $\bar{x}_m[k]$ of user m is affected by two sources of interference caused by I/Q imbalance: inter-carrier interference from the mirror tone (i.e., $\bar{s}^*_m[K-k]$) and inter-user interference (i.e., $\bar{s}_p[k]$ and $\bar{s}^*_p[K-k]$ with $p \neq m$). The DIDO precoding matrix W in (3) is designed to cancel these two interference terms.

There are several different embodiments of the DIDO precoder that can be used here depending on joint detection applied at the receiver. In one embodiment, block diagonalization (BD) is employed (see, e.g., Q. H. Spencer, A. L. Swindlehurst, and M. Haardt, "Zeroforcing methods for downlink spatial multiplexing in multiuser MIMO channels," IEEE Trans. Sig. Proc., vol. 52, pp. 461-471, February 2004. K. K. Wong, R. D. Murch, and K. B. Letaief, "A joint-channel diagonalization for multiuser MIMO antenna systems," IEEE Trans. Wireless Comm., vol. 2, pp. 773-786, July 2003. L. U. Choi and R. D. Murch, "A transmit preprocessing technique for multiuser MIMO systems using a decomposition approach," IEEE Trans. Wireless Comm., vol. 3, pp. 20-24, January 2004. Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005. Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005, computed from the composite channel $[H_e^{(m)}, H_c^{(m)}]$ (rather than $H_e^{(m)}$). So, the current DIDO system chooses the precoder such that $$H_w \triangleq \begin{bmatrix} H_e^{(1)}[k] & H_c^{(1)}[k] \\ H_c^{(1)*}[K-k] & H_e^{(1)*}[K-k] \\ H_e^{(2)}[k] & H_c^{(2)}[k] \\ H_c^{(2)*}[K-k] & H_e^{(2)*}[K-k] \end{bmatrix} \quad (4)$$

$$W = \begin{bmatrix} \alpha_{1,1} & 0 & 0 & 0 \\ 0 & \alpha_{1,2} & 0 & 0 \\ 0 & 0 & \alpha_{2,1} & 0 \\ 0 & 0 & 0 & \alpha_{2,2} \end{bmatrix}$$

$$\triangleq \begin{bmatrix} H_w^{(1,1)} & H_w^{(1,2)} \\ H_w^{(2,1)} & H_w^{(2,2)} \end{bmatrix}$$

where $\alpha_{i,j}$ are constants and $H_w^{(i,j)} \in C^{2 \times 2}$. This method is beneficial because using this precoder, it is possible to keep other aspects of the DIDO precoder the same as before, since the effects of I/Q gain and phase imbalance are completely cancelled at the transmitter.

It is also possible to design DIDO precoders that pre-cancel inter-user interference, without pre-cancelling ICI due to IQ imbalance. With this approach, the receiver (instead of the transmitter) compensates for the IQ imbalance by employing one of the receive filters described below. Then, the pre-coding design criterion in (4) can be modified as $$H_w \triangleq \begin{bmatrix} H_e^{(1)}[k] & H_c^{(1)}[k] \\ H_c^{(1)*}[K-k] & H_e^{(1)*}[K-k] \\ H_e^{(2)}[k] & H_c^{(2)}[k] \\ H_c^{(2)*}[K-k] & H_e^{(2)*}[K-k] \end{bmatrix} \quad (5)$$

$$W = \begin{bmatrix} \alpha_{1,1} & \alpha_{1,2} & 0 & 0 \\ \alpha_{2,1} & \alpha_{2,2} & 0 & 0 \\ 0 & 0 & \alpha_{3,3} & \alpha_{3,4} \\ 0 & 0 & \alpha_{4,3} & \alpha_{4,4} \end{bmatrix}$$

$$\triangleq \begin{bmatrix} H_w^{(1,1)} & H_w^{(1,2)} \\ H_w^{(2,1)} & H_w^{(2,2)} \end{bmatrix}$$

$$\bar{x}_1[k] = [H_w^{(1,1)} \quad H_w^{(1,2)}] \begin{bmatrix} \bar{s}_1[k] \\ \bar{s}_2[k] \end{bmatrix} \quad (6)$$

and $$\bar{x}_2[k] = [H_w^{(2,1)} \quad H_w^{(2,2)}] \begin{bmatrix} \bar{s}_1[k] \\ \bar{s}_2[k] \end{bmatrix} \quad (7)$$

where $\bar{s}_m[k] = [\bar{s}_m[k], \bar{s}^*_m[K-k]]^T$ for the m-th transmit symbol and $\bar{x}_m[k] = [\bar{x}_m[k], \bar{x}^*_m[K-k]]^T$ is the receive symbol vector for user m.

At the receive side, to estimate the transmit symbol vector $\bar{s}_m[k]$, user m employs ZF filter and the estimated symbol vector is given by $$\hat{s}_m^{(ZF)}[k] = [(H_w^{(m,m)\dagger} H_w^{(m,m)})^{-1} H_w^{(m,m)\dagger}] \bar{x}_m[k] \quad (8)$$

While the ZF filter is the easiest to understand, the receiver may apply any number of other filters known to those skilled in the art. One popular choice is the MMSE filter where $$\hat{s}_m^{(MMSE)}[k] = (H_w^{(m,m)\dagger} + \rho^{-1}I)^{-1} H_w^{(m,m)} H_w^{(m,m)\dagger} \bar{x}_m[k] \quad (9)$$

and ρ is the signal-to-noise ratio. Alternatively, the receiver may perform a maximum likelihood symbol detection (or sphere decoder or iterative variation). For example, the first user might use the ML receiver and solve the following optimization $$\hat{s}_m^{(ML)}[k] = \arg\min_{s_1, s_2 \in S} \left\| \bar{y}_1[k] - [H_w^{(1,1)} \quad H_w^{(1,2)}] \begin{bmatrix} s_1[k] \\ s_2[k] \end{bmatrix} \right\| \quad (10)$$

where S is the set of all possible vectors s and depends on the constellation size. The ML receiver gives better performance at the expense of requiring more complexity at the receiver. A similar set of equations applies for the second user.

Note that $H_w^{(1,2)}$ and $H_w^{(2,1)}$ in (6) and (7) are assumed to have zero entries. This assumption holds only if the transmit precoder is able to cancel completely the inter-user interference as for the criterion in (4). Similarly, $H_w^{(1,1)}$ and $H_w^{(2,2)}$ are diagonal matrices only if the transmit precoder is able to cancel completely the inter-carrier interference (i.e., from the mirror tones).

Figure 13:
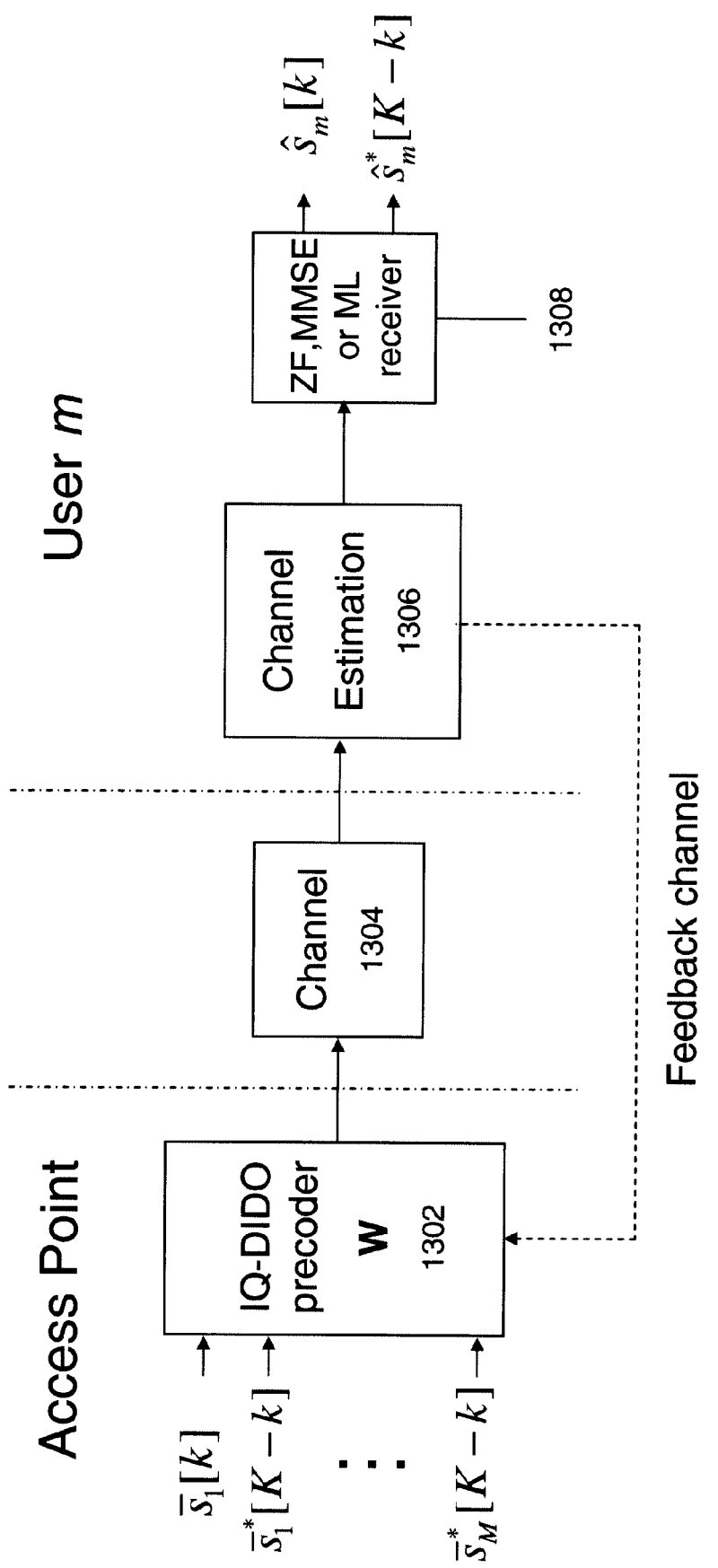
FIG. 13 illustrates one embodiment of DIDO-OFDM systems with I/Q compensation.

FIG. 13 illustrates one embodiment of a framework for DIDO-OFDM systems with I/Q compensation including IQ-DIDO precoder 1302 within a Base Station (BS), a transmission channel 1304, channel estimation logic 1306 within a user device, and a ZF, MMSE or ML receiver 1308. The channel estimation logic 1306 estimates the channels $H_e^{(m)}$ and $H_c^{(m)}$ via training symbols and feedbacks these estimates to the precoder 1302 within the AP. The BS computes the DIDO precoder weights (matrix W) to pre-cancel the interference due to I/Q gain and phase imbalance as well as inter-user interference and transmits the data to the users through the wireless channel 1304. User device m employs the ZF, MMSE or ML receiver 1308, by exploiting the channel estimates provided by the unit 1304, to cancel residual interference and demodulates the data.

The following three embodiments may be employed to implement this I/Q compensation algorithm:

Method 1—TX compensation: In this embodiment, the transmitter calculates the pre-coding matrix according to the criterion in (4). At the receiver, the user devices employ a "simplified" ZF receiver, where $H_w^{(1,1)}$ and $H_w^{(2,2)}$ are assumed to be diagonal matrices. Hence, equation (8) simplifies as $$\hat{s}_m[k] = \begin{bmatrix} 1/\alpha_{m,1} & 0 \\ 0 & 1/\alpha_{m,2} \end{bmatrix} \bar{x}_m[k]. \quad (10)$$

Method 2—RX compensation: In this embodiment, the transmitter calculates the pre-coding matrix based on the conventional BD method described in R. Chen, R. W. Heath, and J. G. Andrews, "Transmit selection diversity for unitary precoded multiuser spatial multiplexing systems with linear receivers," accepted to IEEE Trans. on Signal Processing, 2005, without canceling inter-carrier and inter-user interference as for the criterion in (4). With this method, the pre-coding matrix in (2) and (3) simplifies as $$W = \begin{bmatrix} w_{1,1}[k] & 0 & w_{1,2}[k] & 0 \\ 0 & w_{1,1}^*[K-k] & 0 & w_{1,2}^*[K-k] \\ w_{2,1}[k] & 0 & w_{2,2}[k] & 0 \\ 0 & w_{2,1}^*[K-k] & 0 & w_{2,2}^*[K-k] \end{bmatrix}. \quad (12)$$

At the receiver, the user devices employ a ZF filter as in (8). Note that this method does not pre-cancel the interference at the transmitter as in the method 1 above. Hence, it cancels the inter-carrier interference at the receiver, but it is not able to cancel the inter-user interference. Moreover, in method 2 the users only need to feedback the vector $H_e^{(m)}$ for the transmitter to compute the DIDO precoder, as opposed to method 1 that requires feedback of both $H_e^{(m)}$ and $H_c^{(m)}$. Therefore, method 2 is particularly suitable for DIDO systems with low rate feedback channels. On the other hand, method 2 requires slightly higher computational complexity at the user device to compute the ZF receiver in (8) rather than (11).

Method 3—TX-RX compensation: In one embodiment, the two methods described above are combined. The transmitter calculates the pre-coding matrix as in (4) and the receivers estimate the transmit symbols according to (8).

I/Q imbalance, whether phase imbalance, gain imbalance, or delay imbalance, creates a deleterious degradation in signal quality in wireless communication systems. For this reason, circuit hardware in the past was designed to have very low imbalance. As described above, however, it is possible to correct this problem using digital signal processing in the form of transmit pre-coding and/or a special receiver. One embodiment of the invention comprises a system with several new functional units, each of which is important for the implementation of I/Q correction in an OFDM communication system or a DIDO-OFDM communication system.

Figure 11:
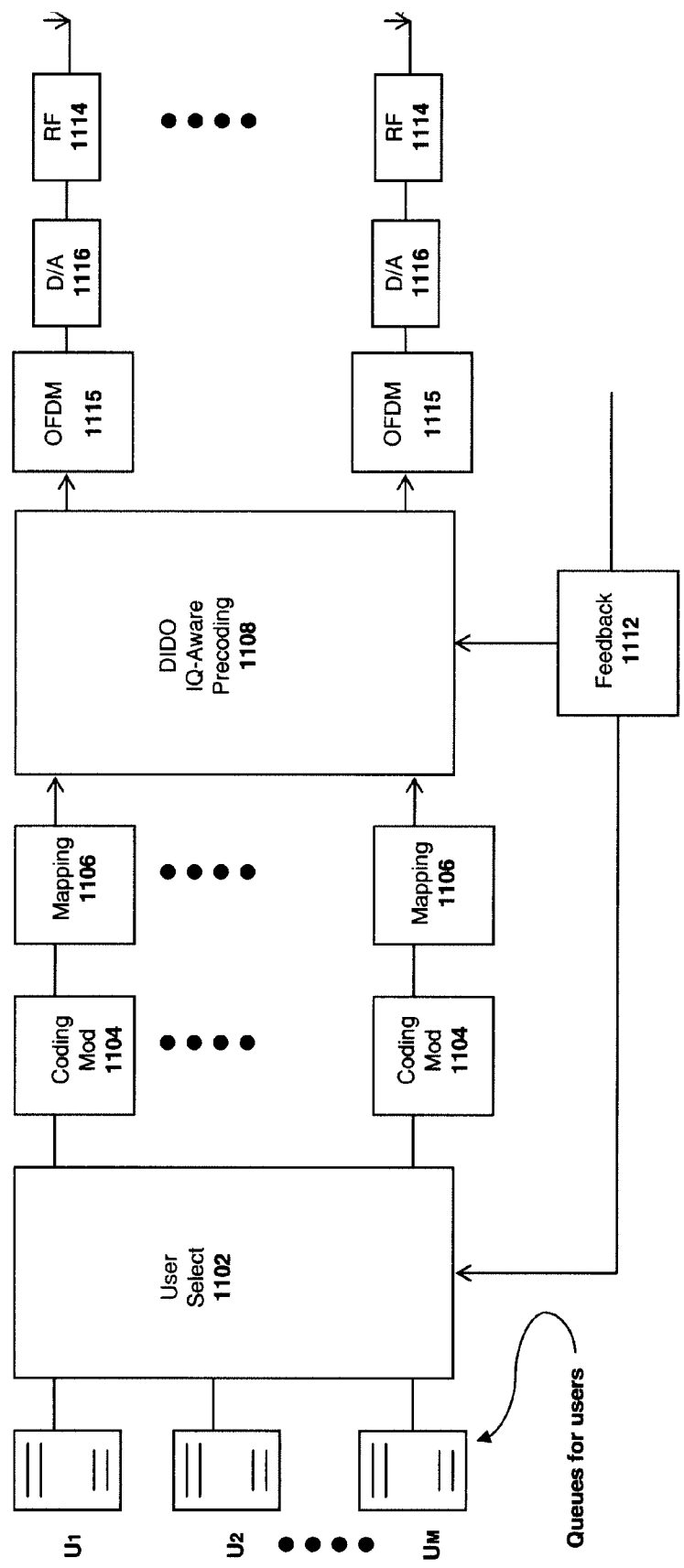
FIG. 11 illustrates an embodiment of the DIDO transmitter with I/Q compensation functional units.

One embodiment of the invention uses pre-coding based on channel state information to cancel inter-carrier interference (ICI) from mirror tones (due to I/Q mismatch) in an OFDM system. As illustrated in FIG. 11, a DIDO transmitter according to this embodiment includes a user selector unit 1102, a plurality of coding modulation units 1104, a corresponding plurality of mapping units 1106, a DIDO IQ-aware precoding unit 1108, a plurality of RF transmitter units 1114, a user feedback unit 1112 and a DIDO configurator unit 1110.

The user selector unit 1102 selects data associated with a plurality of users $U_1$-$U_M$, based on the feedback information obtained by the feedback unit 1112, and provides this information each of the plurality of coding modulation units 1104. Each coding modulation unit 1104 encodes and modulates the information bits of each user and send them to the mapping unit 1106. The mapping unit 1106 maps the input bits to complex symbols and sends the results to the DIDO IQ-aware precoding unit 1108. The DIDO IQ-aware precoding unit 1108 exploits the channel state information obtained by the feedback unit 1112 from the users to compute the DIDO IQ-aware precoding weights and precoding the input symbols obtained from the mapping units 1106. Each of the precoded data streams is sent by the DIDO IQ-aware precoding unit 1108 to the OFDM unit 1115 that computes the IFFT and adds the cyclic prefix. This information is sent to the D/A unit 1116 that operates the digital to analog conversion and send it to the RF unit 1114. The RF unit 1114 upconverts the baseband signal to intermediate/radio frequency and send it to the transmit antenna.

The precoder operates on the regular and mirror tones together for the purpose of compensating for I/Q imbalance. Any number of precoder design criteria may be used including ZF, MMSE, or weighted MMSE design. In a preferred embodiment, the precoder completely removes the ICI due to I/Q mismatch thus resulting in the receiver not having to perform any additional compensation.

In one embodiment, the precoder uses a block diagonalization criterion to completely cancel inter-user interference while not completely canceling the I/Q effects for each user, requiring additional receiver processing. In another embodiment, the precoder uses a zero-forcing criterion to completely cancel both inter-user interference and ICI due to I/Q imbalance. This embodiment can use a conventional DIDO-OFDM processor at the receiver.

Figure 12:
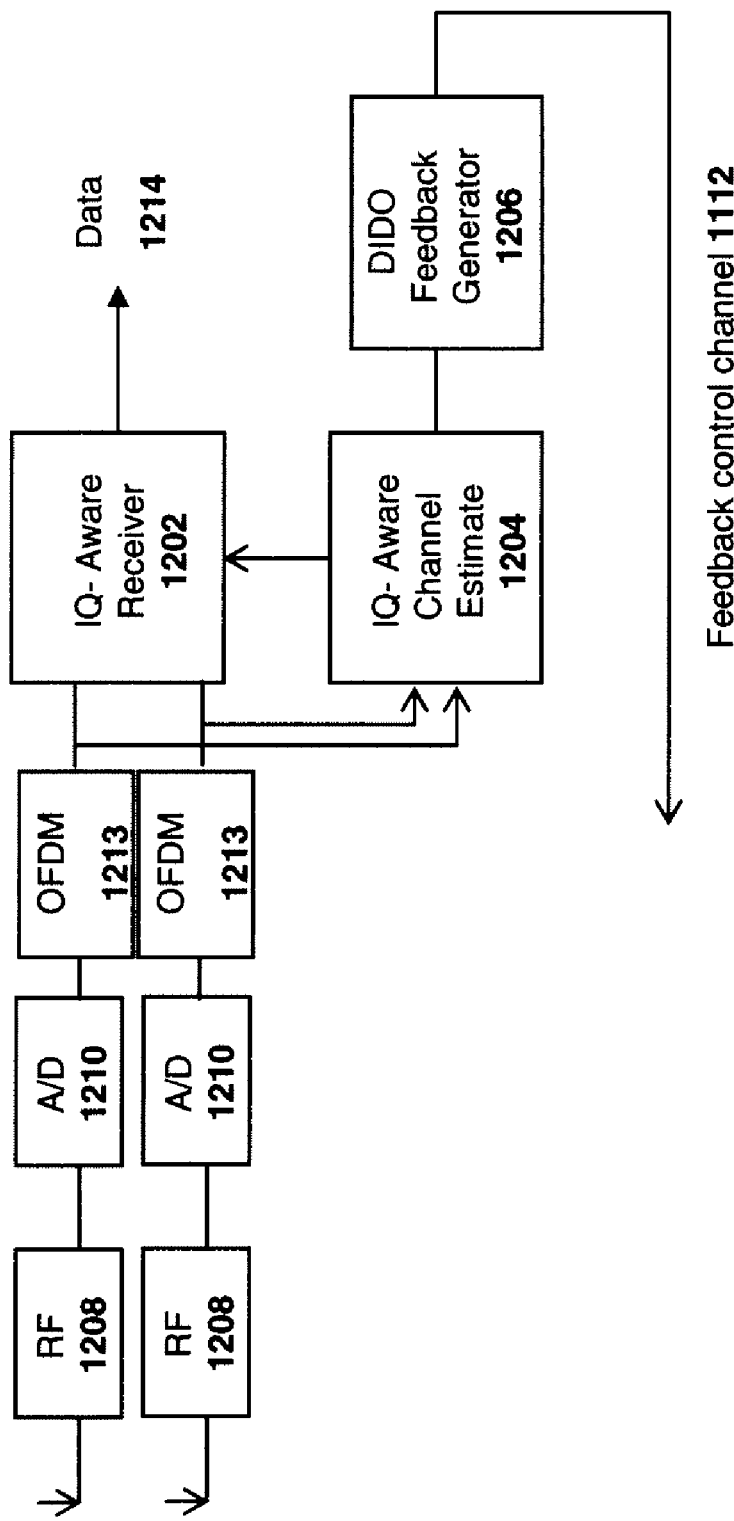
FIG. 12 a DIDO receiver with I/Q compensation functional units.

One embodiment of the invention uses pre-coding based on channel state information to cancel inter-carrier interference (ICI) from mirror tones (due to I/Q mismatch) in a DIDO-OFDM system and each user employs an IQ-aware DIDO receiver. As illustrated in FIG. 12, in one embodiment of the invention, a system including the receiver 1202 includes a plurality of RF units 1208, a corresponding plurality of A/D units 1210, an IQ-aware channel estimator unit 1204 and a DIDO feedback generator unit 1206.

The RF units 1208 receive signals transmitted from the DIDO transmitter units 1114, downconverts the signals to baseband and provide the downconverted signals to the A/D units 1210. The A/D units 1210 then convert the signal from analog to digital and send it to the OFDM units 1213. The OFDM units 1213 remove the cyclic prefix and operates the FFT to report the signal to the frequency domain. During the training period the OFDM units 1213 send the output to the IQ-aware channel estimate unit 1204 that computes the channel estimates in the frequency domain. Alternatively, the channel estimates can be computed in the time domain. During the data period the OFDM units 1213 send the output to the IQ-aware receiver unit 1202. The IQ-aware receiver unit 1202 computes the IQ receiver and demodulates/decodes the signal to obtain the data 1214. The IQ-aware channel estimate unit 1204 sends the channel estimates to the DIDO feedback generator unit 1206 that may quantize the channel estimates and send it back to the transmitter via the feedback control channel 1112.

The receiver 1202 illustrated in FIG. 12 may operate under any number of criteria known to those skilled in the art including ZF, MMSE, maximum likelihood, or MAP receiver. In one preferred embodiment, the receiver uses an MMSE filter to cancel the ICI caused by IQ imbalance on the mirror tones. In another preferred embodiment, the receiver uses a nonlinear detector like a maximum likelihood search to jointly detect the symbols on the mirror tones. This method has improved performance at the expense of higher complexity.

In one embodiment, an IQ-aware channel estimator 1204 is used to determine the receiver coefficients to remove ICI. Consequently we claim a DIDO-OFDM system that uses pre-coding based on channel state information to cancel inter-carrier interference (ICI) from mirror tones (due to I/Q mismatch), an IQ-aware DIDO receiver, and an IQ-aware channel estimator. The channel estimator may use a conventional training signal or may use specially constructed training signals sent on the inphase and quadrature signals. Any number of estimation algorithms may be implemented including least squares, MMSE, or maximum likelihood. The IQ-aware channel estimator provides an input for the IQ-aware receiver.

Channel state information can be provided to the station through channel reciprocity or through a feedback channel. One embodiment of the invention comprises a DIDO-OFDM system, with I/Q-aware precoder, with an I/Q-aware feedback channel for conveying channel state information from the user terminals to the station. The feedback channel may be a physical or logical control channel. It may be dedicated or shared, as in a random access channel. The feedback information may be generated using a DIDO feedback generator at the user terminal, which we also claim. The DIDO feedback generator takes as an input the output of the I/Q aware channel estimator. It may quantize the channel coefficients or may use any number of limited feedback algorithms known in the art.

The allocation of users, modulation and coding rate, mapping to space-time-frequency code slots may change depending on the results of the DIDO feedback generator. Thus, one embodiment comprises an IQ-aware DIDO configurator that uses an IQ-aware channel estimate from one or more users to configure the DIDO IQ-aware precoder, choose the modulation rate, coding rate, subset of users allowed to transmit, and their mappings to space-time-frequency code slots.

To evaluate the performance of the proposed compensation methods, three DIDO 2×2 systems will be compared:

1. With I/Q mismatch: transmit over all the tones (except DC and edge tones), without compensation for I/Q mismatch;
2. With I/Q compensation: transmit over all the tones and compensate for I/Q mismatch by using the "method 1" described above;
3. Ideal: transmit data only over the odd tones to avoid inter-user and inter-carrier (i.e., from the mirror tones) interference caused to I/Q mismatch.

Figure 14:
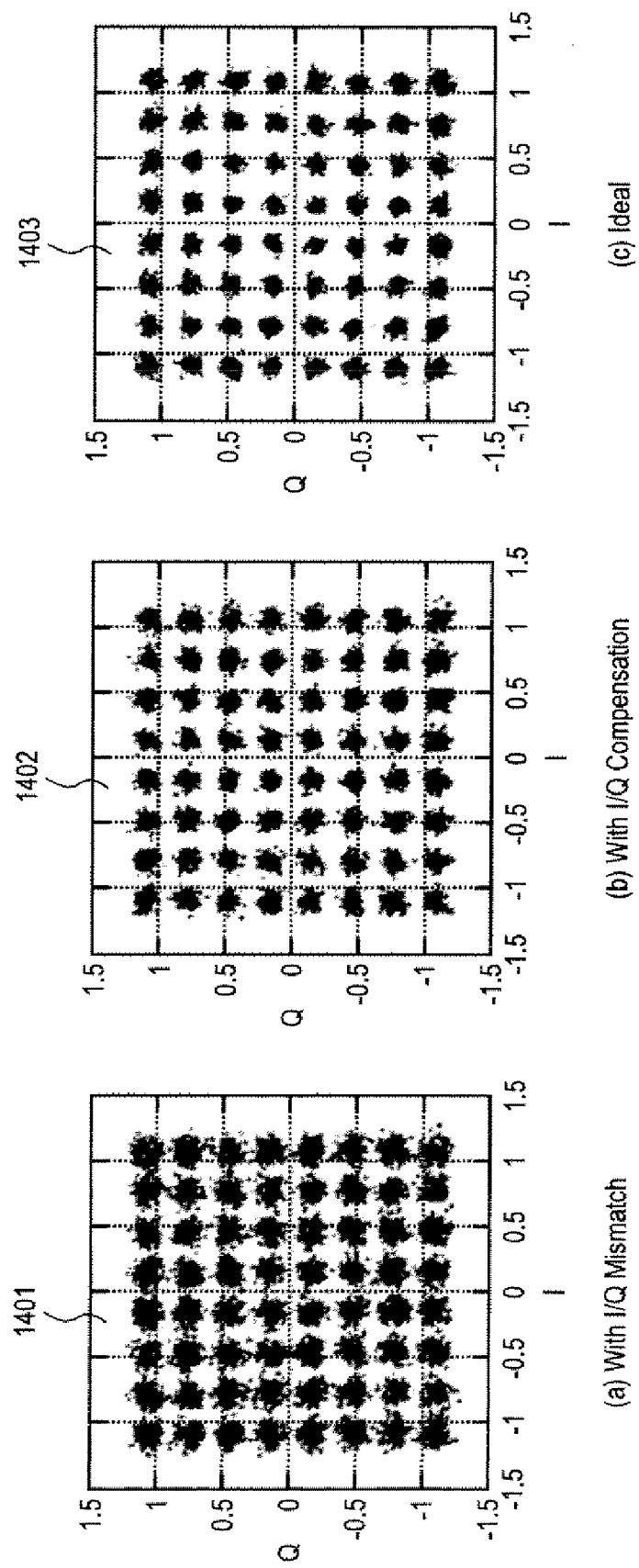
FIG. 14 illustrates one embodiment of DIDO 2×2 performance with and without I/Q compensation.

Hereafter, results obtained from measurements with the DIDO-OFDM prototype in real propagation scenarios are presented. FIG. 14 depicts the 64-QAM constellations obtained from the three systems described above. These constellations are obtained with the same users' locations and fixed average signal-to-noise ratio (~45 dB). The first constellation 1401 is very noisy due to interference from the mirror tones caused by I/Q imbalance. The second constellation 1402 shows some improvements due to I/Q compensations. Note that the second constellation 1402 is not as clean as the ideal case shown as constellation 1403 due to possible phase noise that yields inter-carrier interference (ICI).

Figure 15:
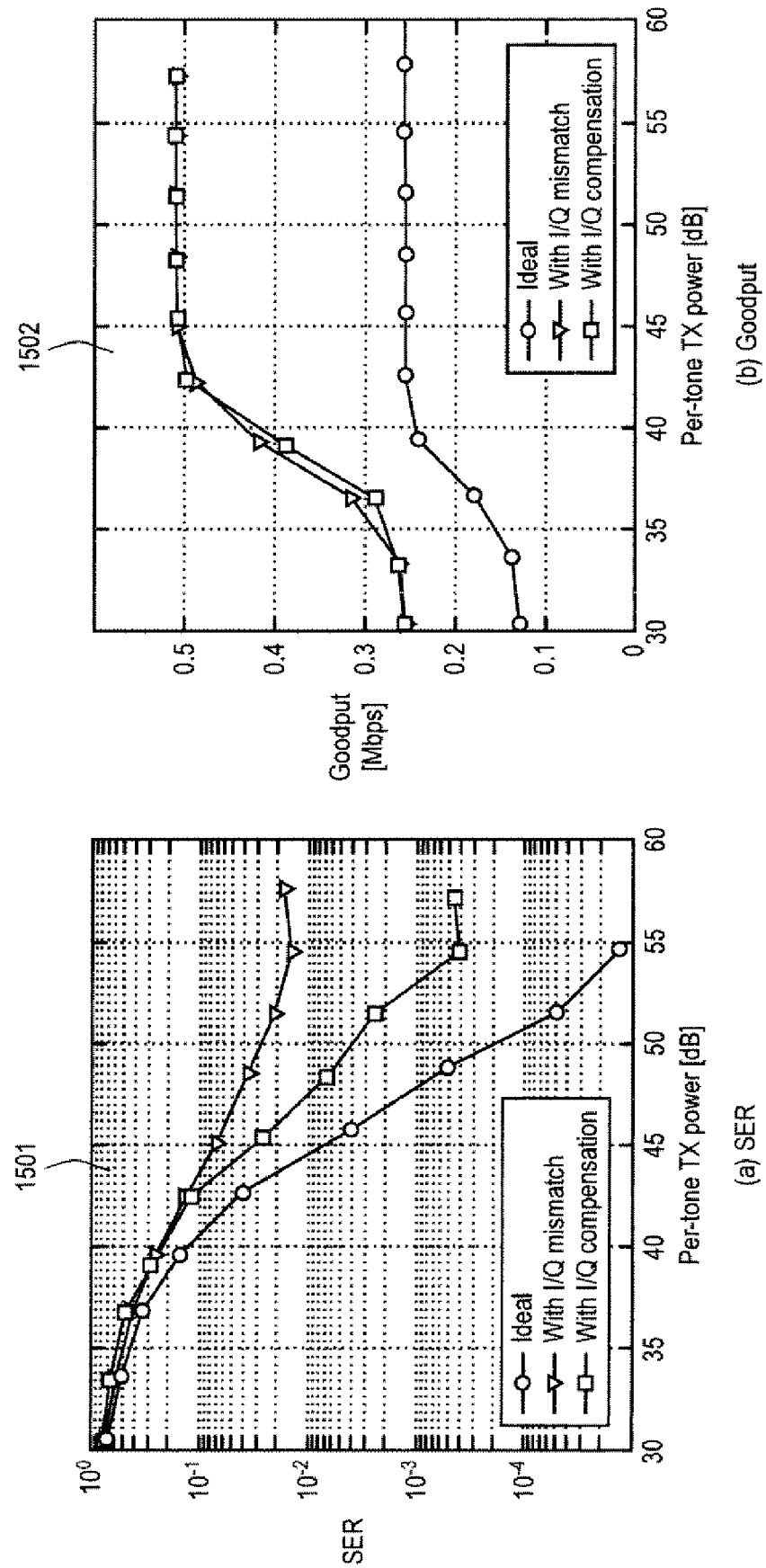
FIG. 15 illustrates one embodiment of DIDO 2×2 performance with and without I/Q compensation.

FIG. 15 shows the average SER (Symbol Error Rate) 1501 and per-user goodput 1502 performance of DIDO 2×2 systems with 64-QAM and coding rate ¾, with and without I/Q mismatch. The OFDM bandwidth is 250 KHz, with 64 tones and cyclic prefix length $L_{cp}=4$. Since in the ideal case we transmit data only over a subset of tones, SER and goodput performance is evaluated as a function of the average per-tone transmit power (rather than total transmit power) to guarantee a fair comparison across different cases. Moreover, in the following results, we use normalized values of transmit power (expressed in decibel), since our goal here is to compare the relative (rather than absolute) performance of different schemes. FIG. 15 shows that in presence of I/Q imbalance the SER saturates, without reaching the target SER ($\sim 10^{-2}$), consistently to the results reported in A. Tarighat and A. H. Sayed, "MIMO OFDM receivers for systems with IQ imbalances," IEEE Trans. Sig. Proc., vol. 53, pp. 3583-3596, September 2005. This saturation effect is due to the fact that both signal and interference (from the mirror tones) power increase as the TX power increases. Through the proposed I/Q compensation method, however, it is possible to cancel the interference and obtain better SER performance. Note that the slight increase in SER at high SNR is due to amplitude saturation effects in the DAC, due to the larger transmit power required for 64-QAM modulations.

Moreover, observe that the SER performance with I/Q compensation is very close to the ideal case. The 2 dB gap in TX power between these two cases is due to possible phase noise that yields additional interference between adjacent OFDM tones. Finally, the goodput curves 1502 show that it is possible to transmit twice as much data when the I/Q method is applied compared to the ideal case, since we use all the data tones rather than only the odd tones (as for the ideal case).

Figure 16:
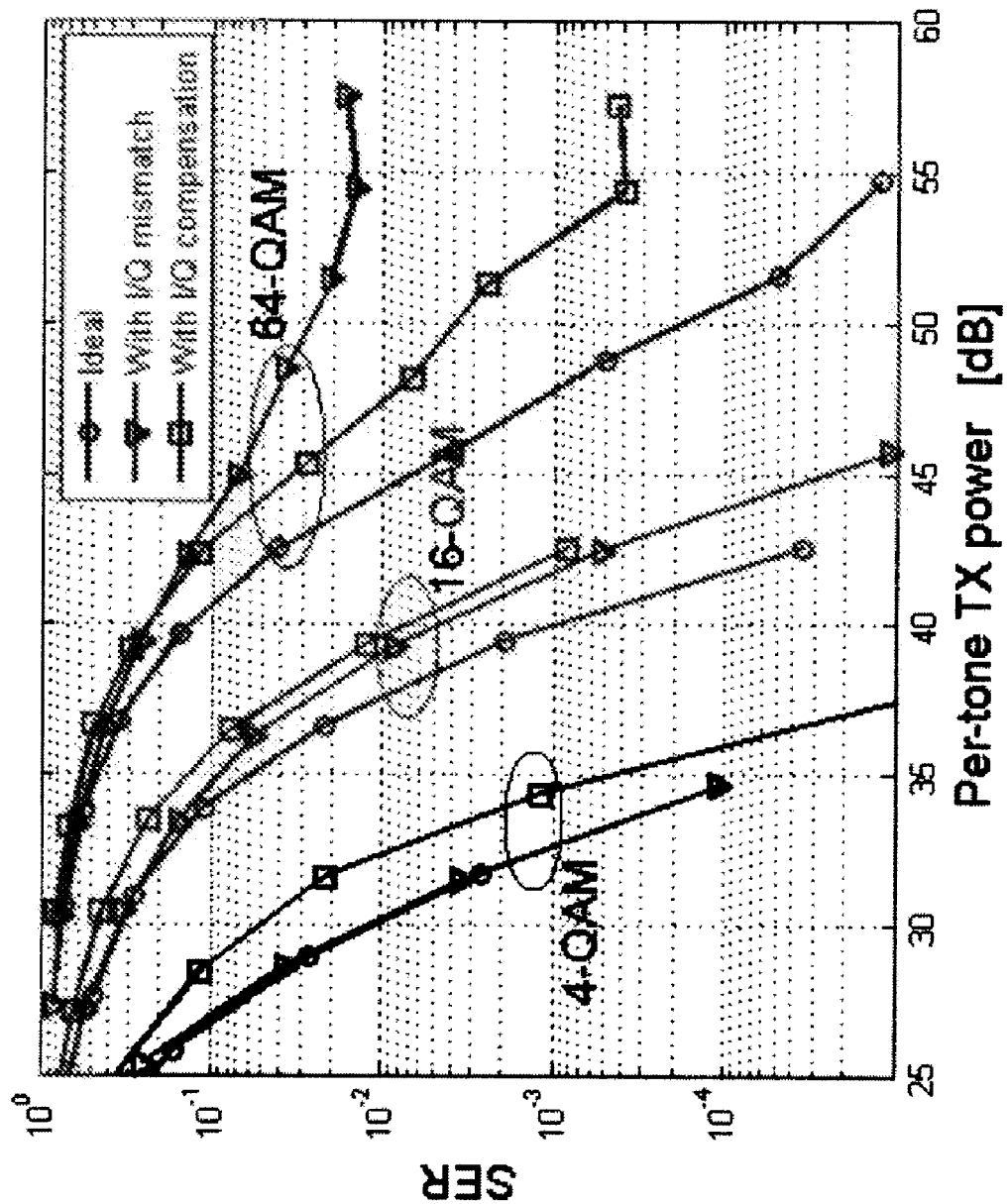
FIG. 16 illustrates one embodiment of the SER (Symbol Error Rate) with and without I/Q compensation for different QAM constellations.

FIG. 16 graphs the SER performance of different QAM constellations with and without I/Q compensation. We observe that, in this embodiment, the proposed method is particularly beneficial for 64-QAM constellations. For 4-QAM and 16-QAM the method for I/Q compensation yields worse performance than the case with I/Q mismatch, possibly because the proposed method requires larger power to enable both data transmission and interference cancellation from the mirror tones. Moreover, 4-QAM and 16-QAM are not as affected by I/Q mismatch as 64-QAM due to the larger minimum distance between constellation points. See A. Tarighat, R. Bagheri, and A. H. Sayed, "Compensation schemes and performance analysis of IQ imbalances in OFDM receivers," IEEE Transactions on Signal Processing, vol. 53, pp. 3257-3268, August 2005. This can be also observed in FIG. 16 by comparing the I/Q mismatch against the ideal case for 4-QAM and 16-QAM. Hence, the additional power required by the DIDO precoder with interference cancellation (from the mirror tones) does not justify the small benefit of the I/Q compensation for the cases of 4-QAM and 16-QAM. Note that this issue may be fixed by employing the methods 2 and 3 for I/Q compensation described above.

Figure 17:
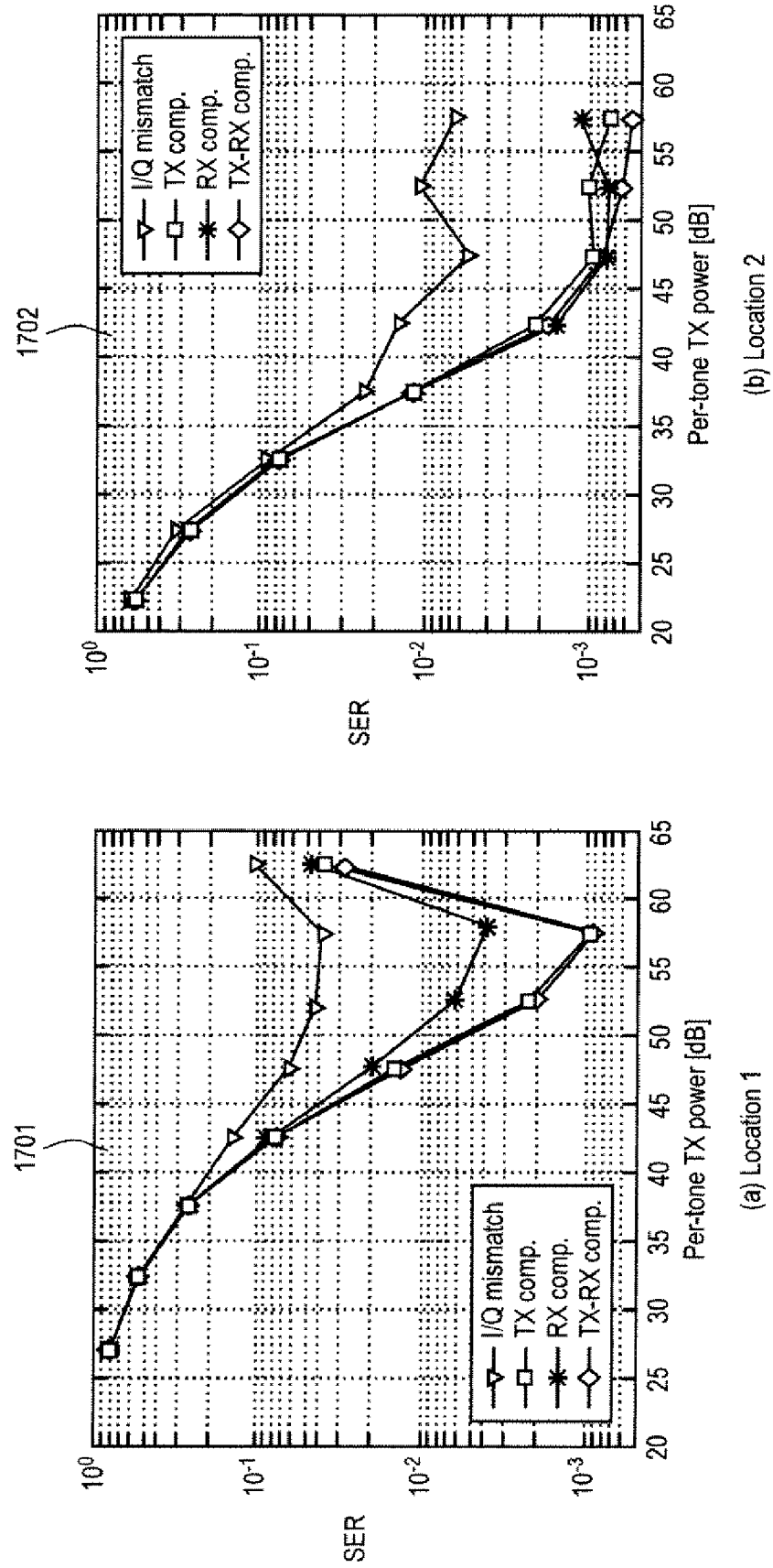
FIG. 17 illustrates one embodiment of DIDO 2×2 performances with and without compensation in different user device locations.

Finally, the relative SER performance of the three methods described above is measured in different propagation conditions. For reference, also described is the SER performance in presence of I/Q mismatch. FIG. 17 depicts the SER measured for a DIDO 2×2 system with 64-QAM at carrier frequency of 450.5 MHz and bandwidth of 250 KHz, at two different users' locations. In Location 1 the users are $\sim 6\lambda$ from the BS in different rooms and NLOS (Non-Line of Sight)) conditions. In Location 2 the users are $\sim \lambda$ from the BS in LOS (Line of Sight).

FIG. 17 shows that all three compensation methods always outperform the case of no compensation. Moreover, it should be noted that method 3 outperforms the other two compensation methods in any channel scenario. The relative performance of method 1 and 2 depends on the propagation conditions. It is observed through practical measurement campaigns that method 1 generally outperforms method 2, since it pre-cancels (at the transmitter) the inter-user interference caused by I/Q imbalance. When this inter-user interference is minimal, method 2 may outperform method 1 as illustrated in graph 1702 of FIG. 17, since it does not suffer from power loss due to the I/Q compensation precoder.

Figure 18:
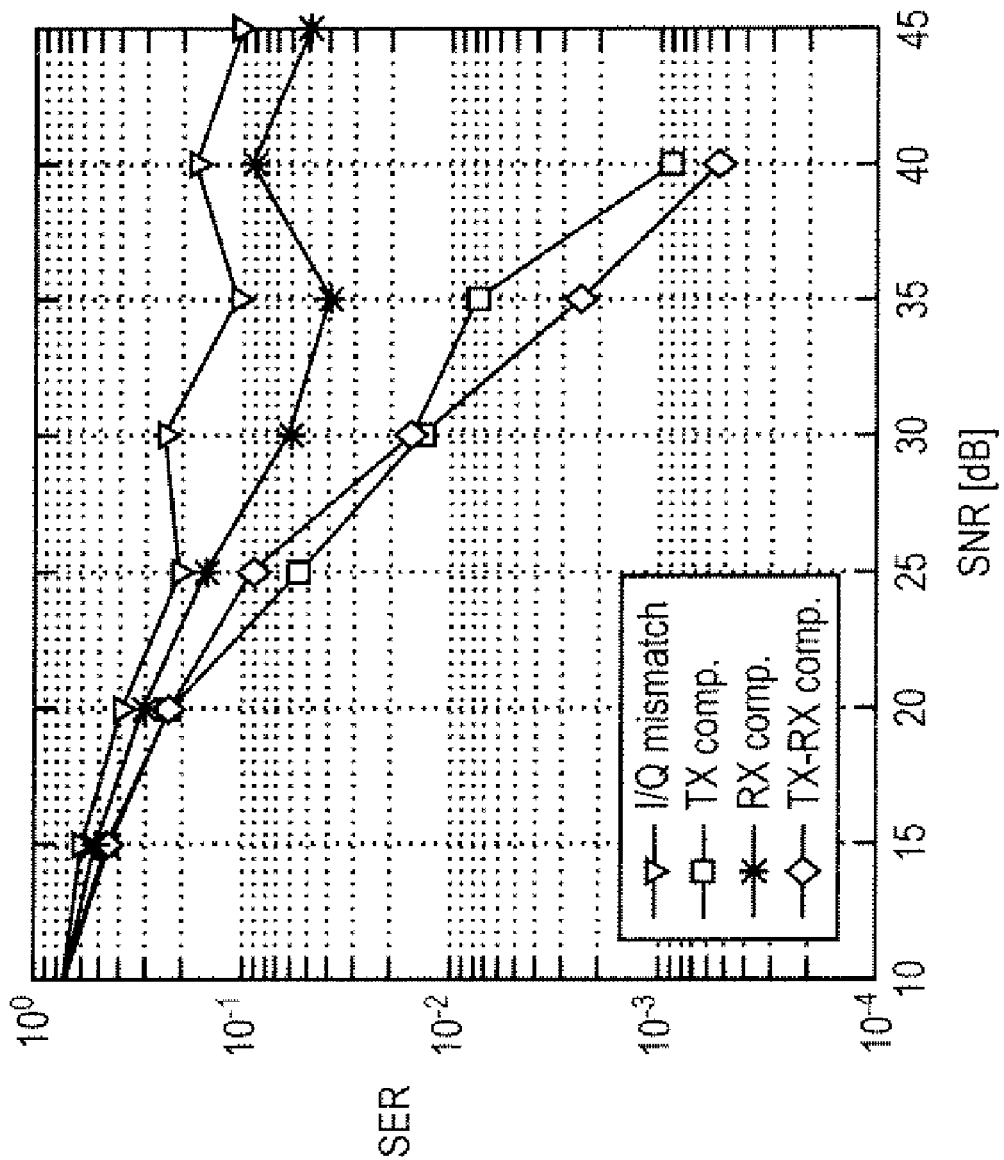
FIG. 18 illustrates one embodiment of the SER with and without I/Q compensation in ideal (i.i.d. (independent and identically-distributed)) channels.

So far, different methods have been compared by considering only a limited set of propagation scenarios as in FIG. 17. Hereafter, the relative performance of these methods in ideal i.i.d. (independent and identically-distributed) channels is measured. DIDO-OFDM systems are simulated with I/Q phase and gain imbalance at the transmit and receive sides. FIG. 18 shows the performance of the proposed methods with only gain imbalance at the transmit side (i.e., with 0.8 gain on the I rail of the first transmit chain and gain 1 on the other rails). It is observed that method 3 outperforms all the other methods. Also, method 1 performs better than method 2 in i.i.d. channels, as opposed to the results obtained in Location 2 in graph 1702 of FIG. 17.

Thus, given the three novel methods to compensate for I/Q imbalance in DIDO-OFDM systems described above, Method 3 outperforms the other proposed compensation methods. In systems with low rate feedback channels, method 2 can be used to reduce the amount of feedback required for the DIDO precoder, at the expense of worse SER performance.

II. Adaptive DIDO Transmission Scheme

Another embodiment of a system and method to enhance the performance of distributed-input distributed-output (DIDO) systems will now be described. This method dynamically allocates the wireless resources to different user devices, by tracking the changing channel conditions, to increase throughput while satisfying certain target error rate. The user devices estimate the channel quality and feedback it to the Base Station (BS); the Base Station processes the channel quality obtained from the user devices to select the best set of user devices, DIDO scheme, modulation/coding scheme (MCS) and array configuration for the next transmission; the Base Station transmits parallel data to multiple user devices via pre-coding and the signals are demodulated at the receiver.

A system that efficiently allocates resources for a DIDO wireless link is also described. The system includes a DIDO Base Station with a DIDO configurator, which processes feedback received from the users to select the best set of users, DIDO scheme, modulation/coding scheme (MCS) and array configuration for the next transmission; a receiver in a DIDO system that measures the channel and other relevant parameters to generate a DIDO feedback signal; and a DIDO feedback control channel for conveying feedback information from users to the Base Station.

As described in detail below, some of the significant features of this embodiment of the invention include, but are not limited to:

Techniques to adaptively select number of users, DIDO transmission schemes (i.e., antenna selection or multiplexing), modulation/coding scheme (MCS) and array configurations based on the channel quality information, to minimize SER or maximize per-user or downlink spectral efficiency;

Techniques to define sets of DIDO transmission modes as combinations of DIDO schemes and MCSs;

Techniques to assign different DIDO modes to different time slots, OFDM tones and DIDO substreams, depending on the channel conditions;

Techniques to dynamically assign different DIDO modes to different users based on their channel quality;

Criteria to enable adaptive DIDO switching based on link quality metrics computed in the time, frequency and space domains;

Criteria to enable adaptive DIDO switching based on lookup tables.

Figure 19:
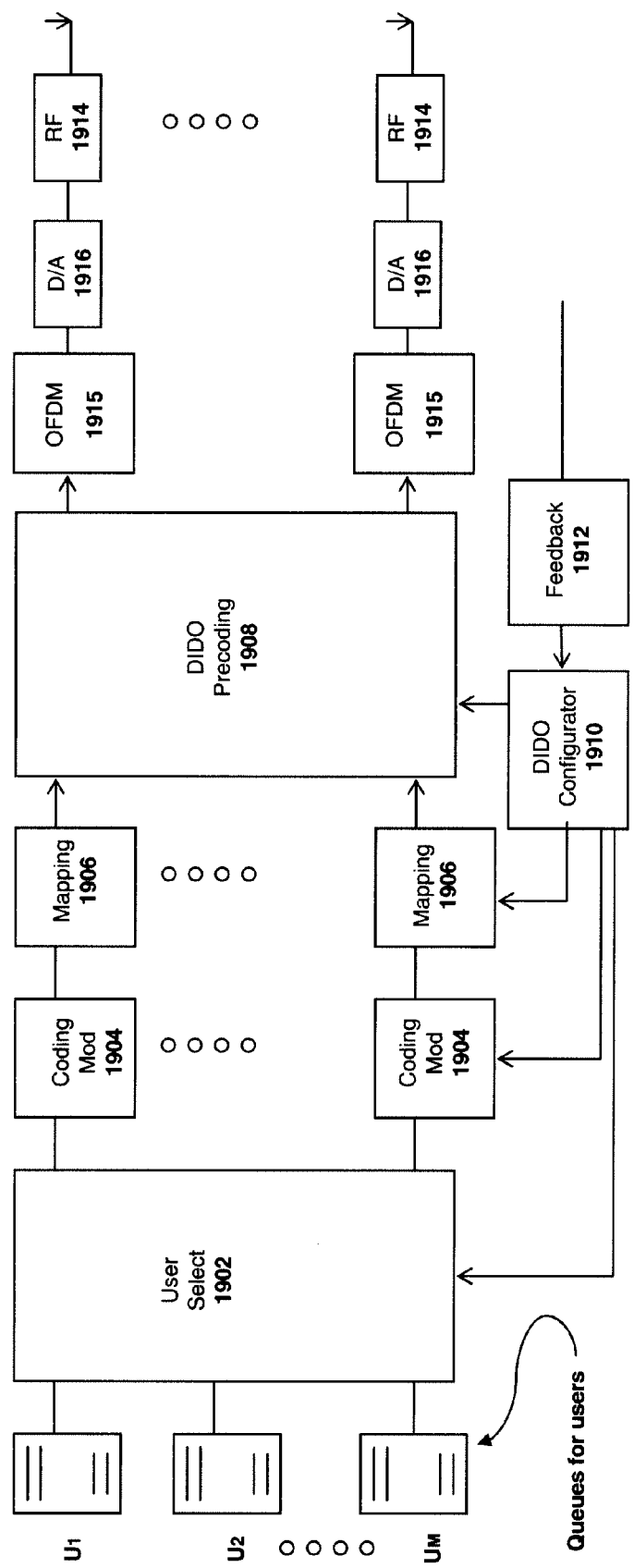
FIG. 19 illustrates one embodiment of a transmitter framework of adaptive DIDO systems.
Figure 20:
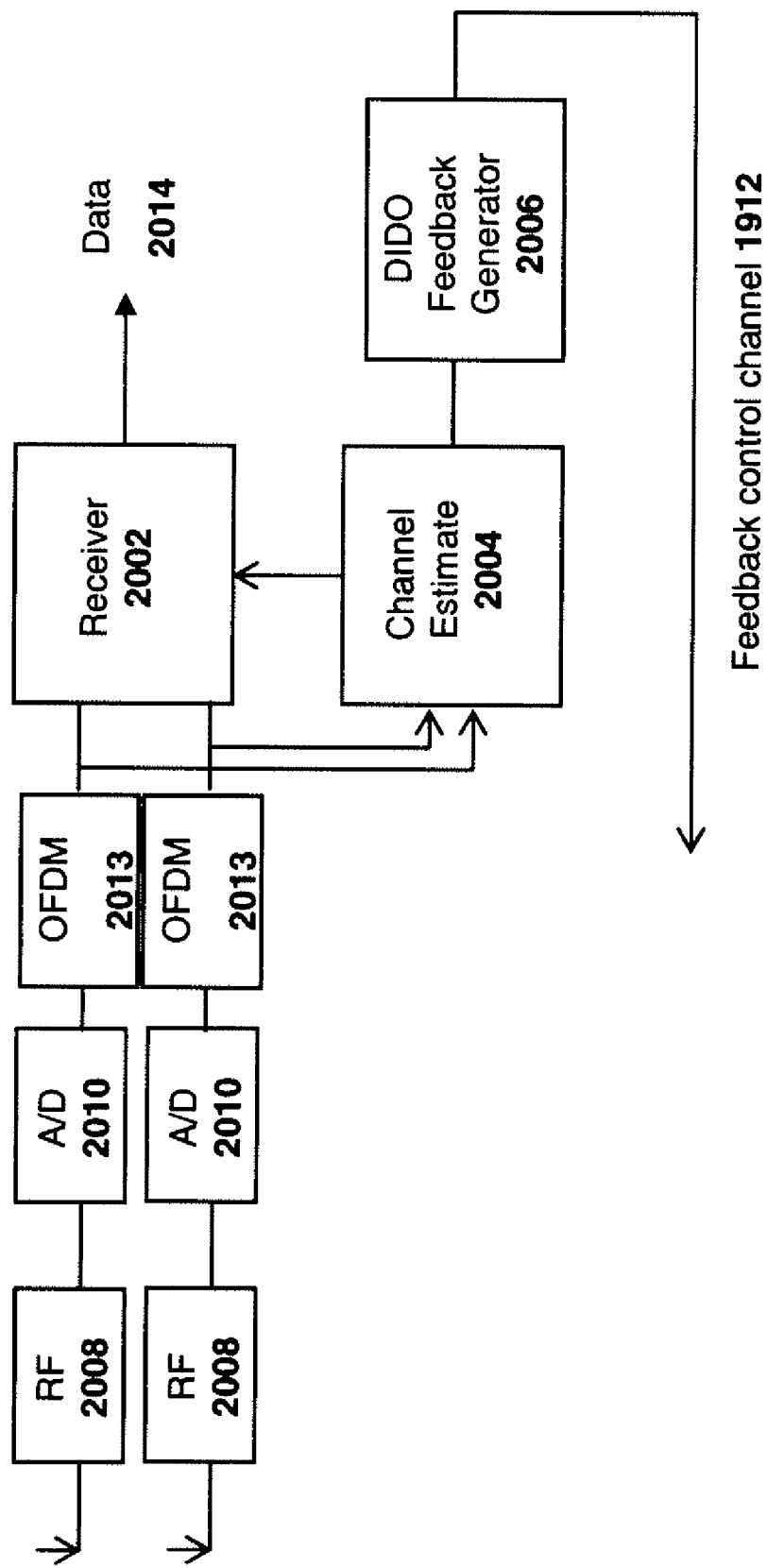
FIG. 20 illustrates one embodiment of a receiver framework of adaptive DIDO systems.

A DIDO system with a DIDO configurator at the Base Station as in FIG. 19 to adaptively select the number of users, DIDO transmission schemes (i.e., antenna selection or multiplexing), modulation/coding scheme (MCS) and array configurations based on the channel quality information, to minimize SER or maximize per user or downlink spectral efficiency;

A DIDO system with a DIDO configurator at the Base Station and a DIDO feedback generator at each user device as in FIG. 20, which uses the estimated channel state and/or other parameters like the estimated SNR at the receiver to generate a feedback message to be input into the DIDO configurator.

A DIDO system with a DIDO configurator at the Base Station, DIDO feedback generator, and a DIDO feedback control channel for conveying DIDO-specific configuration information from the users to the Base Station.

a. Background

In multiple-input multiple-output (MIMO) systems, diversity schemes such as orthogonal space-time block codes (OSTBC) (See V. Tarokh, H. Jafarkhani, and A. R. Calderbank, "Spacetime block codes from orthogonal designs," IEEE Trans. Info. Th., vol. 45, pp. 1456-467, July 1999) or antenna selection (See R. W. Heath Jr., S. Sandhu, and A. J. Paulraj, "Antenna selection for spatial multiplexing systems with linear receivers," IEEE Trans. Comm., vol. 5, pp. 142-144, April 2001) are conceived to combat channel fading, providing increased link robustness that translates in better coverage. On the other hand, spatial multiplexing (SM) enables transmission of multiple parallel data streams as a means to enhance systems throughput. See G. J. Foschini, G. D. Golden, R. A. Valenzuela, and P. W. Wolniansky, "Simplified processing for high spectral efficiency wireless communication employing multielement arrays," IEEE Jour. Select. Areas in Comm., vol. 17, no. 11, pp. 1841-1852, November 1999. These benefits can be simultaneously achieved in MIMO systems, according to the theoretical diversity/multiplexing tradeoffs derived in L. Zheng and D. N. C. Tse, "Diversity and multiplexing: a fundamental tradeoff in multiple antenna channels," IEEE Trans. Info. Th., vol. 49, no. 5, pp. 1073-1096, May 2003. One practical implementation is to adaptively switch between diversity and multiplexing transmission schemes, by tracking the changing channel conditions.

A number of adaptive MIMO transmission techniques have been proposed thus far. The diversity/multiplexing switching method in R. W. Heath and A. J. Paulraj, "Switching between diversity and multiplexing in MIMO systems," IEEE Trans. Comm., vol. 53, no. 6, pp. 962-968, June 2005, was designed to improve BER (Bit Error Rate) for fixed rate transmission, based on instantaneous channel quality information. Alternatively, statistical channel information can be employed to enable adaptation as in S. Catreux, V. Erceg, D. Gesbert, and R. W. Heath. Jr., "Adaptive modulation and MIMO coding for broadband wireless data networks," IEEE Comm. Mag., vol. 2, pp. 108-115, June 2002 ("Catreux"), resulting in reduced feedback overhead and number of control messages. The adaptive transmission algorithm in Catreux was designed to enhance spectral efficiency for predefined target error rate in orthogonal frequency division multiplexing (OFDM) systems, based on channel time/frequency selectivity indicators. Similar low feedback adaptive approaches have been proposed for narrowband systems, exploiting the channel spatial selectivity to switch between diversity schemes and spatial multiplexing. See, e.g., A. Forenza, M. R. McKay, A. Pandharipande, R. W. Heath. Jr., and I. B. Collings, "Adaptive MIMO transmission for exploiting the capacity of spatially correlated channels," accepted to the IEEE Trans. on Veh. Tech., March 2007; M. R. McKay, I. B. Collings, A. Forenza, and R. W. Heath. Jr., "Multiplexing/beamforming switching for coded MIMO in spatially correlated Rayleigh channels," accepted to the IEEE Trans. on Veh. Tech., December 2007; A. Forenza, M. R. McKay, R. W. Heath. Jr., and I. B. Collings, "Switching between OSTBC and spatial multiplexing with linear receivers in spatially correlated MIMO channels," Proc. IEEE Veh. Technol. Conf., vol. 3, pp. 1387-1391, May 2006; M. R. McKay, I. B. Collings, A. Forenza, and R. W. Heath Jr., "A throughput-based adaptive MIMO BICM approach for spatially correlated channels," to appear in Proc. IEEE ICC, June 2006

In this document, we extend the scope of the work presented in various prior publications to DIDO-OFDM systems. See, e.g., R. W. Heath and A. J. Paulraj, "Switching between diversity and multiplexing in MIMO systems," IEEE Trans. Comm., vol. 53, no. 6, pp. 962-968, June 2005. S. Catreux, V. Erceg, D. Gesbert, and R. W. Heath Jr., "Adaptive modulation and MIMO coding for broadband wireless data networks," IEEE Comm. Mag., vol. 2, pp. 108-115, June 2002; A. Forenza, M. R. McKay, A. Pandharipande, R. W. Heath Jr., and I. B. Collings, "Adaptive MIMO transmission for exploiting the capacity of spatially correlated channels," IEEE Trans. on Veh. Tech., vol. 56, n. 2, pp. 619-630, March 2007. M. R. McKay, I. B. Collings, A. Forenza, and R. W. Heath Jr., "Multiplexing/beamforming switching for coded MIMO in spatially correlated Rayleigh channels," accepted to the IEEE Trans. on Veh. Tech., December 2007; A. Forenza, M. R. McKay, R. W. Heath Jr., and I. B. Collings, "Switching between OSTBC and spatial multiplexing with linear receivers in spatially correlated MIMO channels," Proc. IEEE Veh. Technol. Conf., vol. 3, pp. 1387-1391, May 2006. M. R. McKay, I. B. Collings, A. Forenza, and R. W. Heath Jr., "A throughput-based adaptive MIMO BICM approach for spatially correlated channels," to appear in Proc. IEEE ICC, June 2006.

A novel adaptive DIDO transmission strategy is described herein that switches between different numbers of users, numbers of transmit antennas and transmission schemes based on channel quality information as a means to improve the system performance. Note that schemes that adaptively select the users in multiuser MIMO systems were already proposed in M. Sharif and B. Hassibi, "On the capacity of MIMO broadcast channel with partial side information," IEEE Trans. Info. Th., vol. 51, p. 506522, February 2005; and W. Choi, A. Forenza, J. G. Andrews, and R. W. Heath Jr., "Opportunistic space division multiple access with beam selection," to appear in IEEE Trans. on Communications. The opportunistic space division multiple access (OSDMA) schemes in these publications, however, are designed to maximize the sum capacity by exploiting multi-user diversity and they achieve only a fraction of the theoretical capacity of dirty paper codes, since the interference is not completely pre-canceled at the transmitter. In the DIDO transmission algorithm described herein block diagonalization is employed to pre-cancel inter-user interference. The proposed adaptive transmission strategy, however, can be applied to any DIDO system, independently on the type of pre-coding technique.

The present patent application describes an extension of the embodiments of the invention described above and in the Prior Application, including, but not limited to the following additional features:

1. The training symbols of the Prior Application for channel estimation can be employed by the wireless client devices to evaluate the link-quality metrics in the adaptive DIDO scheme;

2. The base station receives signal characterization data from the client devices as described in the Prior Application. In the current embodiment, the signal characterization data is defined as link-quality metric used to enable adaptation;

3. The Prior Application describes a mechanism to select the number of transmit antennas and users as well as defines throughput allocation. Moreover, different levels of throughput can be dynamically assigned to different clients as in the Prior Application. The current embodiment of the invention defines novel criteria related to this selection and throughput allocation.

b. Embodiments of the Invention

Figure 21:
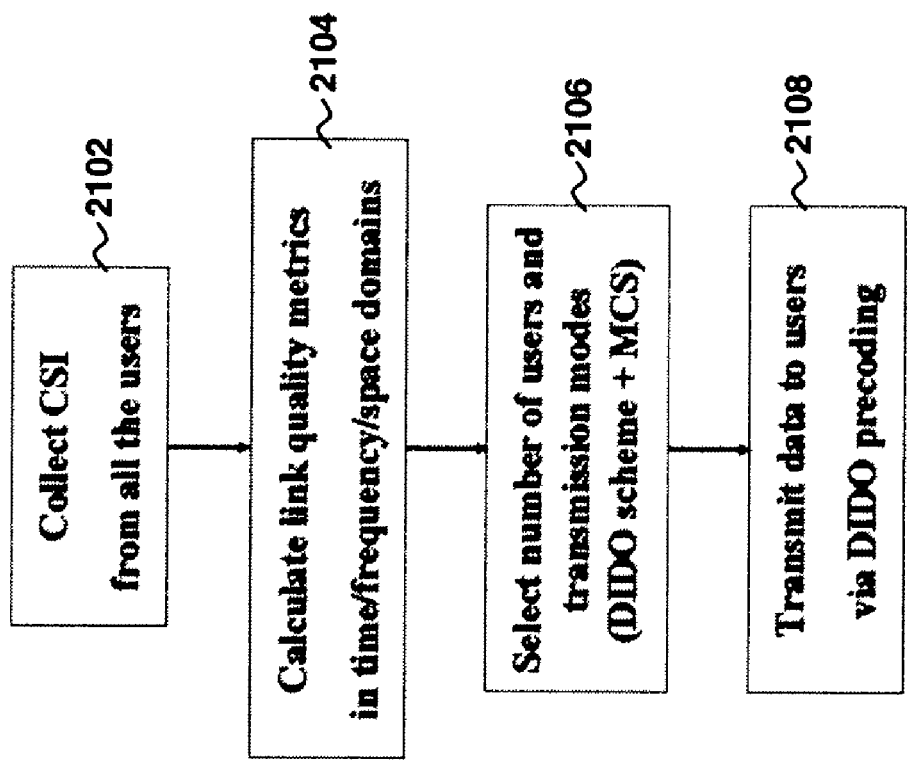
FIG. 21 illustrates one embodiment of a method of adaptive DIDO-OFDM.

The goal of the proposed adaptive DIDO technique is to enhance per-user or downlink spectral efficiency by dynamically allocating the wireless resource in time, frequency and space to different users in the system. The general adaptation criterion is to increase throughput while satisfying the target error rate. Depending on the propagation conditions, this adaptive algorithm can also be used to improve the link quality of the users (or coverage) via diversity schemes. The flowchart illustrated in FIG. 21 describes steps of the adaptive DIDO scheme.

The Base Station (BS) collects the channel state information (CSI) from all the users in 2102. From the received CSI, the BS computes the link quality metrics in time/frequency/space domains in 2104. These link quality metrics are used to select the users to be served in the next transmission as well as the transmission mode for each of the users in 2106. Note that the transmission modes consist of different combinations of modulation/coding and DIDO schemes. Finally, the BS transmits data to the users via DIDO precoding as in 2108.

At 2102, the Base Station collects the channel state information (CSI) from all the user devices. The CSI is used by the Base Station to determine the instantaneous or statistical channel quality for all the user devices at 2104. In DIDO-OFDM systems the channel quality (or link quality metric) can be estimated in the time, frequency and space domains. Then, at 2106, the Base Station uses the link quality metric to determine the best subset of users and transmission mode for the current propagation conditions. A set of DIDO transmission modes is defined as combinations of DIDO schemes (i.e., antenna selection or multiplexing), modulation/coding schemes (MCSs) and array configuration. At 2108, data is transmitted to user devices using the selected number of users and transmission modes.

One embodiment of a system employing DIDO adaptation is illustrated in FIGS. 19-20. Several new functional units are introduced to enable implementation of the proposed DIDO adaptation algorithms. Specifically, in one embodiment, a DIDO configurator 1910 performs a plurality of functions including selecting the number of users, DIDO transmission schemes (i.e., antenna selection or multiplexing), modulation/coding scheme (MCS), and array configurations based on the channel quality information 1912 provided by user devices.

The user selector unit 1902 selects data associated with a plurality of users $U_1$-$U_M$, based on the feedback information obtained by the DIDO configurator 1910, and provides this information each of the plurality of coding modulation units 1904. Each coding modulation unit 1904 encodes and modulates the information bits of each user and sends them to the mapping unit 1906. The mapping unit 1906 maps the input bits to complex symbols and sends it to the precoding unit 1908. Both the coding modulation units 1904 and the mapping unit 1906 exploit the information obtained from the DIDO configurator unit 1910 to choose the type of modulation/coding scheme to employ for each user. This information is computed by the DIDO configurator unit 1910 by exploiting the channel quality information of each of the users as provided by the feedback unit 1912. The DIDO precoding unit 1908 exploits the information obtained by the DIDO configurator unit 1910 to compute the DIDO precoding weights and precoding the input symbols obtained from the mapping units 1906. Each of the precoded data streams are sent by the DIDO precoding unit 1908 to the OFDM unit 1915 that computes the IFFT and adds the cyclic prefix. This information is sent to the D/A unit 1916 that operates the digital to analog conversion and sends the resulting analog signal to the RF unit 1914. The RF unit 1914 upconverts the baseband signal to intermediate/radio frequency and send it to the transmit antenna.

The RF units 2008 of each client device receive signals transmitted from the DIDO transmitter units 1914, downconverts the signals to baseband and provide the downconverted signals to the A/D units 2010. The A/D units 2010 then convert the signal from analog to digital and send it to the OFDM units 2013. The OFDM units 2013 remove the cyclic prefix and carries out the FFT to report the signal to the frequency domain. During the training period the OFDM units 2013 send the output to the channel estimate unit 2004 that computes the channel estimates in the frequency domain. Alternatively, the channel estimates can be computed in the time domain. During the data period the OFDM units 2013 send the output to the receiver unit 2002 which demodulates/decodes the signal to obtain the data 2014. The channel estimate unit 2004 sends the channel estimates to the DIDO feedback generator unit 2006 that may quantize the channel estimates and send it back to the transmitter via the feedback control channel 1912.

The DIDO configurator 1910 may use information derived at the Base Station or, in a preferred embodiment, uses additionally the output of a DIDO Feedback Generator 2006 (see FIG. 20), operating at each user device. The DIDO Feedback Generator 2006 uses the estimated channel state 2004 and/or other parameters like the estimated SNR at the receiver to generate a feedback message to be input into the DIDO Configurator 1910. The DIDO Feedback Generator 2006 may compress information at the receiver, may quantize information, and/or use some limited feedback strategies known in the art.

The DIDO Configurator 1910 may use information recovered from a DIDO Feedback Control Channel 1912. The DIDO Feedback Control Channel 1912 is a logical or physical control channel that is used to send the output of the DIDO Feedback Generator 2006 from the user to the Base Station. The control channel 1912 may be implemented in any number of ways known in the art and may be a logical or a physical control channel. As a physical channel it may comprise a dedicated time/frequency slot assigned to a user. It may also be a random access channel shared by all users. The control channel may be pre-assigned or it may be created by stealing bits in a predefined way from an existing control channel.

In the following discussion, results obtained through measurements with the DIDO-OFDM prototype are described in real propagation environments. These results demonstrate the potential gains achievable in adaptive DIDO systems. The performance of different order DIDO systems is presented initially, demonstrating that it is possible to increase the number of antennas/user to achieve larger downlink throughput. The DIDO performance as a function of user device's location is then described, demonstrating the need for tracking the changing channel conditions. Finally, the performance of DIDO systems employing diversity techniques is described.

i. Performance of Different Order DIDO Systems

The performance of different DIDO systems is evaluated with increasing number of transmit antennas N=M, where M is the number of users. The performance of the following systems is compared: SISO, DIDO 2×2, DIDO 4×4, DIDO 6×6 and DIDO 8×8. DIDO N×M refers to DIDO with N transmit antennas at the BS and M users.

Figure 22:
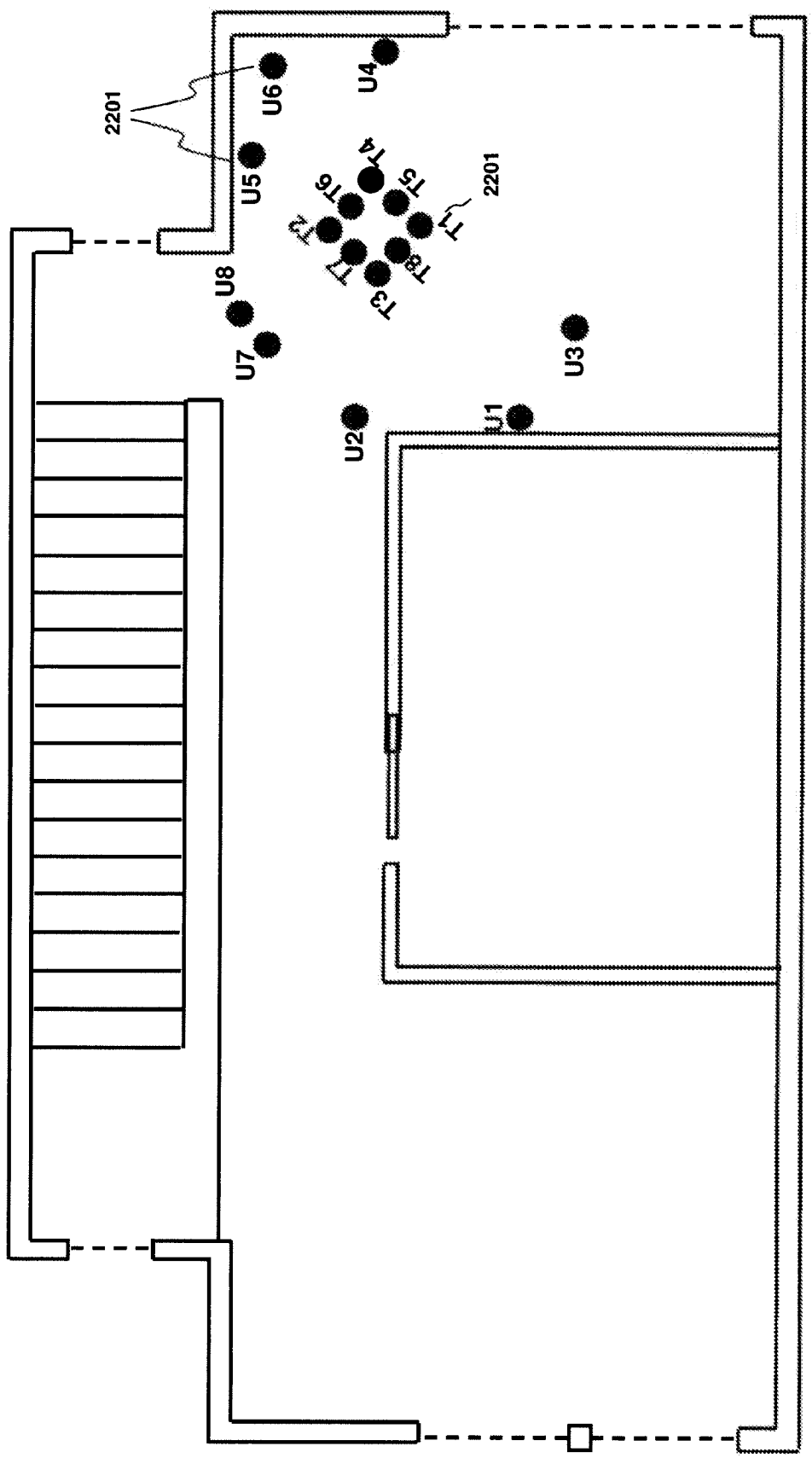
FIG. 22 illustrates one embodiment of the antenna layout for DIDO measurements.

FIG. 22 illustrates the transmit/receive antenna layout in a exemplary residential floor plan. The transmit antennas 2201 are placed in squared array configuration and the users are located around the transmit array. In FIG. 22, T indicates the "transmit" antennas and U refers to the "user devices" 2202.

Different antenna subsets are active in the 8-element transmit array, depending on the value of N chosen for different measurements. For each DIDO order (N) the subset of antennas that covers the largest real estate for the fixed size constraint of the 8-element array was chosen. This criterion is expected to enhance the spatial diversity for any given value of N.

Figure 23:
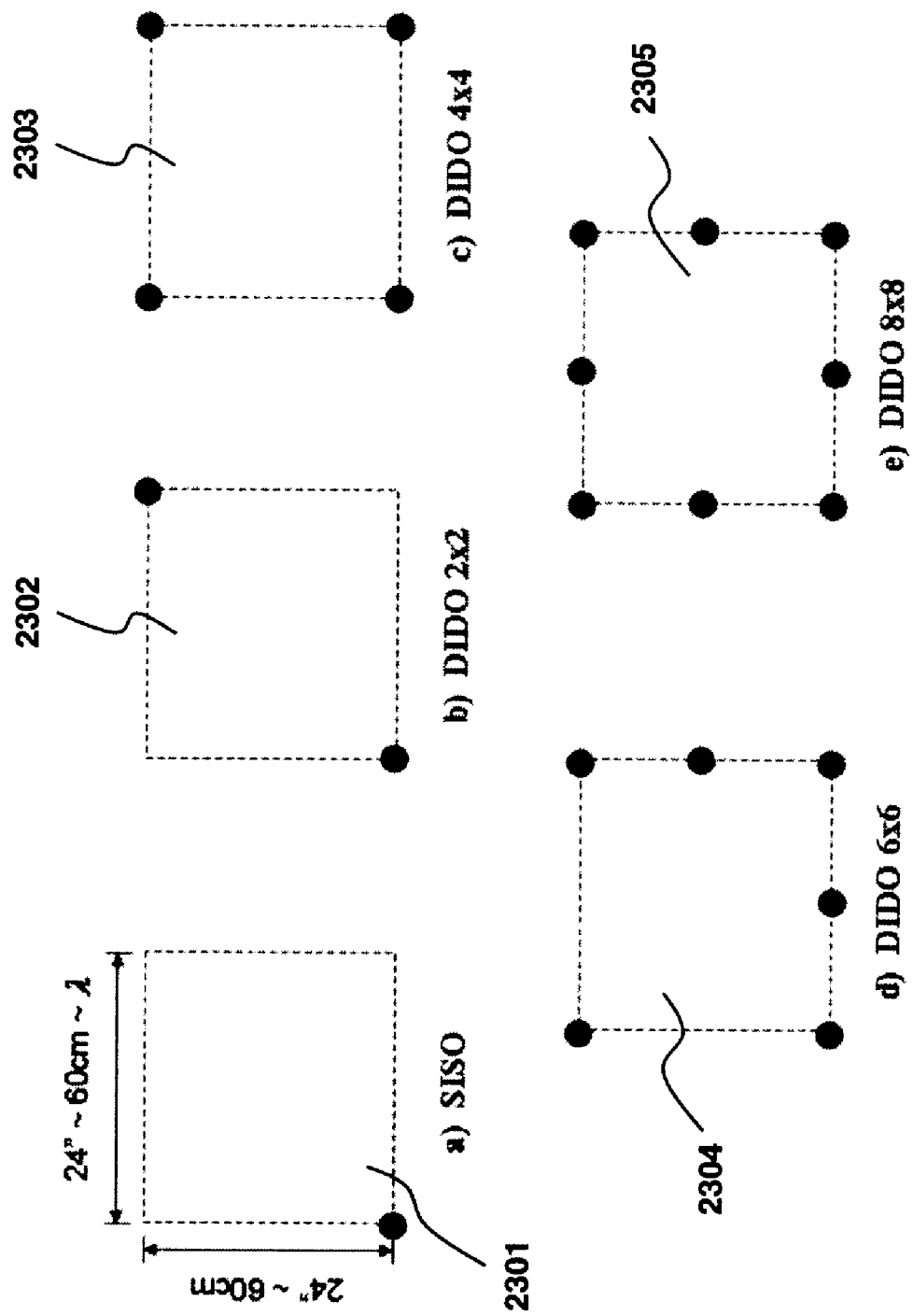
FIG. 23 illustrates embodiments of array configurations for different order DIDO systems.

FIG. 23 shows the array configurations for different DIDO orders that fit the available real estate (i.e., dashed line and outer walls). The squared dashed box has dimensions of 24"×24", corresponding to ~λ×λ at the carrier frequency of 450 MHz.

Based on the comments related to FIG. 23 and with reference to FIG. 22, the performance of each of the following systems will now be defined and compared:

SISO with T1 and U1 (2301)
DIDO 2×2 with T1,2 and U1,2 (2302)
DIDO 4×4 with T1,2,3,4 and U1,2,3,4 (2303)
DIDO 6×6 with T1,2,3,4,5,6 and U1,2,3,4,5,6 (2304)
DIDO 8×8 with T1,2,3,4,5,6,7,8 and U1,2,3,4,5,6,7,8 (2305)

Figure 24:
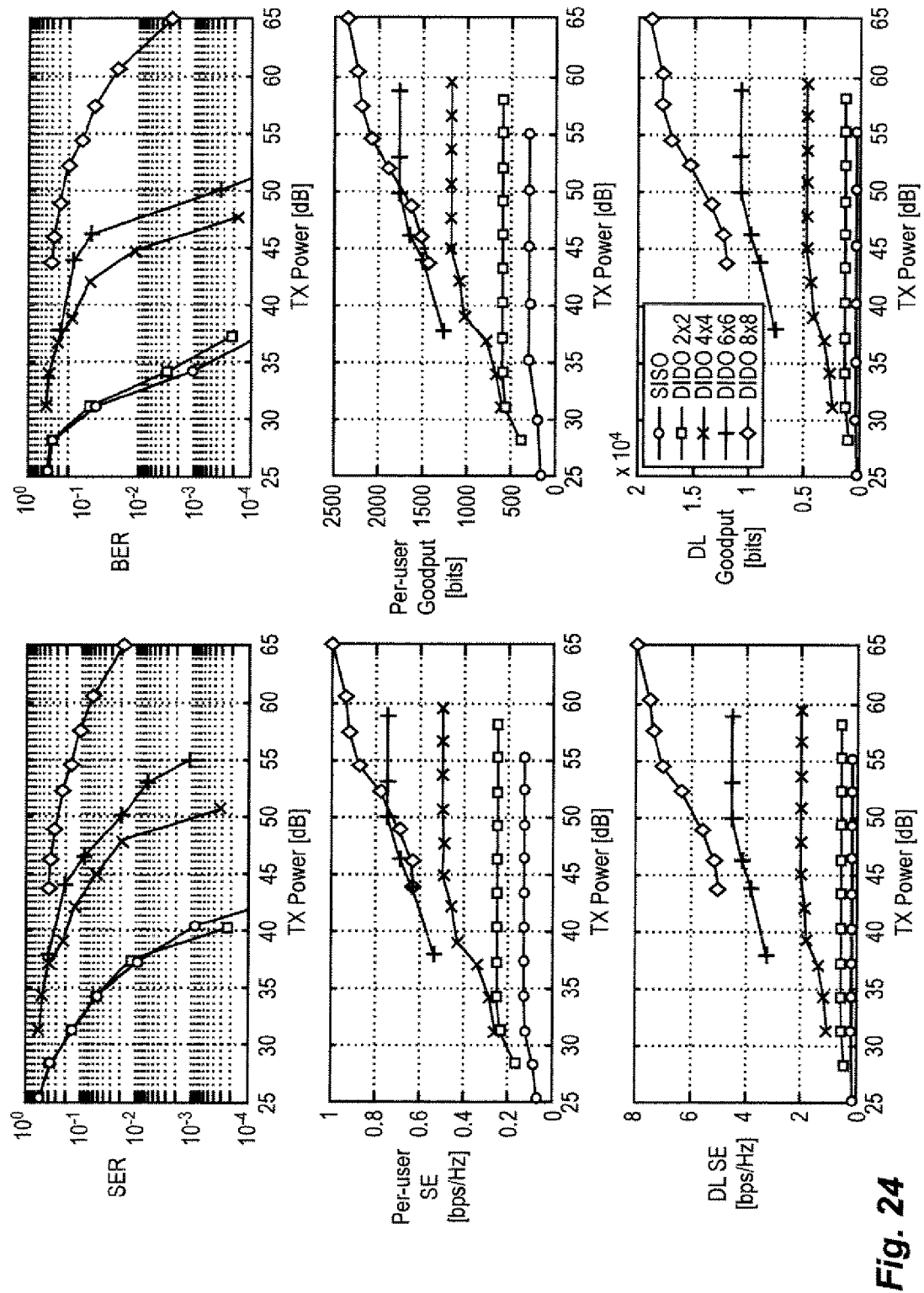
FIG. 24 illustrates the performance of different order DIDO systems.

FIG. 24 shows the SER, BER, SE (Spectral Efficiency) and goodput performance as a function of the transmit (TX) power for the DIDO systems described above, with 4-QAM and FEC (Forward Error Correction) rate of ½. Observe that the SER and BER performance degrades for increasing values of N. This effect is due to two phenomena: for fixed TX power, the input power to the DIDO array is split between increasing number of users (or data streams); the spatial diversity decreases with increasing number of users in realistic (spatially correlated) DIDO channels.

To compare the relative performance of different order DIDO systems the target BER is fixed to $10^{-4}$ (this value may vary depending on the system) that corresponds approximately to SER=$10^{-2}$ as shown in FIG. 24. We refer to the TX power values corresponding to this target as TX power thresholds (TPT). For any N, if the TX power is below the TPT, we assume it is not possible to transmit with DIDO order N and we need to switch to lower order DIDO. Also, in FIG. 24, observe that the SE and goodput performance saturate when the TX power exceeds the TPTs for any value of N. From these results, an adaptive transmission strategy may be designed that switches between different order DIDO to enhance SE or goodput for fixed predefined target error rate.

ii. Performance with Variable User Location

Figure 25:
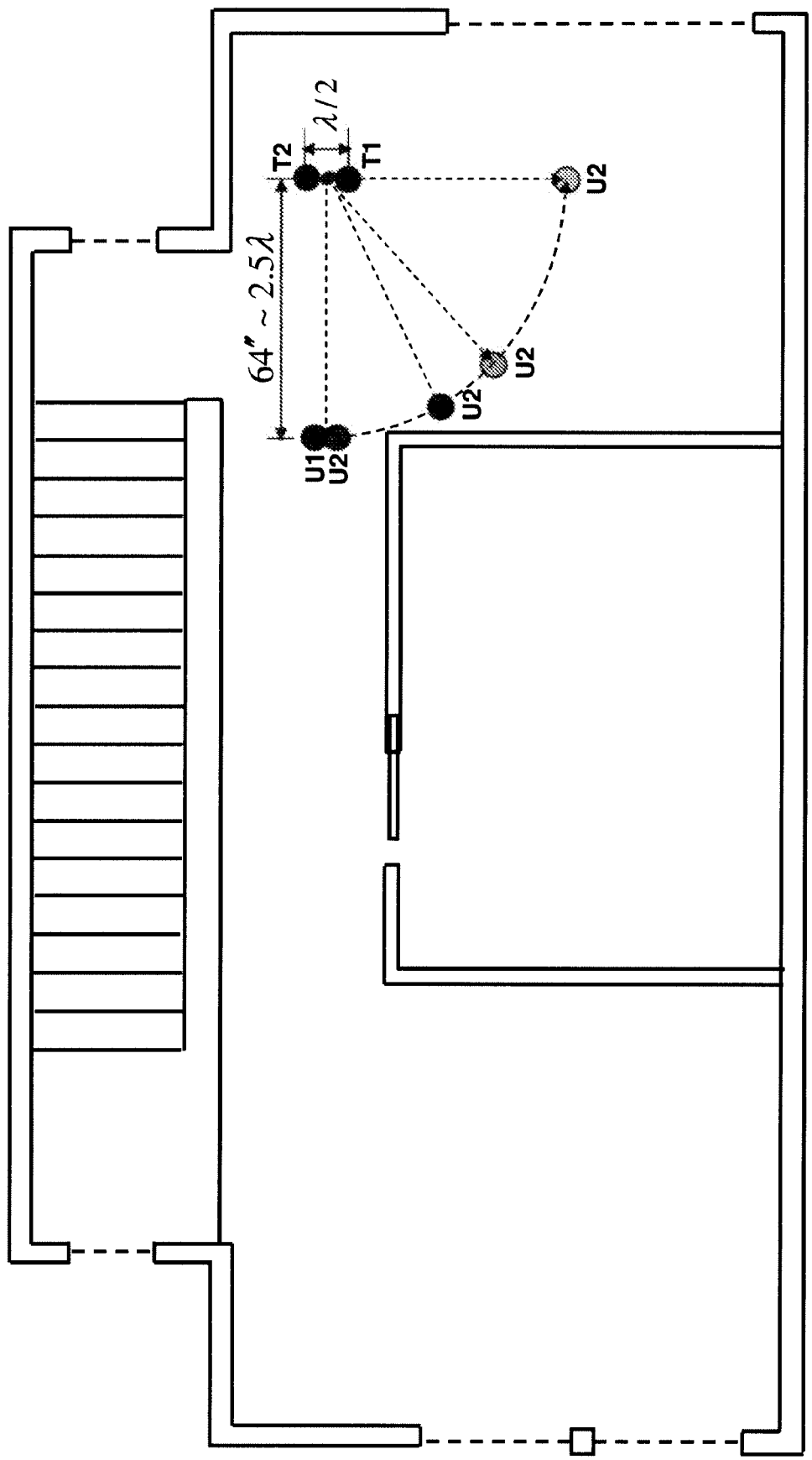
FIG. 25 illustrates one embodiment of the antenna layout for DIDO measurements.

The goal of this experiment is to evaluate the DIDO performance for different users' location, via simulations in spatially correlated channels. DIDO 2×2 systems are considered with 4QAM and an FEC rate of ½. User 1 is at a broadside direction from the transmit array, whereas user 2 changes locations from broadside to endfire directions as illustrated in FIG. 25. The transmit antennas are spaced ~λ/2 and separated ~2.5λ from the users.

FIG. 26 shows the SER and per-user SE results for different locations of user device 2. The user device's angles of arrival (AOAs) range between 0° and 90°, measured from the broadside direction of the transmit array. Observe that, as the user device's angular separation increases, the DIDO performance improves, due to larger diversity available in the DIDO channel. Also, at target SER=$10^{-2}$ there is a 10 dB gap between the cases AOA2=0° and AOA2=90°. This result is consistent to the simulation results obtained in FIG. 35 for an angle spread of 10°. Also, note that for the case of AOA1=AOA2=0° there may be coupling effects between the two users (due to the proximity of their antennas) that may vary their performance from the simulated results in FIG. 35.

iii. Preferred Scenario for DIDO 8×8

FIG. 24 illustrated that DIDO 8×8 yields a larger SE than lower order DIDO at the expense of higher TX power requirement. The goal of this analysis is to show there are cases where DIDO 8×8 outperforms DIDO 2×2, not only in terms of peak spectral efficiency (SE), but also in terms of TX power requirement (or TPT) to achieve that peak SE.

Note that, in i.i.d. (ideal) channels, there is ~6 dB gap in TX power between the SE of DIDO 8×8 and DIDO 2×2. This gap is due to the fact that DIDO 8×8 splits the TX power across eight data streams, whereas DIDO 2×2 only between two streams. This result is shown via simulation in FIG. 32.

Figure 35:
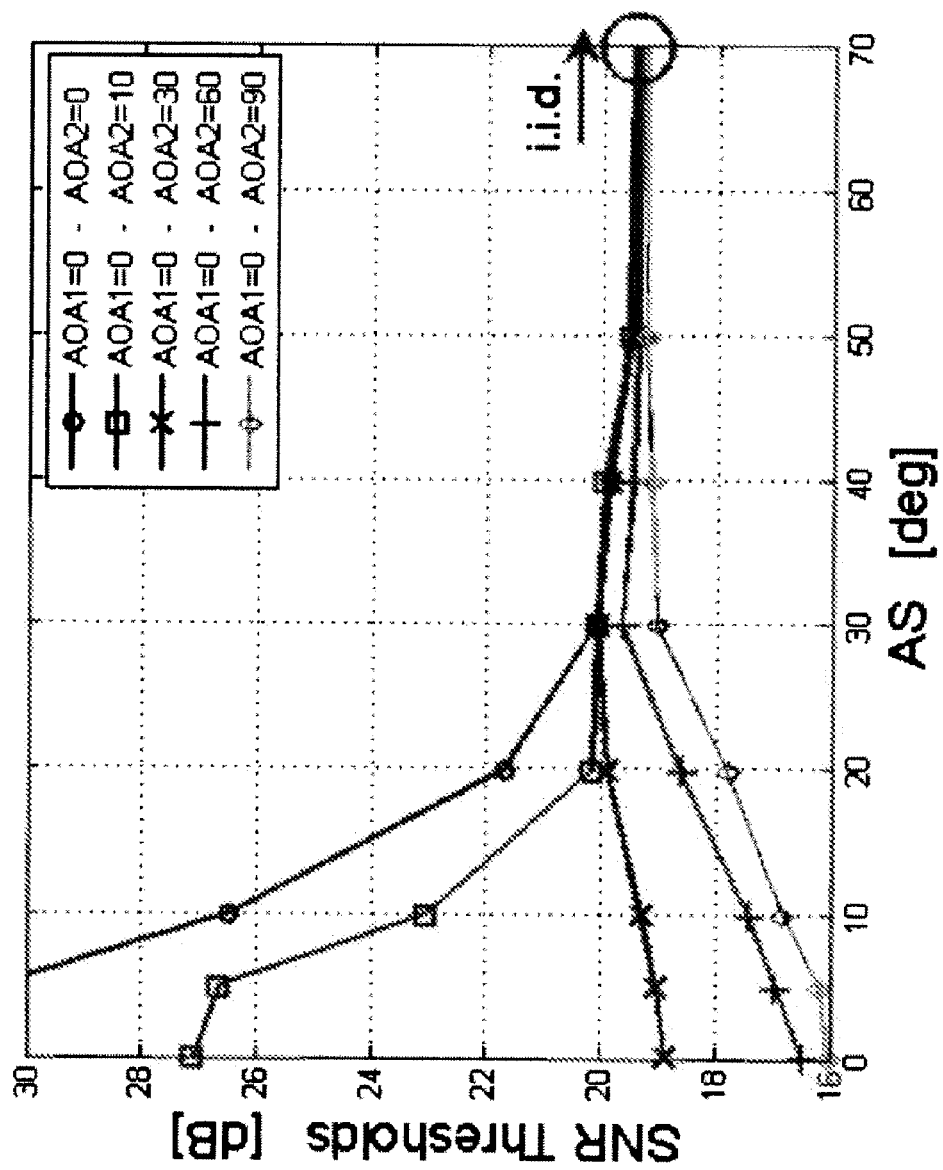
FIG. 35 plots the SNR thresholds as a function of the AS for different values of the mean angles of arrival (AOAs) of the users.

In spatially correlated channels, however, the TPT is a function of the characteristics of the propagation environment (e.g., array orientation, user location, angle spread). For example, FIG. 35 shows ~15 dB gap for low angle spread between two different user device's locations. Similar results are presented in FIG. 26 of the present application.

Similarly to MIMO systems, the performance of DIDO systems degrades when the users are located at endfire directions from the TX array (due to lack of diversity). This effect has been observed through measurements with the current DIDO prototype. Hence, one way to show that DIDO 8×8 outperforms DIDO 2×2 is to place the users at endfire directions with respect to the DIDO 2×2 arrays. In this scenario, DIDO 8×8 outperforms DIDO 2×2 due to the higher diversity provided by the 8-antenna array.

In this analysis, consider the following systems:
System 1: DIDO 8×8 with 4-QAM (transmit 8 parallel data streams every time slot);
System 2: DIDO 2×2 with 64-QAM (transmit to users X and Y every 4 time slots). For this system we consider four combinations of TX and RX antenna locations: a) T1,T2 U1,2 (endfire direction); b) T3,T4 U3,4 (endfire direction); c) T5,T6 U5,6 (~30° from the endfire direction); d) T7,T8 U7,8 (NLOS (Non-Line of Sight));
System 3: DIDO 8×8 with 64-QAM; and
System 4: MISO 8×1 with 64-QAM (transmit to user X every 8 time slots).

Figure 27:
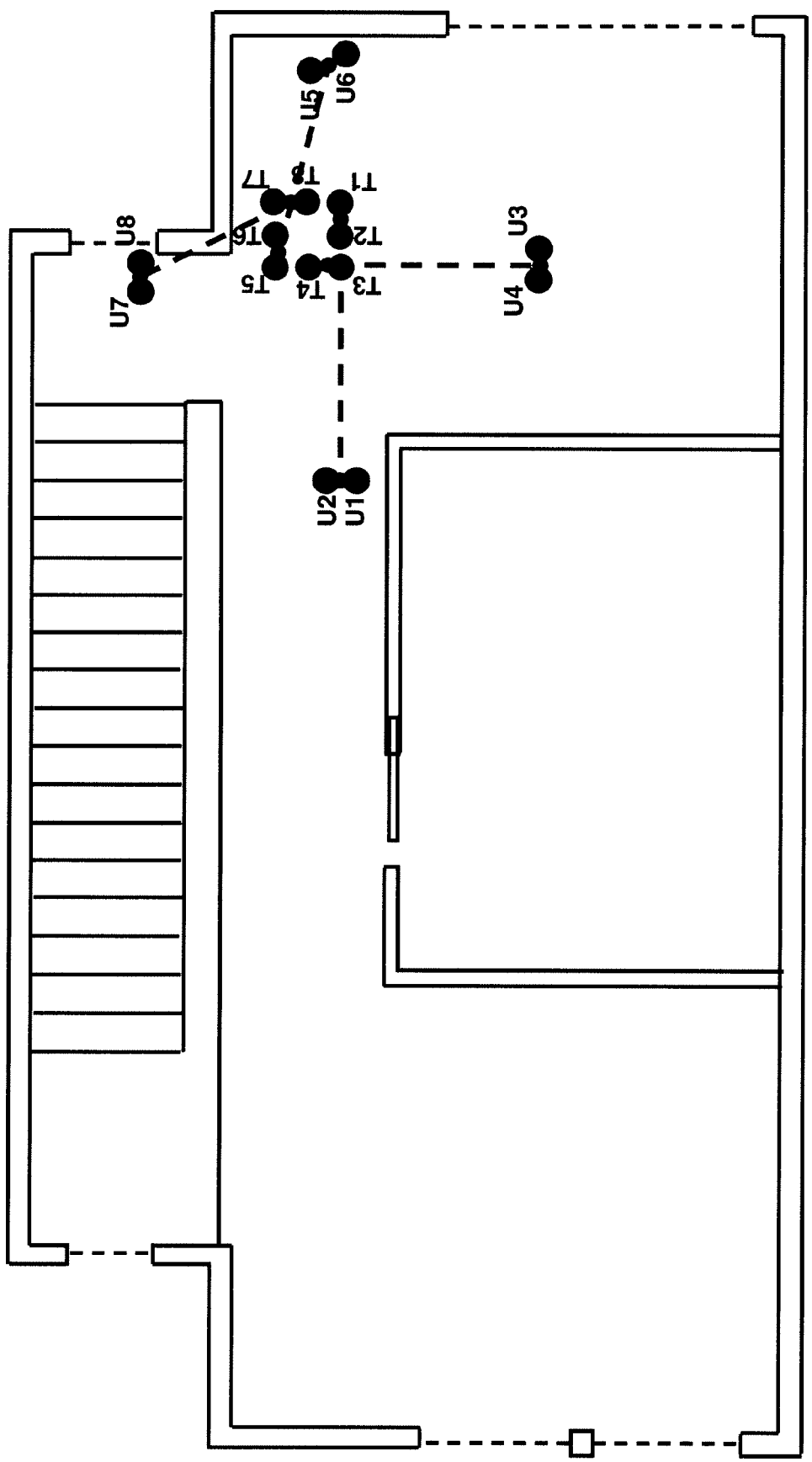
FIG. 27 illustrates one embodiment of the antenna layout for DIDO measurements.
Figure 28:
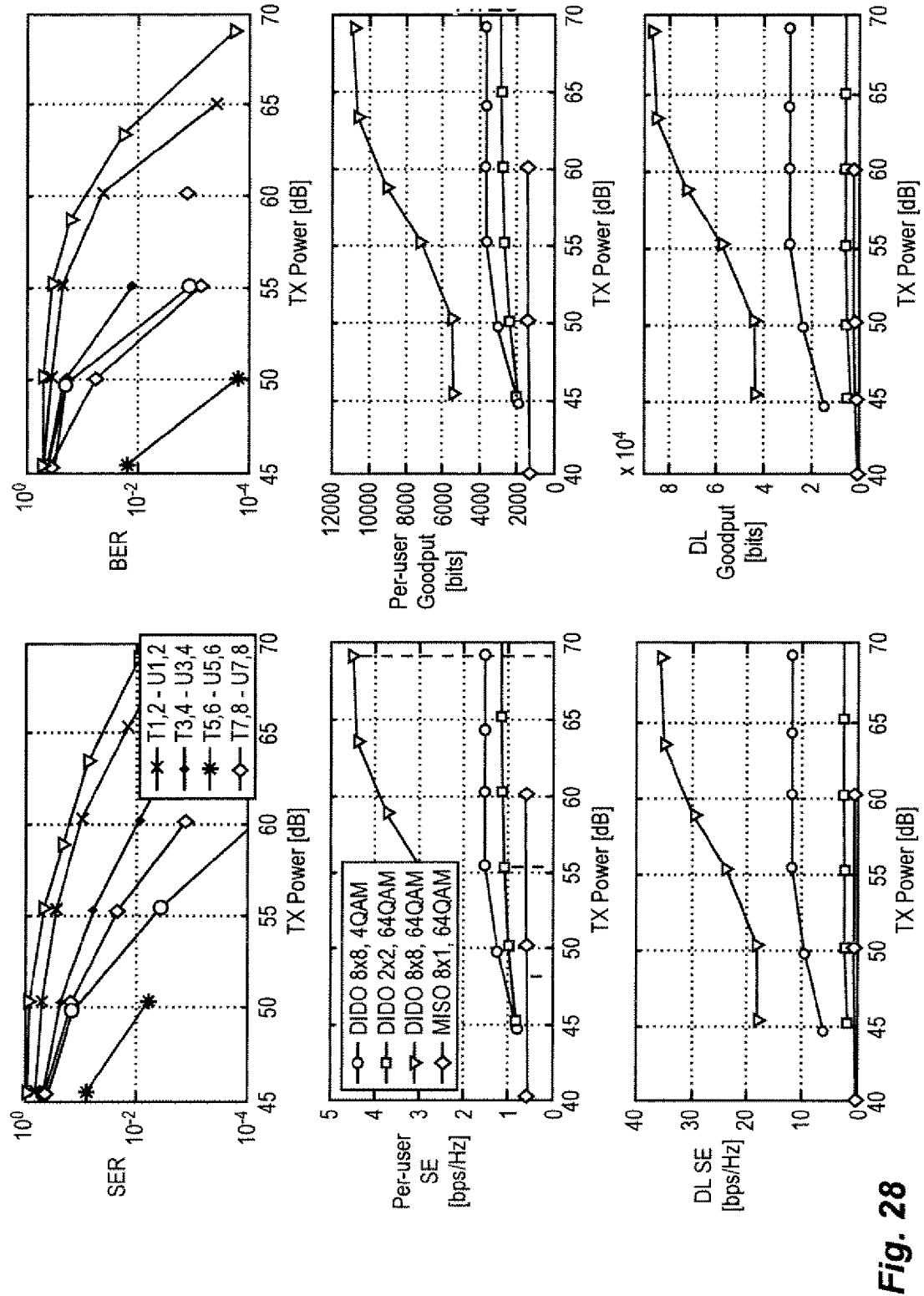
FIG. 28 illustrates how, in one embodiment, DIDO 8×8 yields larger SE than DIDO 2×2 for lower TX power requirement.

For all these cases, an FEC rate of ¾ was used.
The users' locations are depicted in FIG. 27.
In FIG. 28 the SER results show a ~15 dB gap between Systems 2a and 2c due to different array orientations and user locations (similar to the simulation results in FIG. 35). The first subplot in the second row shows the values of TX power for which the SE curves saturate (i.e. corresponding to BER 1e-4). We observe that System 1 yields larger per-user SE for lower TX power requirement (~5 dB less) than System 2. Also, the benefits of DIDO 8×8 versus DIDO 2×2 are more evident for the DL (downlink) SE and DL goodput due to multiplexing gain of DIDO 8×8 over DIDO 2×2. System 4 has lower TX power requirement (8 dB less) than System 1, due to the array gain of beamforming (i.e., MRC with MISO 8×1). But System 4 yields only ⅓ of per-user SE compared to System 1. System 2 performs worse than System 1 (i.e., yields lower SE for larger TX power requirement). Finally, System 3 yields much larger SE (due to larger order modulations) than System 1 for larger TX power requirement (~15 dB).

From these results, the following conclusions may be drawn:

One channel scenario was identified for which DIDO 8×8 outperforms DIDO 2×2 (i.e., yields larger SE for lower TX power requirement);

In this channel scenario, DIDO 8×8 yields larger per user SE and DL SE than DIDO 2×2 and MISO 8×1; and It is possible to further increase the performance of DIDO 8×8 by using higher order modulations (i.e., 64-QAM rather than 4-QAM) at the expense of larger TX power requirements (~15 dB more).

iv. DIDO with Antenna Selection

Hereafter, we evaluate the benefit of the antenna selection algorithm described in R. Chen, R. W. Heath, and J. G. Andrews, "Transmit selection diversity for unitary precoded multiuser spatial multiplexing systems with linear receivers," accepted to IEEE Trans. on Signal Processing, 2005. We present the results for one particular DIDO system with two users, 4-QAM and FEC rate of ½. The following systems are compared in FIG. 27:

DIDO 2×2 with T1,2 and U1,2; and

DIDO 3×2 using antenna selection with T1,2,3 and U1,2.

The transmit antenna's and user device locations are the same as in FIG. 27.

Figure 29:
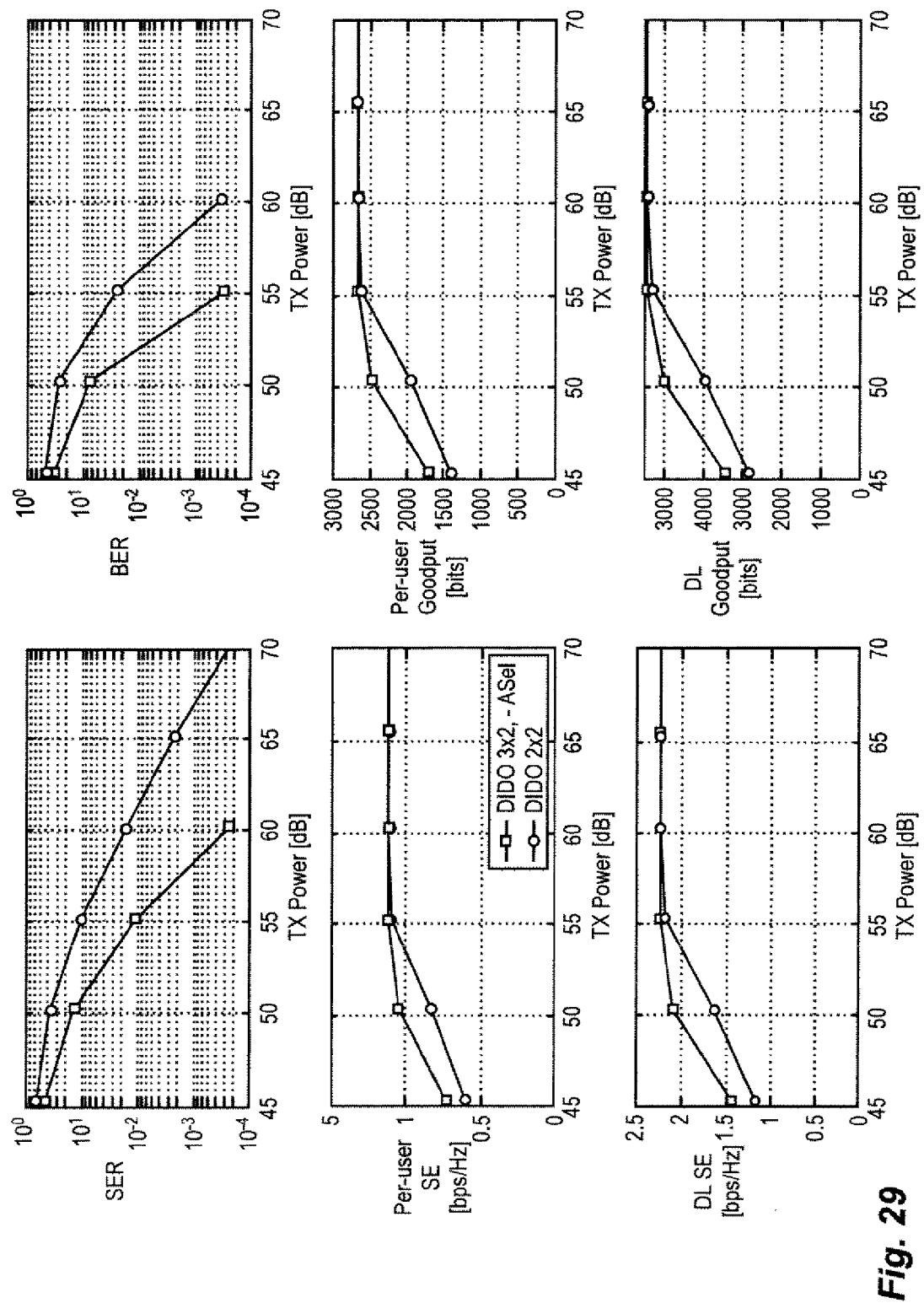
FIG. 29 illustrates one embodiment of DIDO 2×2 performance with antenna selection.

FIG. 29 shows that DIDO 3×2 with antenna selection may provide ~5 dB gain compared to DIDO 2×2 systems (with no selection). Note that the channel is almost static (i.e., no Doppler), so the selection algorithms adapts to the path-loss and channel spatial correlation rather than the fast-fading. We should be seeing different gains in scenarios with high Doppler. Also, in this particular experiment it was observed that the antenna selection algorithm selects antennas 2 and 3 for transmission.

iv. SNR Thresholds for the LUTs

In section [0171] we stated that the mode selection is enabled by LUTs. The LUTs can be pre-computed by evaluating the SNR thresholds to achieve certain predefined target error-rate performance for the DIDO transmission modes in different propagation environments. Hereafter, we provide the performance of DIDO systems with and without antenna selection and variable number of users that can be used as guidelines to construct the LUTs. While FIGS. 24, 26, 28, 29 were derived from practical measurements with the DIDO prototype, the following Figures are obtained through simulations. The following BER results assume no FEC.

Figure 30:
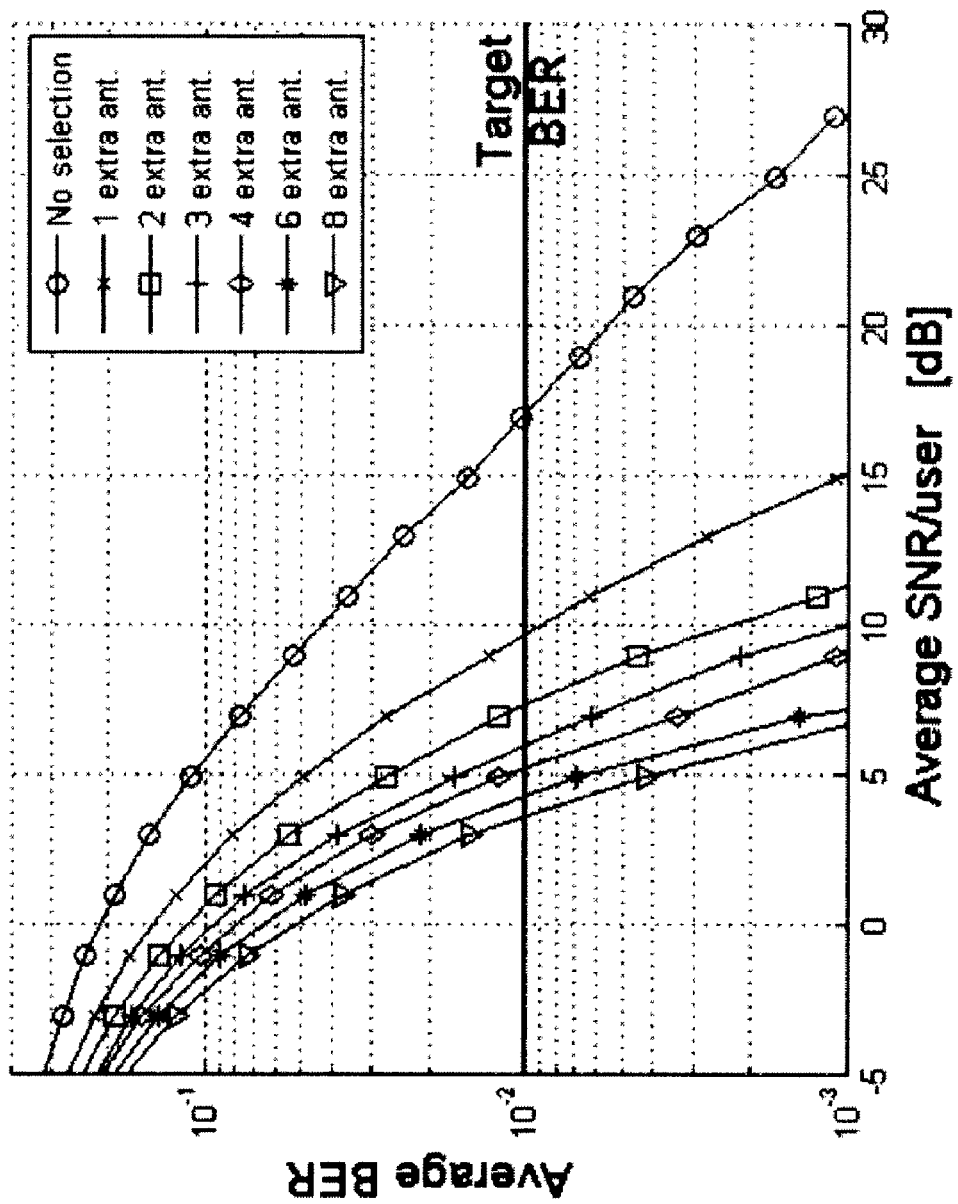
FIG. 30 illustrates average bit error rate (BER) performance of different DIDO precoding schemes in i.i.d. channels.

FIG. 30 shows the average BER performance of different DIDO precoding schemes in i.i.d. channels. The curve labeled as 'no selection' refers to the case when BD is employed. In the same figure the performance of antenna selection (ASel) is shown for different number of extra antennas (with respect to the number of users). It is possible to see that as the number of extra antennas increases, ASel provides better diversity gain (characterized by the slope of the BER curve in high SNR regime), resulting in better coverage. For example, if we fix the target BER to $10^{-2}$ (practical value for uncoded systems), the SNR gain provided by ASel increases with the number of antennas.

Figure 31:
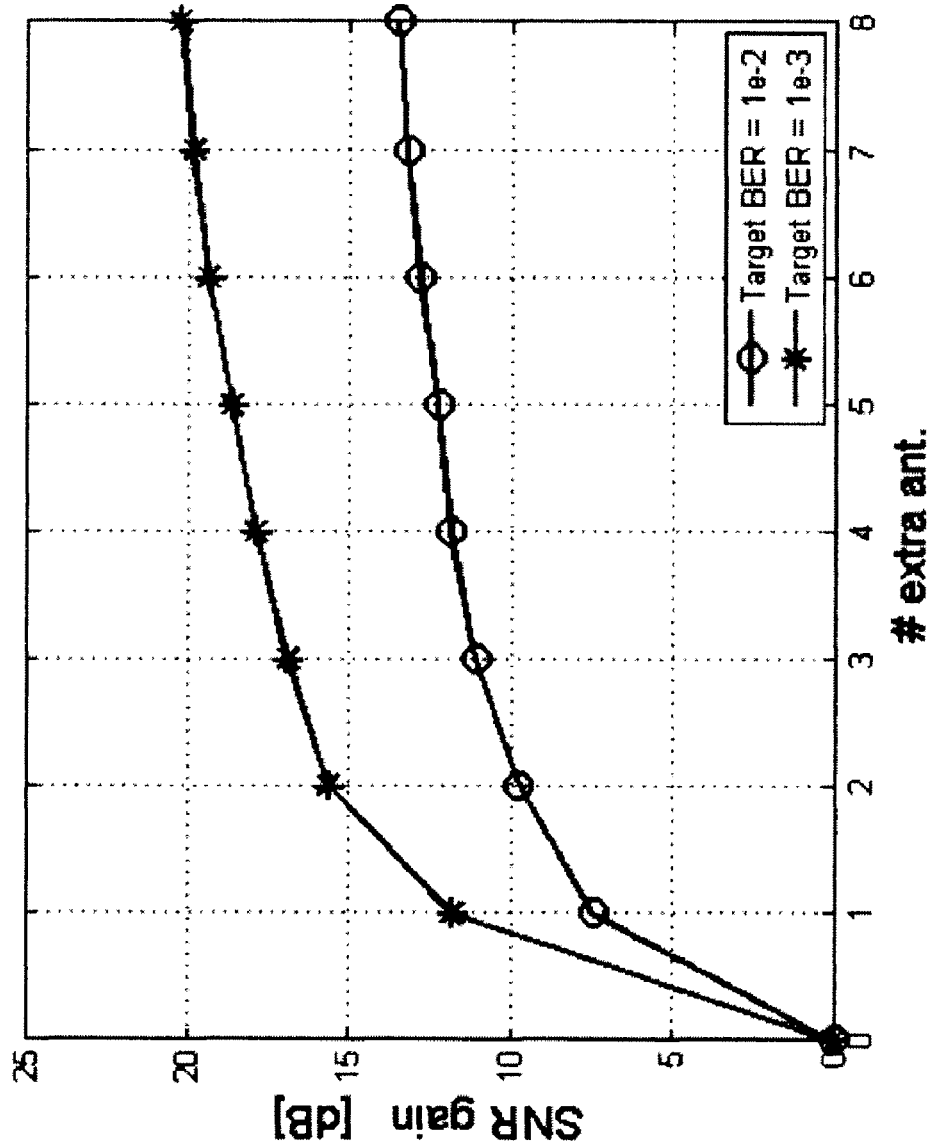
FIG. 31 illustrates the signal to noise ratio (SNR) gain of ASel as a function of the number of extra transmit antennas in i.i.d. channels.

FIG. 31 shows the SNR gain of ASel as a function of the number of extra transmit antennas in i.i.d. channels, for different targets BER. It is possible to see that, just by adding 1 or 2 antennas, ASel yields significant SNR gains compared to BD. In the following sections, we will evaluate the performance of ASel only for the cases of 1 or 2 extra antennas and by fixing the target BER to $10^{-2}$ (for uncoded systems).

Figure 32:
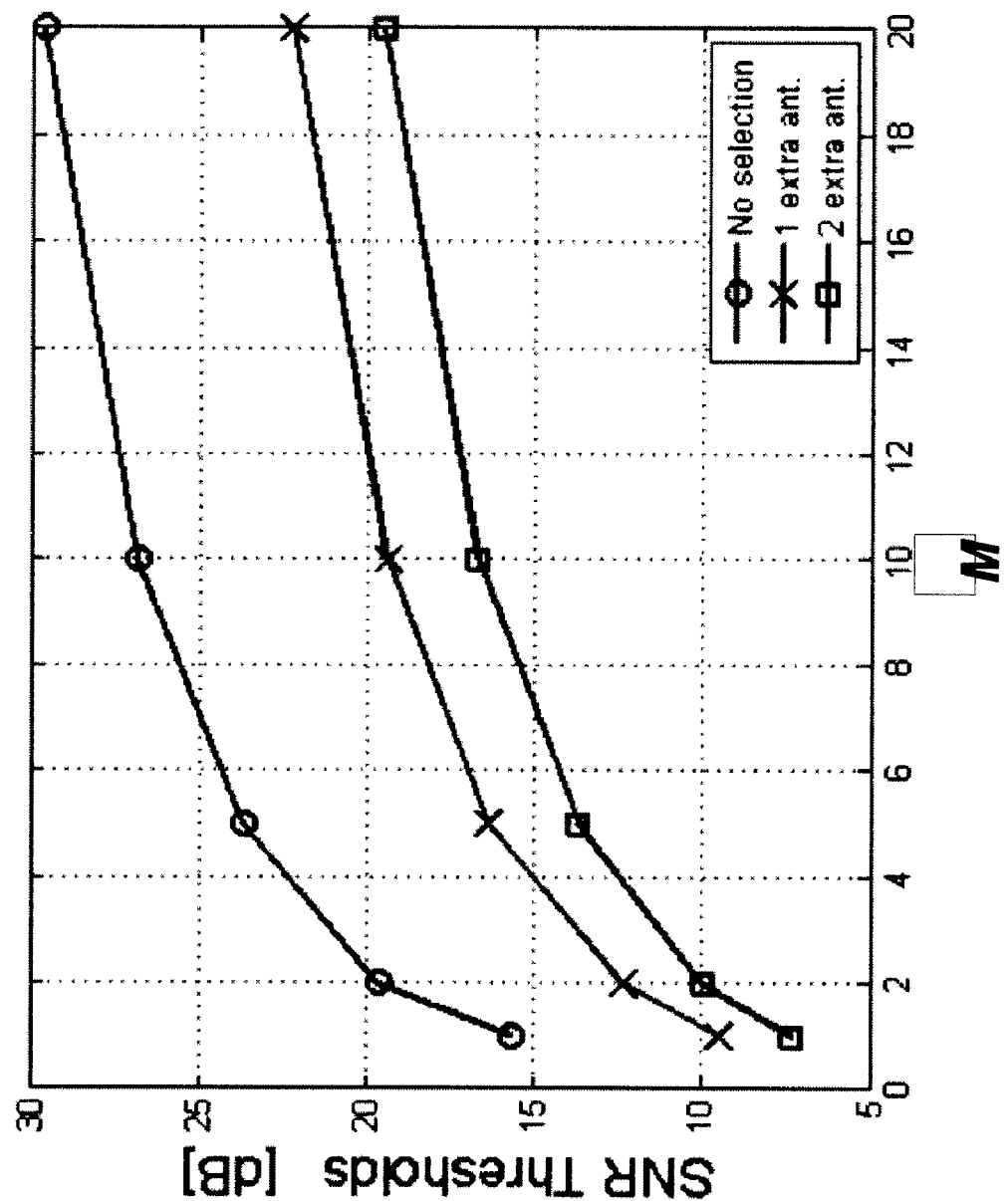
FIG. 32 illustrates the SNR thresholds as a function of the number of users (M) for block diagnalization (BD) and ASel with 1 and 2 extra antennas in i.i.d. channels.

FIG. 32 depicts the SNR thresholds as a function of the number of users (M) for BD and ASel with 1 and 2 extra antennas in i.i.d. channels. We observe that the SNR thresholds increase with M due to the larger receive SNR requirement for larger number of users. Note that we assume fixed total transmit power (with variable number of transmit antennas) for any number of users. Moreover, FIG. 32 shows that the gain due to antenna selection is constant for any number of users in i.i.d. channels.

Hereafter, we show the performance of DIDO systems in spatially correlated channels. We simulate each user's channel through the COST-259 spatial channel model described in X. Zhuang, F. W. Vook, K. L. Baum, T. A. Thomas, and M. Cudak, "Channel models for link and system level simulations," IEEE 802.16 Broadband Wireless Access Working Group, September 2004. We generate single-cluster for each user. As a case study, we assume NLOS channels, uniform linear array (ULA) at the transmitter, with element spacing of 0.5 lambda. For the case of 2-user system, we simulate the clusters with mean angles of arrival AOA1 and AOA2 for the first and second user, respectively. The AOAs are measured with respect to the broadside direction of the ULA. When more than two users are in the system, we generate the users' clusters with uniformly spaced mean AOAs in the range [$-\phi_m$, $\phi_m$], where we define $$\Phi_M = \frac{\Delta\phi(M-1)}{2} \quad (13)$$

with K being the number of users and $\Delta\phi$ is the angular separation between the users' mean AOAs. Note that the angular range [$-\phi_m,\phi_m$] is centered at the 0° angle, corresponding to the broadside direction of the ULA. Hereafter, we study the BER performance of DIDO systems as a function of the channel angle spread (AS) and angular separation between users, with BD and ASel transmission schemes and different numbers of users.

Figure 33:
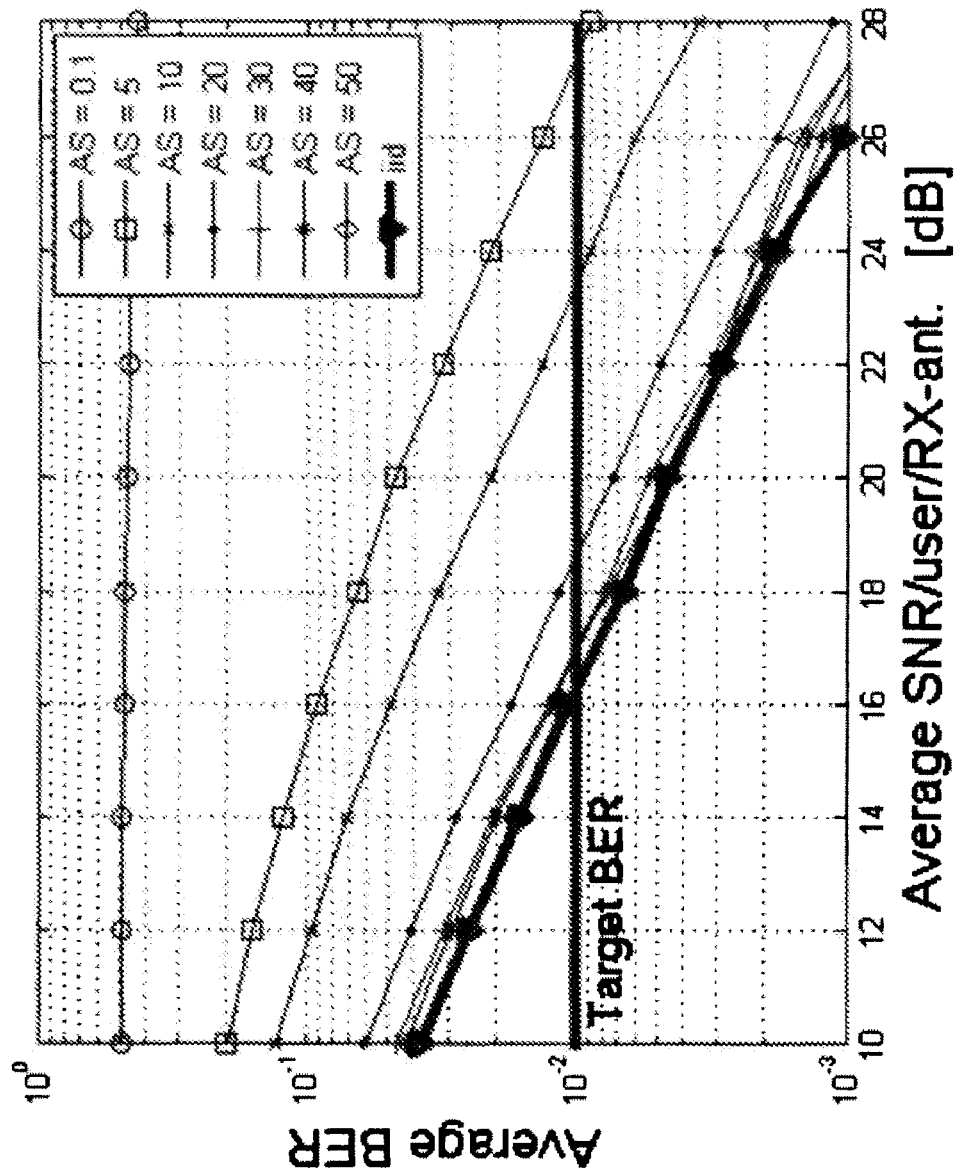
FIG. 33 illustrates the BER versus per-user average SNR for two users located at the same angular direction with different values of Angle Spread (AS).

FIG. 33 depicts the BER versus per-user average SNR for two users located at the same angular direction (i.e., AOA1=AOA2=0°, with respect to the broadside direction of the ULA), with different values of AS. It is possible to see that as the AS increases the BER performance improves and approaches the i.i.d. case. In fact, higher AS yields statistically less overlapping between the eigenmodes of the two users and better performance of the BD precoder.

Figure 34:
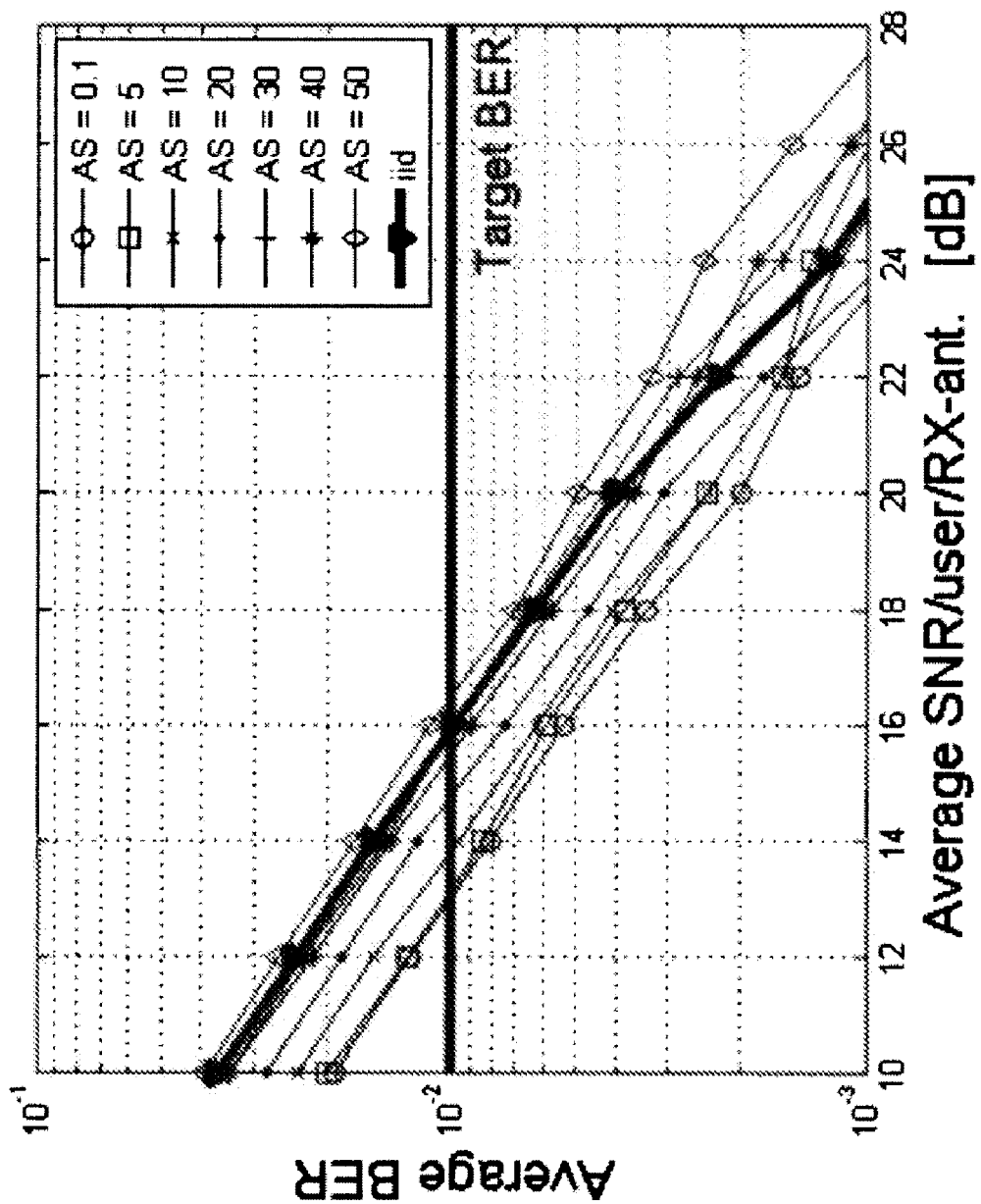
FIG. 34 illustrates similar results as FIG. 33, but with higher angular separation between the users.

FIG. 34 shows similar results as FIG. 33, but with higher angular separation between the users. We consider AOA1=0° and AOA2=90° (i.e., 90° angular separation). The best performance is now achieved in the low AS case. In fact, for the case of high angle separation, there is less overlapping between the users' eigenmodes when the angular spread is low. Interestingly, we observe that the BER performance in low AS is better than i.i.d. channels for the same reasons just mentioned.

Next, we compute the SNR thresholds, for target BER of $10^{-2}$ in different correlation scenarios. FIG. 35 plots the SNR thresholds as a function of the AS for different values of the mean AOAs of the users. For low users' angular separation reliable transmissions with reasonable SNR requirement (i.e., 18 dB) are possible only for channels characterized by high AS. On the other hand, when the users are spatially separated, less SNR is required to meet the same target BER.

Figure 36:
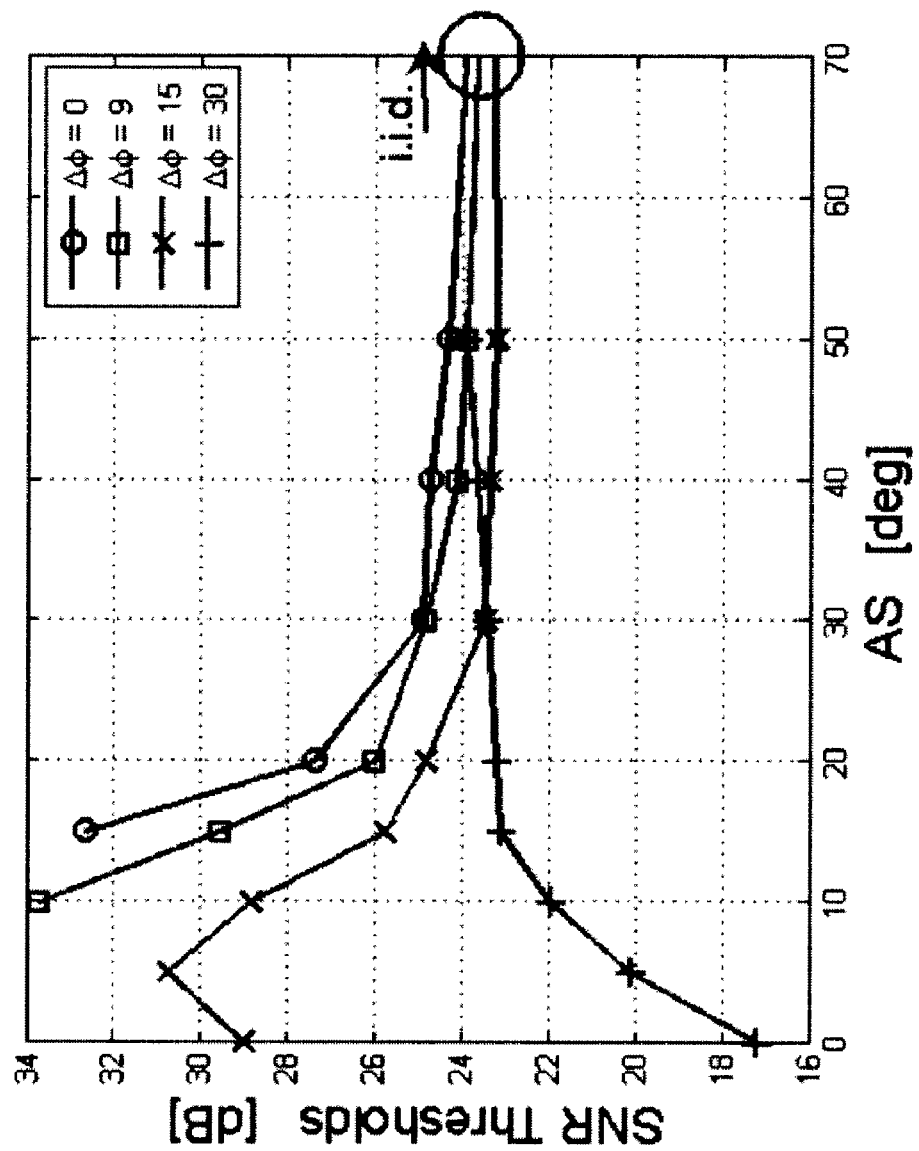
FIG. 36 illustrates the SNR threshold for an exemplary case of five users.

FIG. 36 shows the SNR threshold for the case of five users. The users' mean AOAs are generated according to the definition in (13), with different values of angular separation $\Delta\phi$. We observe that for $\Delta\phi=0°$ and AS<15°, BD performs poorly due to the small angle separation between users, and the target BER is not satisfied. For increasing AS the SNR requirement to meet the fixed target BER decreases. On the other end, for $\Delta\phi=30°$, the smallest SNR requirement is obtained at low AS, consistently to the results in FIG. 35. As the AS increases, the SNR thresholds saturate to the one of i.i.d. channels. Note that $\Delta\phi=30°$ with 5 users corresponds to the AOA range of [−60°, 60°], that is typical for base stations in cellular systems with 120° sectorized cells.

Figure 37:
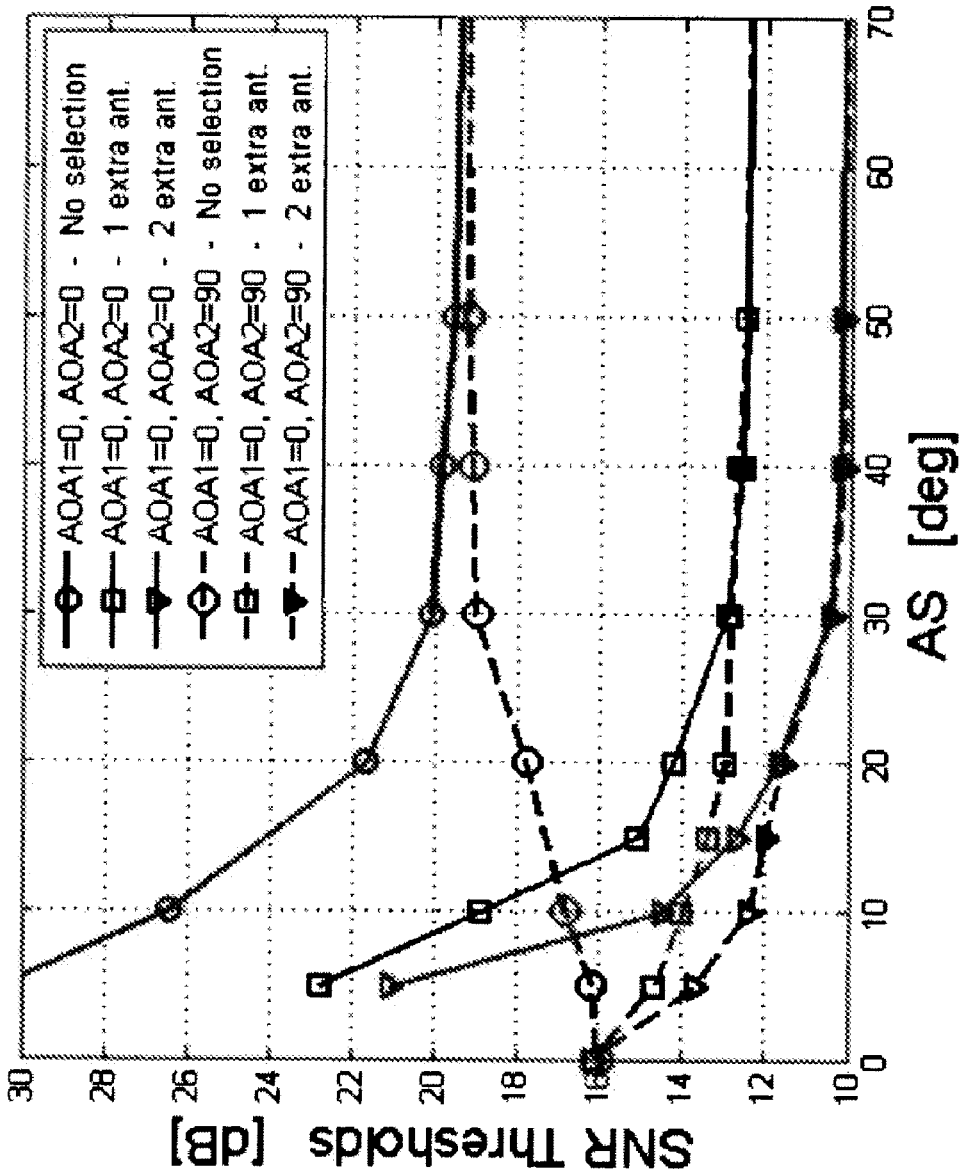
FIG. 37 provides a comparison of the SNR threshold of BD and ASel, with 1 and 2 extra antennas, for two user case.
Figure 38:
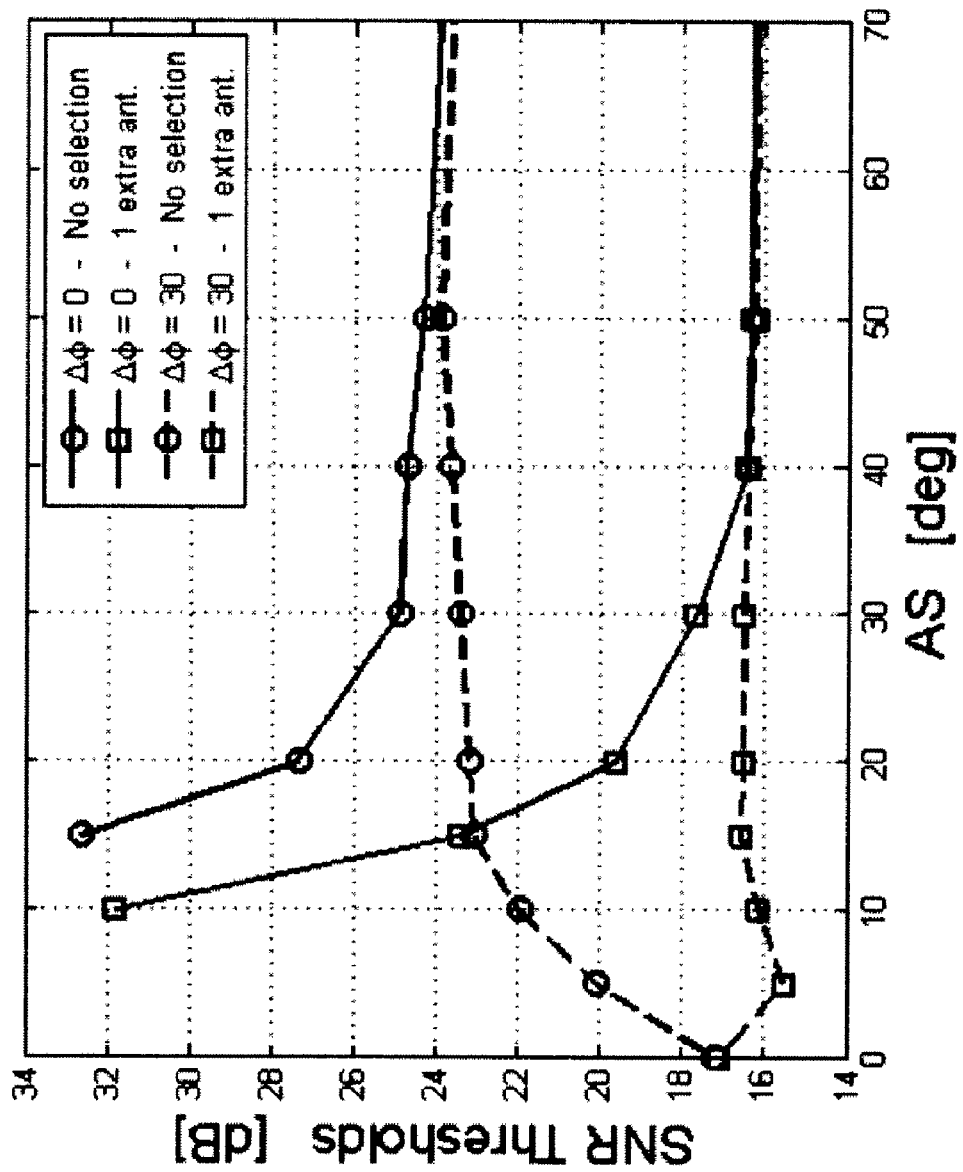
FIG. 38 illustrates similar results as FIG. 37, but for a five user case.

Next, we study the performance of ASel transmission scheme in spatially correlated channels. FIG. 37 compares the SNR threshold of BD and ASel, with 1 and 2 extra antennas, for two user case. We consider two different cases of angular separation between users: {AOA1=0°,AOA2=0°} and {AOA1=0°,AOA2=90°}. The curves for BD scheme (i.e., no antenna selection) are the same as in FIG. 35. We observe that ASel yields 8 dB and 10 dB SNR gains with 1 and 2 extra antennas, respectively, for high AS. As the AS decreases, the gain due to ASel over BD becomes smaller due to the reduced number of degrees of freedom in the MIMO broadcast channel. Interestingly, for AS=0° (i.e., close to LOS channels) and the case {AOA1=0°,AOA2=90°}, ASel does not provide any gain due to the luck of diversity in the space domain. FIG. 38 shows similar results as FIG. 37, but for five user case.

We compute the SNR thresholds (assuming usual target BER of $10^{-2}$) as a function of the number of users in the system (M), for both BD and ASel transmission schemes. The SNR thresholds correspond to the average SNR, such that the total transmit power is constant for any M. We assume maximum separation between the mean AOAs of each user's cluster within the azimuth range $[-\phi_m,\phi_m]=[-60°, 60°]$. Then, the angular separation between users is $\Delta\phi=120°/(M-1)$.

Figure 39:
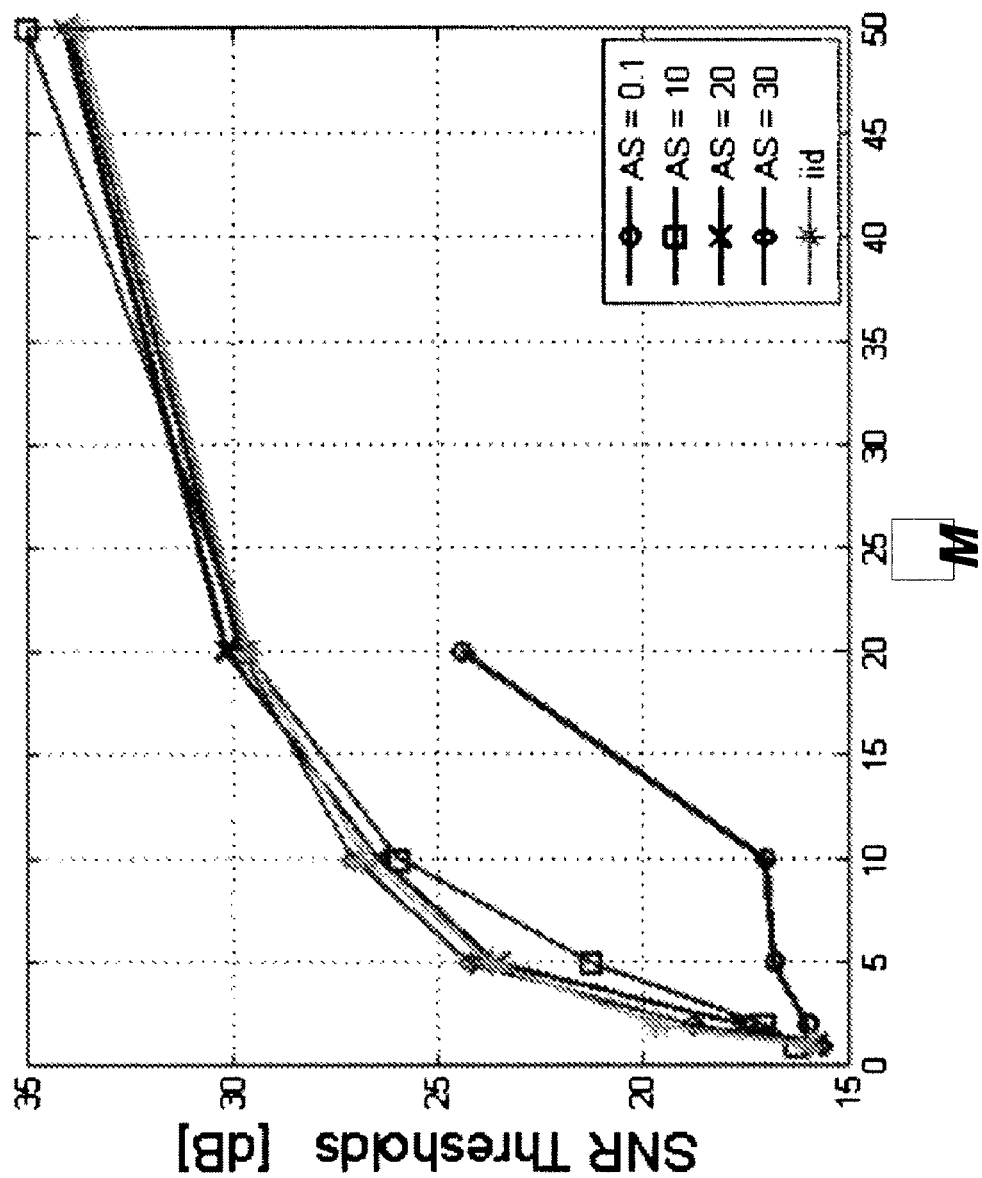

FIG. 39 shows the SNR thresholds for BD scheme with different values of AS. We observe that the lowest SNR requirement is obtained for AS=0.1° (i.e., low angle spread) with relatively small number of users (i.e., K≦20), due to the large angular separation between users. For M>50, however, the SNR requirement is way above 40 dB, since $\Delta\phi$ is very small, and BD is impractical. Moreover, for AS>10° the SNR thresholds remain almost constant for any M, and the DIDO system in spatially correlated channels approaches the performance of i.i.d. channels.

Figure 40:
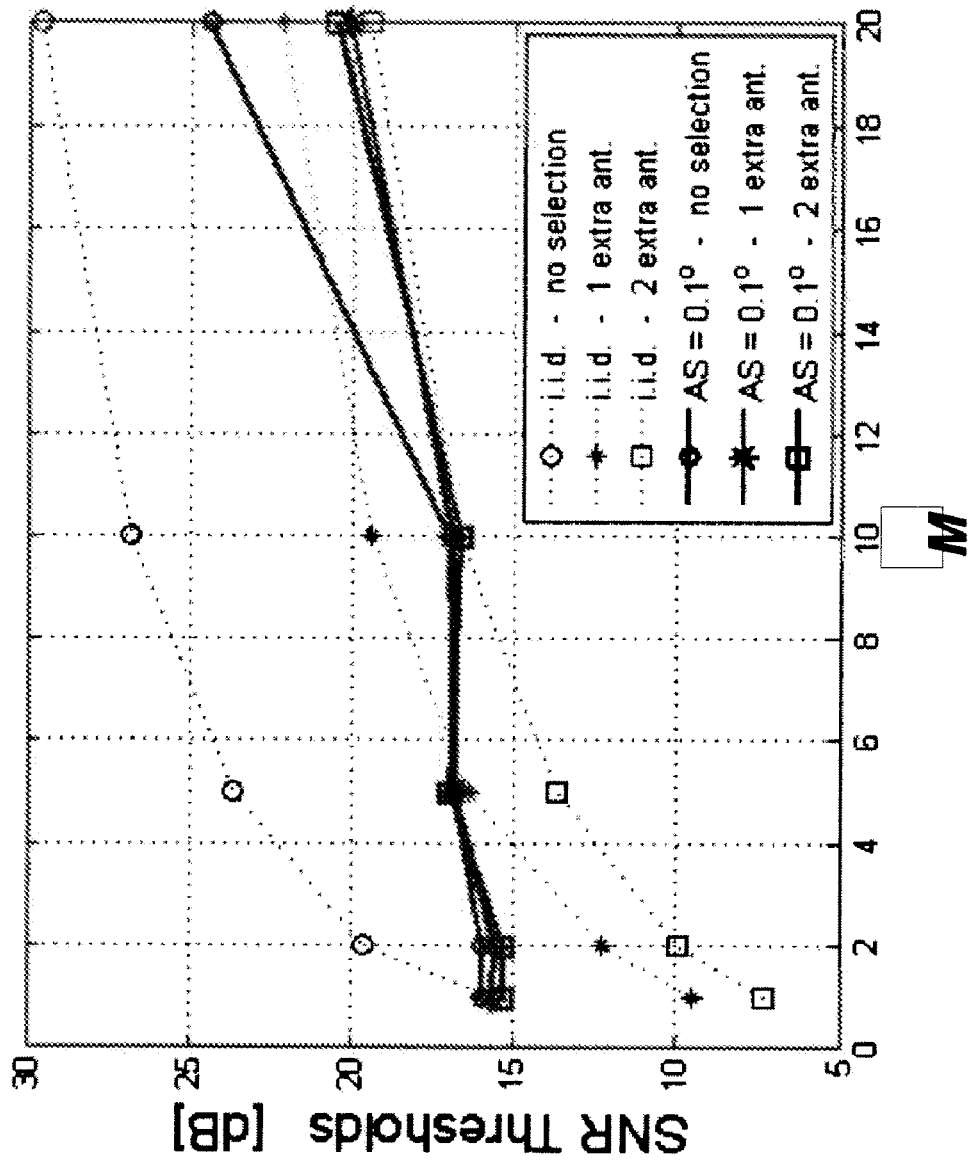
FIG. 40 illustrates the SNR thresholds in spatially correlated channels with AS=0.1° for BD and ASel with 1 and 2 extra antennas.

To reduce the values of the SNR thresholds and improve the performance of the DIDO system we apply ASel transmission scheme. FIG. 40 depicts the SNR thresholds in spatially correlated channels with AS=0.1° for BD and ASel with 1 and 2 extra antennas. For reference we report also the curves for the i.i.d. case shown in FIG. 32. It is possible to see that, for low number of users (i.e., M≦10), antenna selection does not help reducing the SNR requirement due to the lack of diversity in the DIDO broadcast channel. As the number of users increases, ASel benefits from multiuser diversity yielding SNR gains (i.e., 4 dB for M=20). Moreover, for M≦20, the performance of ASel with 1 or 2 extra antennas in highly spatially correlated channels is the same.

Figure 41:
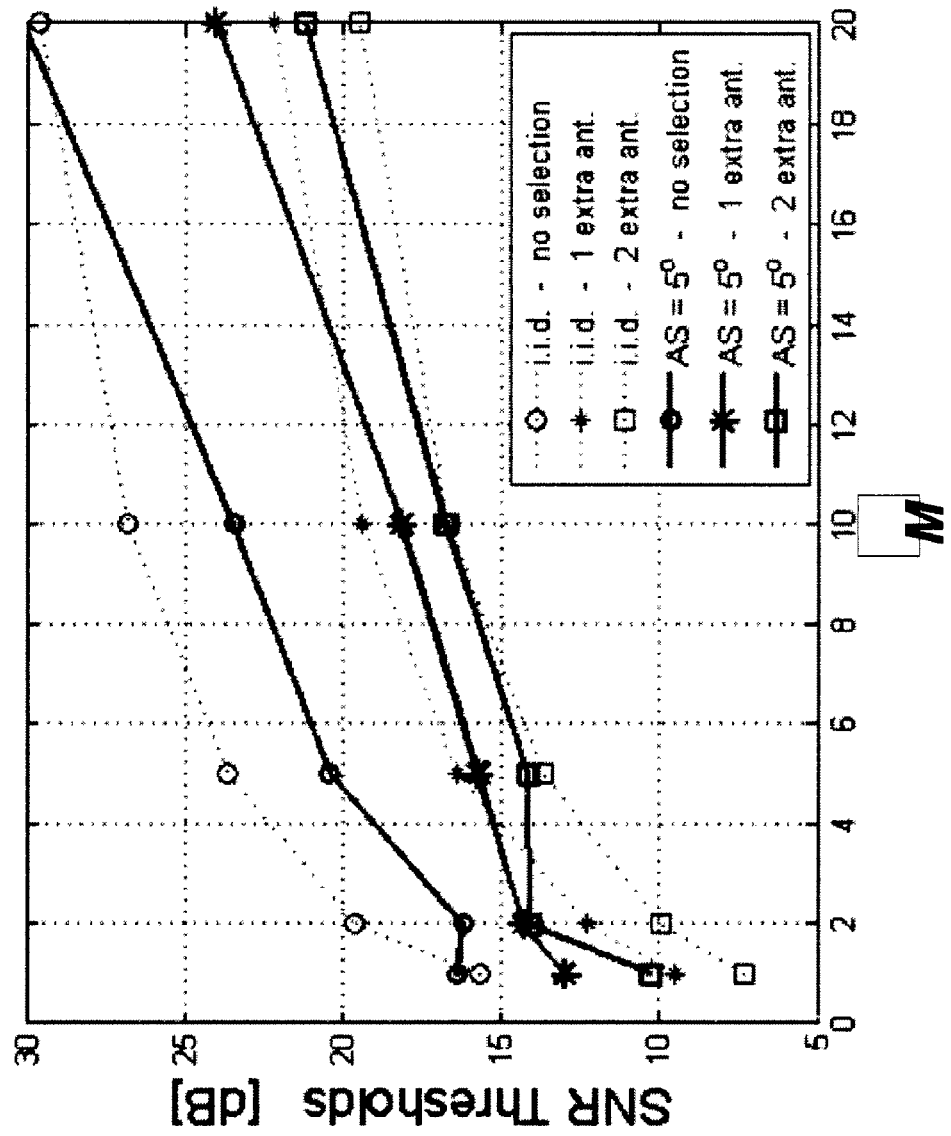
FIG. 41 illustrates the computation of the SNR thresholds for two more channel scenarios with AS=5°.
Figure 42:
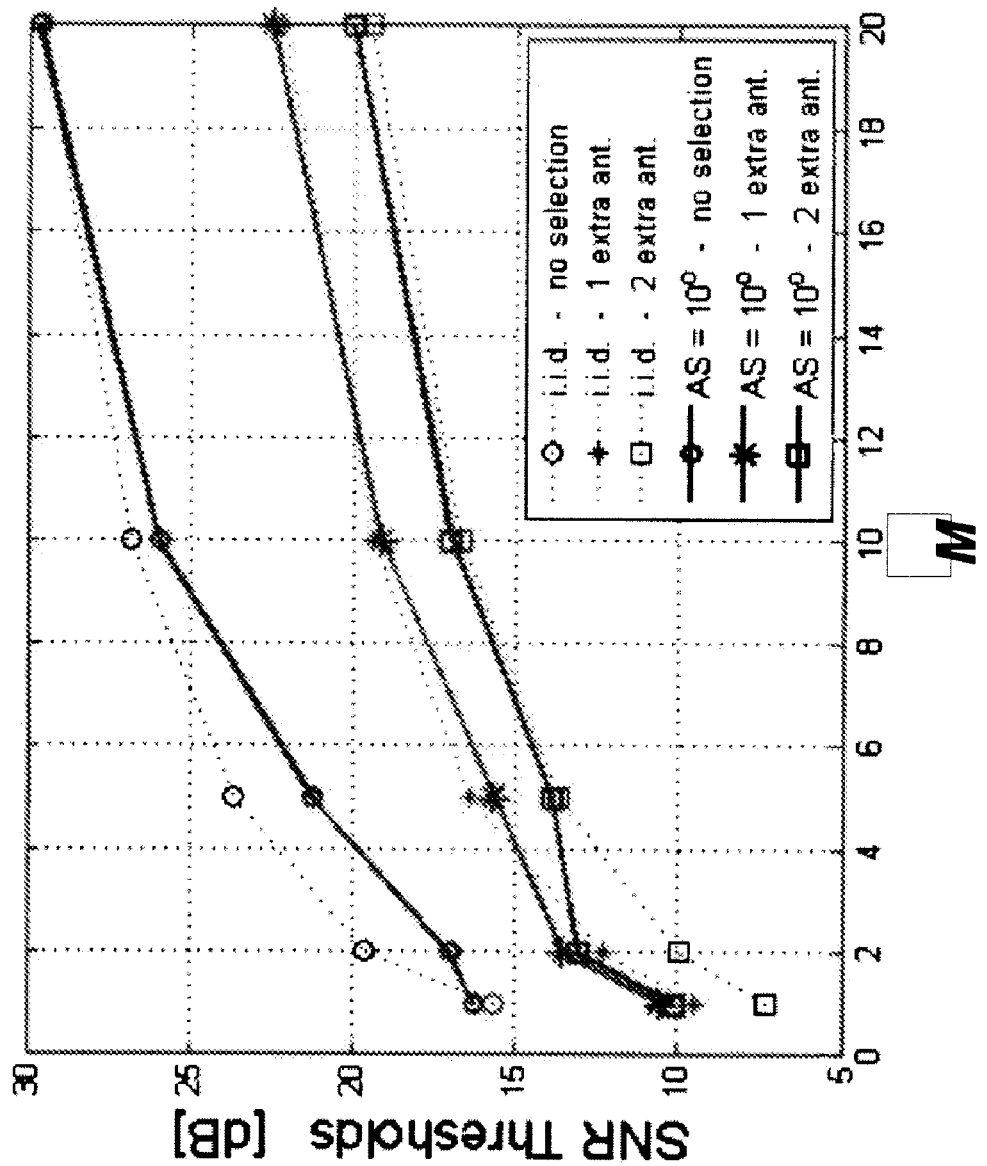
FIG. 42 illustrates the computation of the SNR thresholds for two more channel scenarios with AS=10°.

We then compute the SNR thresholds for two more channel scenarios: AS=5° in FIG. 41 and AS=10° in FIG. 42. FIG. 41 shows that ASel yields SNR gains also for relatively small number of users (i.e., M≦10) as opposed to FIG. 40, due to the larger angle spread. For AS=10° the SNR thresholds reduce further and the gains due to ASel get higher, as reported in FIG. 42.

Figure 43:
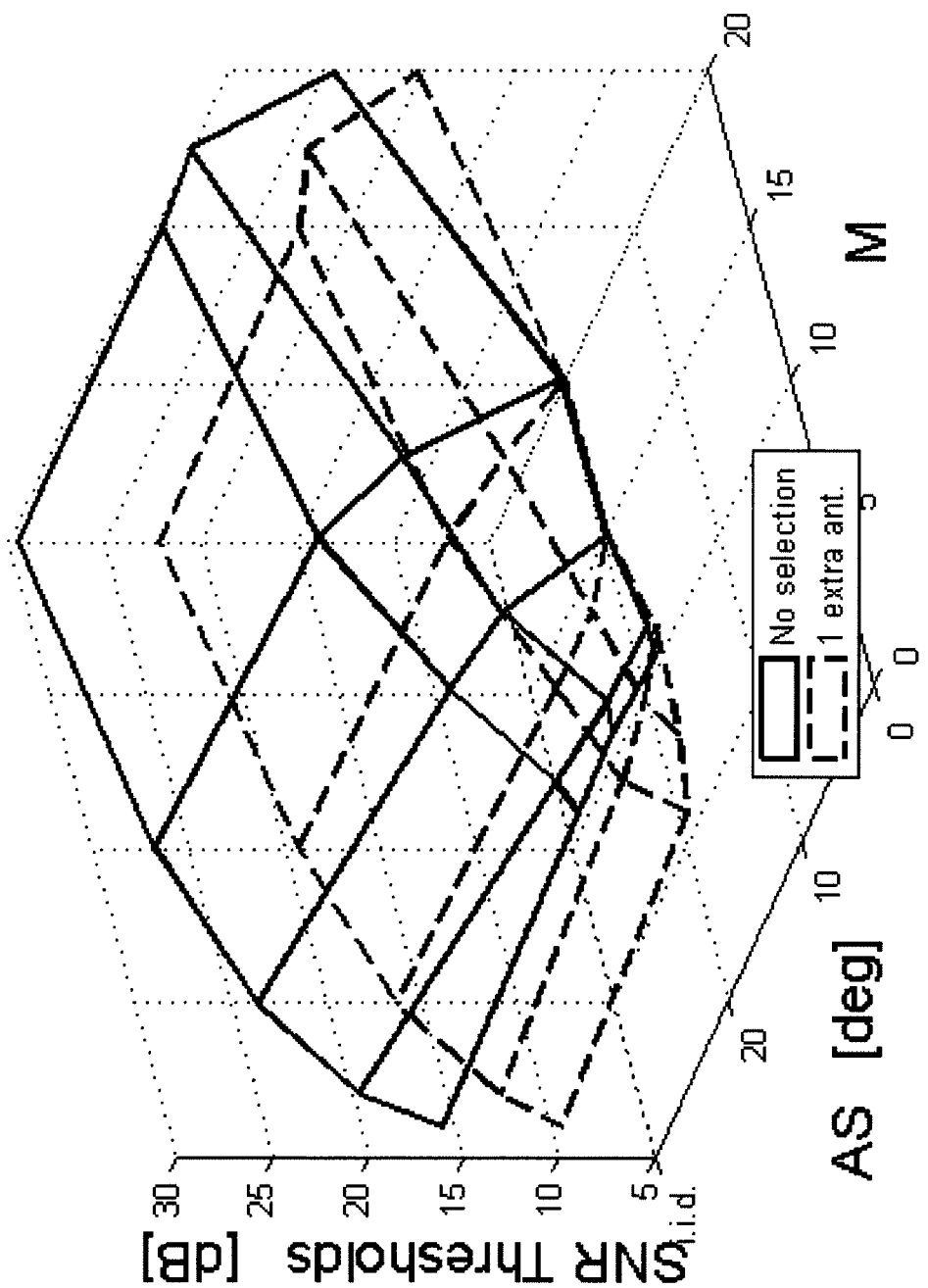
FIGS. 43-44 illustrate the SNR thresholds as a function of the number of users (M) and angle spread (AS) for BD and ASel schemes, with 1 and 2 extra antennas, respectively.
Figure 44:
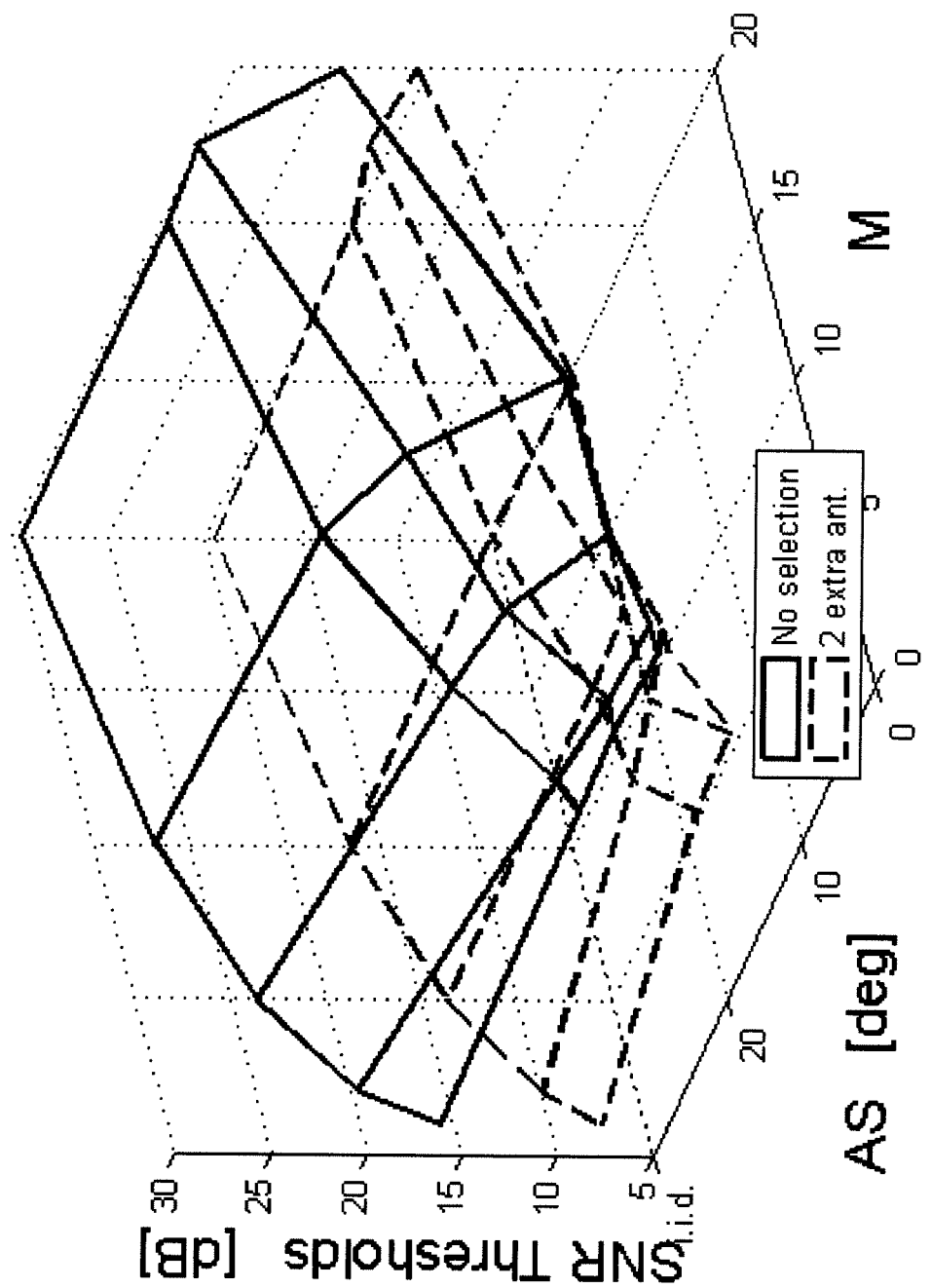

Finally, we summarize the results presented so far for correlated channels. FIG. 43 and FIG. 44 show the SNR thresholds as a function of the number of users (M) and angle spread (AS) for BD and ASel schemes, with 1 and 2 extra antennas, respectively. Note that the case of AS=30° corresponds actually to i.i.d. channels, and we used this value of AS in the plot only for graphical representation. We observe that, while BD is affected by the channel spatial correlation, ASel yields almost the same performance for any AS. Moreover, for AS=0.1°, ASel performs similarly to BD for low M, whereas outperforms BD for large M (i.e., M≧20), due to multiuser diversity.

Figure 49:
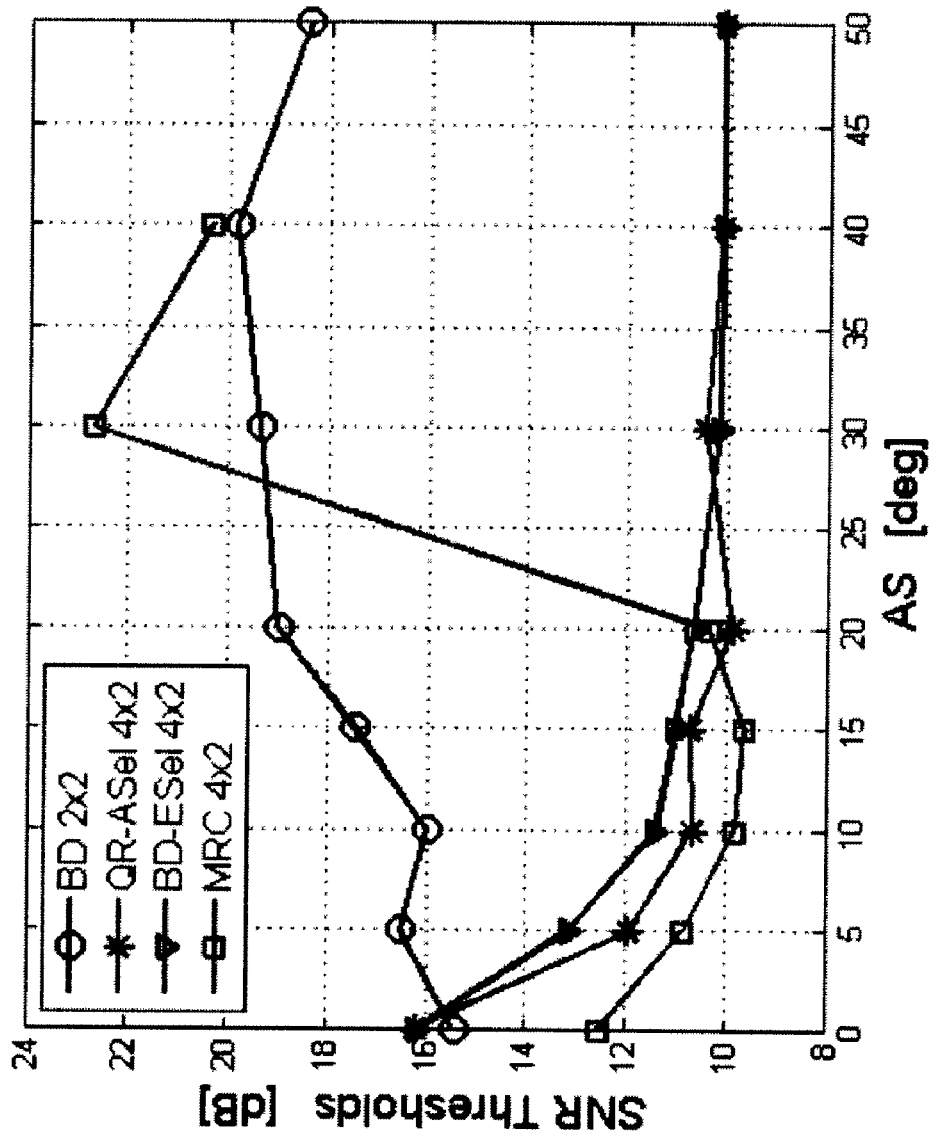
FIG. 49 compares the performance of different DIDO schemes in terms of SNR thresholds.

FIG. 49 compares the performance of different DIDO schemes in terms of SNR thresholds. The DIDO schemes considered are: BD, ASel, BD with eigenmode selection (BD-ESel) and maximum ratio combining (MRC). Note that MRC, does not pre-cancel interference at the transmitter (unlike the other methods), but does provide larger gain in case the users are spatially separated. In FIG. 49 we plot the SNR threshold for target BER=10-2 for DIDO N×2 systems when the two users are located at −30° and 30° from the broadside direction of the transmit array, respectively. We observe that for low AS the MRC scheme provides 3 dB gain compared to the other schemes since the users' spatial channels are well separated and the effect of inter-user interference is low. Note that the gain of MRC over DIDO N×2 are due to array gain. For AS larger than 20° the QR-ASel scheme outperforms the other and yields about 10 dB gain compared to BD 2×2 with no selection. QR-ASel and BD-ESel provide about the same performance for any value of AS.

Described above is a novel adaptive transmission technique for DIDO systems. This method dynamically switches between DIDO transmission modes to different users to enhance throughput for fixed target error rate. The performance of different order DIDO systems was measured in different propagation conditions and it was observed that significant gains in throughput may be achieved by dynamically selecting the DIDO modes and number of users as a function of the propagation conditions.

III. Pre-Compensation of Frequency and Phase Offset a. Background

As previously described, wireless communication systems use carrier waves to convey information. These carrier waves are usually sinusoids that are amplitude and/or phase modulated in response to information to be transmitted. The nominal frequency of the sinusoid is known as the carrier frequency. To create this waveform, the transmitter synthesizes one or more sinusoids and uses upconversion to create a modulated signal riding on a sinusoid with the prescribed carrier frequency. This may be done through direct conversion where the signal is directly modulated on the carrier or through multiple upconversion stages. To process this waveform, the receiver must demodulate the received RF signal and effectively remove the modulating carrier. This requires that the receiver synthesize one or more sinusoidal signals to reverse the process of modulation at the transmitter, known as downconversion. Unfortunately, the sinusoidal signals generated at the transmitter and receiver are derived from different reference oscillators. No reference oscillator creates a perfect frequency reference; in practice there is always some deviation from the true frequency.

In wireless communication systems, the differences in the outputs of the reference oscillators at the transmitter and receivers create the phenomena known as carrier frequency offset, or simply frequency offset, at the receiver. Essentially there is some residual modulation in the received signal (corresponding to the difference in the transmit and receive carriers), which occurs after downconversion. This creates distortion in the received signal resulting in higher bit error rates and lower throughput.

There are different techniques for dealing with carrier frequency offset. Most approaches estimate the carrier frequency offset at the receiver and then apply a carrier frequency offset correction algorithm. The carrier frequency offset estimation algorithm may be blind using offset QAM (T. Fusco and M. Tanda, "Blind Frequency-offset Estimation for OFDM/OQAM Systems," IEEE Transactions on Signal Processing, vol. 55, pp. 1828-1838, 2007); periodic properties (E. Serpedin, A. Chevreuil, G. B. Giannakis, and P. Loubaton, "Blind channel and carrier frequency offset estimation using periodic modulation precoders," IEEE Transactions on Signal Processing, vol. 48, no. 8, pp. 2389-2405, August 2000); or the cyclic prefix in orthogonal frequency division multiplexing (OFDM) structure approaches (J. J. van de Beek, M. Sandell, and P. O. Borjesson, "ML estimation of time and frequency offset in OFDM systems," IEEE Transactions on Signal Processing, vol. 45, no. 7, pp. 1800-1805, July 1997; U. Tureli, H. Liu, and M. D. Zoltowski, "OFDM blind carrier offset estimation: ESPRIT," IEEE Trans. Commun., vol. 48, no. 9, pp. 1459-1461, September 2000; M. Luise, M. Marselli, and R. Reggiannini, "Low-complexity blind carrier frequency recovery for OFDM signals over frequency-selective radio channels," IEEE Trans. Commun., vol. 50, no. 7, pp. 1182-1188, July 2002).

Alternatively special training signals may be utilized including a repeated data symbol (P. H. Moose, "A technique for orthogonal frequency division multiplexing frequency offset correction," IEEE Trans. Commun., vol. 42, no. 10, pp. 2908-2914, October 1994); two different symbols (T. M. Schmidl and D. C. Cox, "Robust frequency and timing synchronization for OFDM," IEEE Trans. Commun., vol. 45, no. 12, pp. 1613-1621, December 1997); or periodically inserted known symbol sequences (M. Luise and R. Reggiannini, "Carrier frequency acquisition and tracking for OFDM systems," IEEE Trans. Commun., vol. 44, no. 11, pp. 1590-1598, November 1996). The correction may occur in analog or in digital. The receiver can also use carrier frequency offset estimation to precorrect the transmitted signal to eliminate offset. Carrier frequency offset correction has been studied extensively for multicarrier and OFDM systems due to their sensitivity to frequency offset (J. J. van de Beek, M. Sandell, and P. O. Borjesson, "ML estimation of time and frequency offset in OFDM systems," Signal Processing, IEEE Transactions on [see also Acoustics, Speech, and Signal Processing, IEEE Transactions on], vol. 45, no. 7, pp. 1800-1805, July 1997; U. Tureli, H. Liu, and M. D. Zoltowski, "OFDM blind carrier offset estimation: ESPRIT," IEEE Trans. Commun., vol. 48, no. 9, pp. 1459-1461, September 2000; T. M. Schmidl and D. C. Cox, "Robust frequency and timing synchronization for OFDM," IEEE Trans. Commun., vol. 45, no. 12, pp. 1613-1621, December 1997; M. Luise, M. Marselli, and R. Reggiannini, "Low-complexity blind carrier frequency recovery for OFDM signals over frequency-selective radio channels," IEEE Trans. Commun., vol. 50, no. 7, pp. 1182-1188, July 2002).

Frequency offset estimation and correction is an important issue for multi-antenna communication systems, or more generally MIMO (multiple input multiple output) systems. In MIMO systems where the transmit antennas are locked to one frequency reference and the receivers are locked to another frequency reference, there is a single offset between the transmitter and receiver. Several algorithms have been proposed to tackle this problem using training signals (K. Lee and J. Chun, "Frequency-offset estimation for MIMO and OFDM systems using orthogonal training sequences," IEEE Trans. Veh. Technol., vol. 56, no. 1, pp. 146-156, January 2007; M. Ghogho and A. Swami, "Training design for multipath channel and frequency offset estimation in MIMO systems," IEEE Transactions on Signal Processing, vol. 54, no. 10, pp. 3957-3965, October 2006, and adaptive tracking C. Oberli and B. Daneshrad, "Maximum likelihood tracking algorithms for MIMOOFDM," in Communications, 2004 IEEE International Conference on, vol. 4, Jun. 20-24, 2004, pp. 2468-2472). A more severe problem is encountered in MIMO systems where the transmit antennas are not locked to the same frequency reference but the receive antennas are locked together. This happens practically in the uplink of a spatial division multiple access (SDMA) system, which can be viewed as a MIMO system where the different users correspond to different transmit antennas. In this case the compensation of frequency offset is much more complicated. Specifically, the frequency offset creates interference between the different transmitted MIMO streams. It can be corrected using complex joint estimation and equalization algorithms (A. Kannan, T. P. Krauss, and M. D. Zoltowski, "Separation of cochannel signals under imperfect timing and carrier synchronization," IEEE Trans. Veh. Technol., vol. 50, no. 1, pp. 79-96, January 2001), and equalization followed by frequency offset estimation (T. Tang and R. W. Heath, "Joint frequency offset estimation and interference cancellation for MIMO-OFDM systems [mobile radio]," 2004. VTC2004-Fall. 2004 IEEE 60$^{th}$ Vehicular Technology Conference, vol. 3, pp. 1553-1557, Sep. 26-29, 2004; X. Dai, "Carrier frequency offset estimation for OFDM/SDMA systems using consecutive pilots," IEEE Proceedings—Communications, vol. 152, pp. 624-632, Oct. 7, 2005). Some work has dealt with the related problem of residual phase off-set and tracking error, where residual phase offsets are estimated and compensated after frequency offset estimation, but this work only consider the uplink of an SDMA OFDMA system (L. Haring, S. Bieder, and A. Czylwik, "Residual carrier and sampling frequency synchronization in multiuser OFDM systems," 2006. VTC 2006-Spring. IEEE 63rd Vehicular Technology Conference, vol. 4, pp. 1937-1941, 2006). The most severe case in MIMO systems occurs when all transmit and receive antennas have different frequency references. The only available work on this topic only deals with asymptotic analysis of estimation error in flat fading channels (O. Besson and P. Stoica, "On parameter estimation of MIMO flat-fading channels with frequency offsets," Signal Processing, IEEE Transactions on [see also Acoustics, Speech, and Signal Processing, IEEE Transactions on], vol. 51, no. 3, pp. 602-613, March 2003).

A case that has not been significantly investigated occurs when the different transmit antennas of a MIMO system do not have the same frequency reference and the receive antennas process the signals independently. This happens in what is known as a distributed input distributed-output (DIDO) communication system, also called the MIMO broadcast channel in the literature. DIDO systems consist of one access point with distributed antennas that transmit parallel data streams (via precoding) to multiple users to enhance downlink throughput, while exploiting the same wireless resources (i.e., same slot duration and frequency band) as conventional SISO systems. Detailed description of DIDO systems was presented in, S. G. Perlman and T. Cotter, "System and method for distributed input-distributed output wireless communications," United States Patent Application 20060023803, July 2004. There are many ways to implement DIDO precoders. One solution is block diagonalization (BD) described in, for example, Q. H. Spencer, A. L. Swindlehurst, and M. Haardt, "Zero-forcing methods for downlink spatial multiplexing in multiuser MIMO channels," IEEE Trans. Sig. Proc., vol. 52, pp. 461-471, February 2004; K. K. Wong, R. D. Murch, and K. B. Letaief, "A joint-channel diagonalization for multiuser MIMO antenna systems," IEEE Trans. Wireless Comm., vol. 2, pp. 773-786, July 2003; L. U. Choi and R. D. Murch, "A transmit preprocessing technique for multiuser MIMO systems using a decomposition approach," IEEE Trans. Wireless Comm., vol. 3, pp. 20-24, January 2004; Z. Shen, J. G. Andrews, R. W. Heath, and B. L. Evans, "Low complexity user selection algorithms for multiuser MIMO systems with block diagonalization," accepted for publication in IEEE Trans. Sig. Proc., September 2005; Z. Shen, R. Chen, J. G. Andrews, R. W. Heath, and B. L. Evans, "Sum capacity of multiuser MIMO broadcast channels with block diagonalization," submitted to IEEE Trans. Wireless Comm., October 2005; R. Chen, R. W. Heath, and J. G. Andrews, "Transmit selection diversity for unitary precoded multiuser spatial multiplexing systems with linear receivers," accepted to IEEE Trans. on Signal Processing, 2005.

In DIDO systems, transmit precoding is used to separate data streams intended for different users. Carrier frequency offset causes several problems related to the system implementation when the transmit antenna radio frequency chains do not share the same frequency reference. When this happens, each antenna is effectively transmits at a slightly different carrier frequency. This destroys the integrity of the DIDO precoder resulting in each user experiencing extra interference. Proposed below are several solutions to this problem. In one embodiment of the solution, the DIDO transmit antennas share a frequency reference through a wired, optical, or wireless network. In another embodiment of the solution, one or more users estimate the frequency offset differences (the relative differences in the offsets between pairs of antennas) and send this information back to the transmitter. The transmitter then precorrects for the frequency offset and proceeds with the training and precoder estimation phase for DIDO. There is a problem with this embodiment when there are delays in the feedback channel. The reason is that there may be residual phase errors created by the correction process that are not accounted for in the subsequent channel estimation. To solve this problem, one additional embodiment uses a novel frequency offset and phase estimator that can correct this problem by estimating the delay. Results are presented based both on simulations and practical measurements carried out with a DIDO-OFDM prototype.

The frequency and phase offset compensation method proposed in this document may be sensitive to estimation errors due to noise at the receiver. Hence, one additional embodiment proposes methods for time and frequency offset estimation that are robust also under low SNR conditions.

There are different approaches for performing time and frequency offset estimation. Because of its sensitivity to synchronization errors, many of these approaches were proposed specifically for the OFDM waveform.

The algorithms typically do not exploit the structure of the OFDM waveform thus they are generic enough for both single carrier and multicarrier waveforms. The algorithm described below is among a class of techniques that employ known reference symbols, e.g. training data, to aid in synchronization. Most of these methods are extensions of Moose's frequency offset estimator (see P. H. Moose, "A technique for orthogonal frequency division multiplexing frequency offset correction," IEEE Trans. Commun., vol. 42, no. 10, pp. 2908-2914, October 1994.). Moose proposed to use two repeated training signals and derived the frequency offset using the phase difference between both received signals. Moose's method can only correct for the fractional frequency offset. An extension of the Moose method was proposed by Schmidl and Cox (T. M. Schmidl and D. C. Cox, "Robust frequency and timing synchronization for OFDM," IEEE Trans. Commun., vol. 45, no. 12, pp. 1613-1621, December 1997.). Their key innovation was to use one periodic OFDM symbol along with an additional differentially encoded training symbol. The differential encoding in the second symbol enables integer offset correction. Coulson considered a similar setup as described in T. M. Schmidl and D. C. Cox, "Robust frequency and timing synchronization for OFDM," IEEE Trans. Commun., vol. 45, no. 12, pp. 1613-1621, December 1997, and provided a detailed discussion of algorithms and analysis as described in A. J. Coulson, "Maximum likelihood synchronization for OFDM using a pilot symbol: analysis," IEEE J. Select. Areas Commun., vol. 19, no. 12, pp. 2495-2503, December 2001.; A. J. Coulson, "Maximum likelihood synchronization for OFDM using a pilot symbol: algorithms," IEEE J. Select. Areas Commun., vol. 19, no. 12, pp. 2486-2494, December 2001. One main difference is that Coulson uses repeated maximum length sequences to provide good correlation properties. He also suggests using chirp signals because of their constant envelope properties in the time and frequency domains. Coulson considers several practical details but does not include integer estimation. Multiple repeated training signals were considered by Minn et. al. in H. Minn, V. K. Bhargava, and K. B. Letaief, "A robust timing and frequency synchronization for OFDM systems," IEEE Trans. Wireless Commun., vol. 2, no. 4, pp. 822-839, July 2003, but the structure of the training was not optimized. Shi and Serpedin show that the training structure has some optimality form the perspective of frame synchronization (K. Shi and E. Serpedin, "Coarse frame and carrier synchronization of OFDM systems: a new metric and comparison," IEEE Trans. Wireless Commun., vol. 3, no. 4, pp. 1271-1284, July 2004). One embodiment of the invention uses the Shi and Serpedin approach to perform frame synchronization and fractional frequency offset estimation.

Many approaches in the literature focus on frame synchronization and fractional frequency offset correction. Integer offset correction is solved using an additional training symbol as in T. M. Schmidl and D. C. Cox, "Robust frequency and timing synchronization for OFDM," IEEE Trans. Commun., vol. 45, no. 12, pp. 1613-1621, December 1997. For example, Morrelli et. al. derived an improved version of T. M. Schmidl and D. C. Cox, "Robust frequency and timing synchronization for OFDM," IEEE Trans. Commun., vol. 45, no. 12, pp. 1613-1621, December 1997, in M. Morelli, A. N. D'Andrea, and U. Mengali, "Frequency ambiguity resolution in OFDM systems," IEEE Commun. Lett., vol. 4, no. 4, pp. 134-136, April 2000. An alternative approach using a different preamble structure was suggested by Morelli and Mengali (M. Morelli and U. Mengali, "An improved frequency offset estimator for OFDM applications," IEEE Commun. Lett., vol. 3, no. 3, pp. 75-77, March 1999). This approach uses the correlations between M repeated identical training symbols to increase the range of the fractional frequency offset estimator by a factor of M. This is the best linear unbiased estimator and accepts a large offset (with proper design) but does not provide good timing synchronization.

System Description

One embodiment of the invention uses pre-coding based on channel state information to cancel frequency and phase offsets in DIDO systems. See FIG. 11 and the associated description above for a description of this embodiment.

Figure 45:
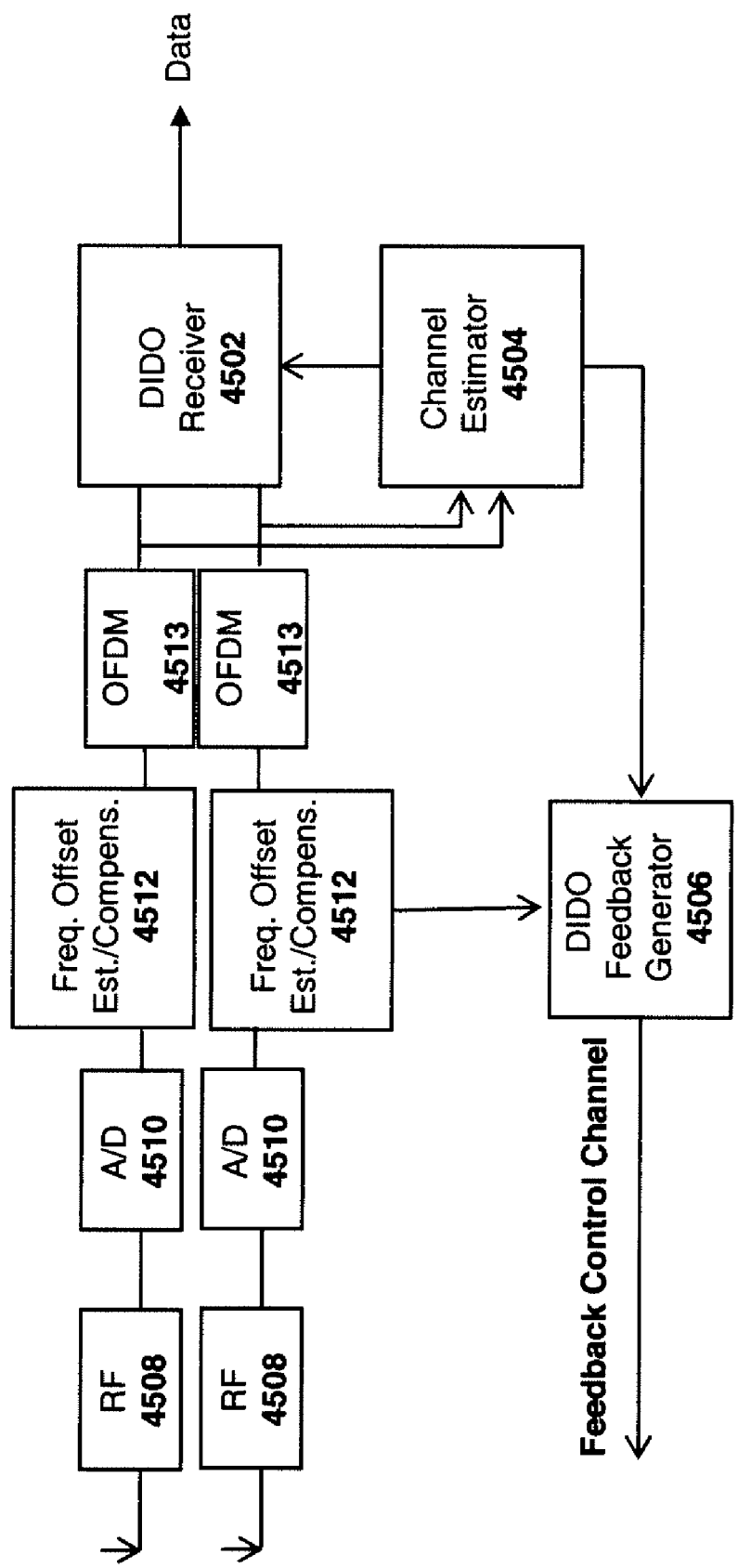
FIG. 45 illustrates a receiver equipped with frequency offset estimator/compensator.

In one embodiment of the invention, each user employs a receiver equipped with frequency offset estimator/compensator. As illustrated in FIG. 45, in one embodiment of the invention, a system including the receiver includes a plurality of RF units 4508, a corresponding plurality of A/D units 4510, a receiver equipped with a frequency offset estimator/compensator 4512 and a DIDO feedback generator unit 4506.

The RF units 4508 receive signals transmitted from the DIDO transmitter units, downconvert the signals to baseband and provide the downconverted signals to the A/D units 4510. The A/D units 4510 then convert the signal from analog to digital and send it to the frequency offset estimator/compensator units 4512. The frequency offset estimator/compensator units 4512 estimate the frequency offset and compensate for it, as described herein, and then send the compensated signal to the OFDM units 4513. The OFDM units 4513 remove the cyclic prefix and operate the Fast Fourier Transform (FFT) to report the signal to the frequency domain. During the training period the OFDM units 4513 send the output to the channel estimate unit 4504 that computes the channel estimates in the frequency domain. Alternatively, the channel estimates can be computed in the time domain. During the data period the OFDM units 4513 send the output to the DIDO receiver unit 4502 which demodulates/decodes the signal to obtain the data. The channel estimate unit 4504 sends the channel estimates to the DIDO feedback generator unit 4506 that may quantize the channel estimates and send them back to the transmitter via the feedback control channel, as illustrated.

Description of One Embodiment of an Algorithm for a DIDO 2×2 Scenario

Described below are embodiments of an algorithm for frequency/phase offset compensation in DIDO systems. The DIDO system model is initially described with and without frequency/phase offsets. For the sake of the simplicity, the particular implementation of a DIDO 2×2 system is provided. However, the underlying principles of the invention may also be implemented on higher order DIDO systems.

DIDO System Model w/o Frequency and Phase Offset

The received signals of DIDO 2×2 can be written for the first user as $$r_1[t]=h_{11}(w_{11}x_1[t]+w_{21}x_2[t])+h_{12}(w_{12}x_1[t]+w_{22}x_2[t]) \quad (1)$$

and for the second user as $$r_2[t]=h_{21}(w_{11}x_1[t]+w_{21}x_2[t])+h_{22}(w_{12}x_1[t]+w_{22}x_2[t]) \quad (2)$$

where t is the discrete time index, $h_{mn}$ hand $w_{mn}$ are the channel and the DIDO precoding weights between the m-th user and n-th transmit antenna, respectively, and $x_m$ is the transmit signal to user m. Note that $h_{mn}$ and $w_{mn}$ are not a function of t since we assume the channel is constant over the period between training and data transmission.

Figure 46:
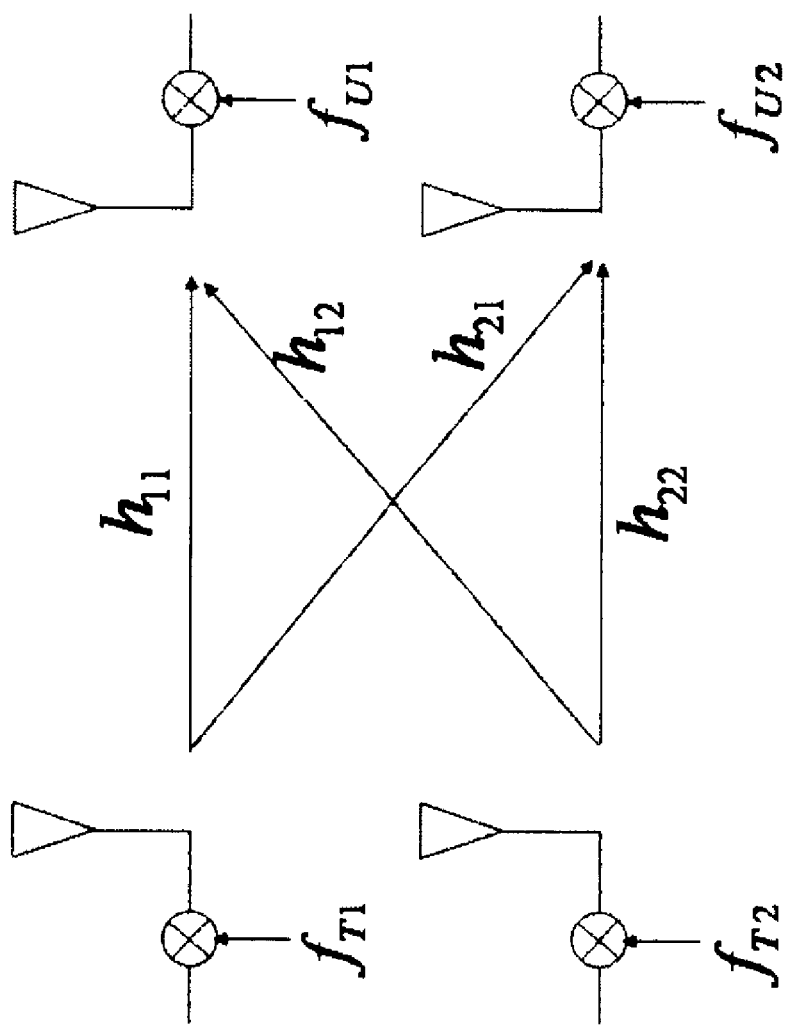
FIG. 46 illustrates DIDO 2×2 system model according to one embodiment of the invention.

In the presence of frequency and phase offset, the received signals are expressed as $$r_1[t]=e^{j(\omega_{U1}-\omega_{T1})T_s(t-t11)}h_{11}(w_{11}x_1[t]+w_{21}x_2[t])+ \\ e^{j(\omega_{U1}-\omega_{T2})T_s(t-t12)}h_{12}(w_{12}x_1[t]+w_{22}x_2[t]) \quad (3)$$

and $$r_2[t]=e^{j(\omega_{U2}-\omega_{T1})T_s(t-t21)}h_{21}(w_{11}x_1[t]+w_{21}x_2[t])+ \\ e^{j(\omega_{U2}-\omega_{T2})T_s(t-t22)}h_{22}(w_{12}x_1[t]+w_{22}x_2[t]) \quad (4)$$

where $T_s$ is the symbol period, $\omega_{Tn}=2\Pi f_{Tn}$ for the n-th transmit antenna, $\omega_{Um}=2\Pi f_{Um}$ for the m-th user, and $f_{Tn}$ and $f_{Um}$ are the actual carrier frequencies (affected by offset) for the n-th transmit antenna and m-th user, respectively. The values $t_{mn}$ denote random delays that cause phase offset over the channel $h_{mn}$. FIG. 46 depicts the DIDO 2×2 system model.

For the time being, we use the following definitions:

$$\Delta\omega_{mn}=\omega_{Um}-\omega_{Tn} \quad (5)$$

to denote the frequency offset between the m-th user and the n-th transmit antenna.

Description of One Embodiment of the Invention

Figure 47:
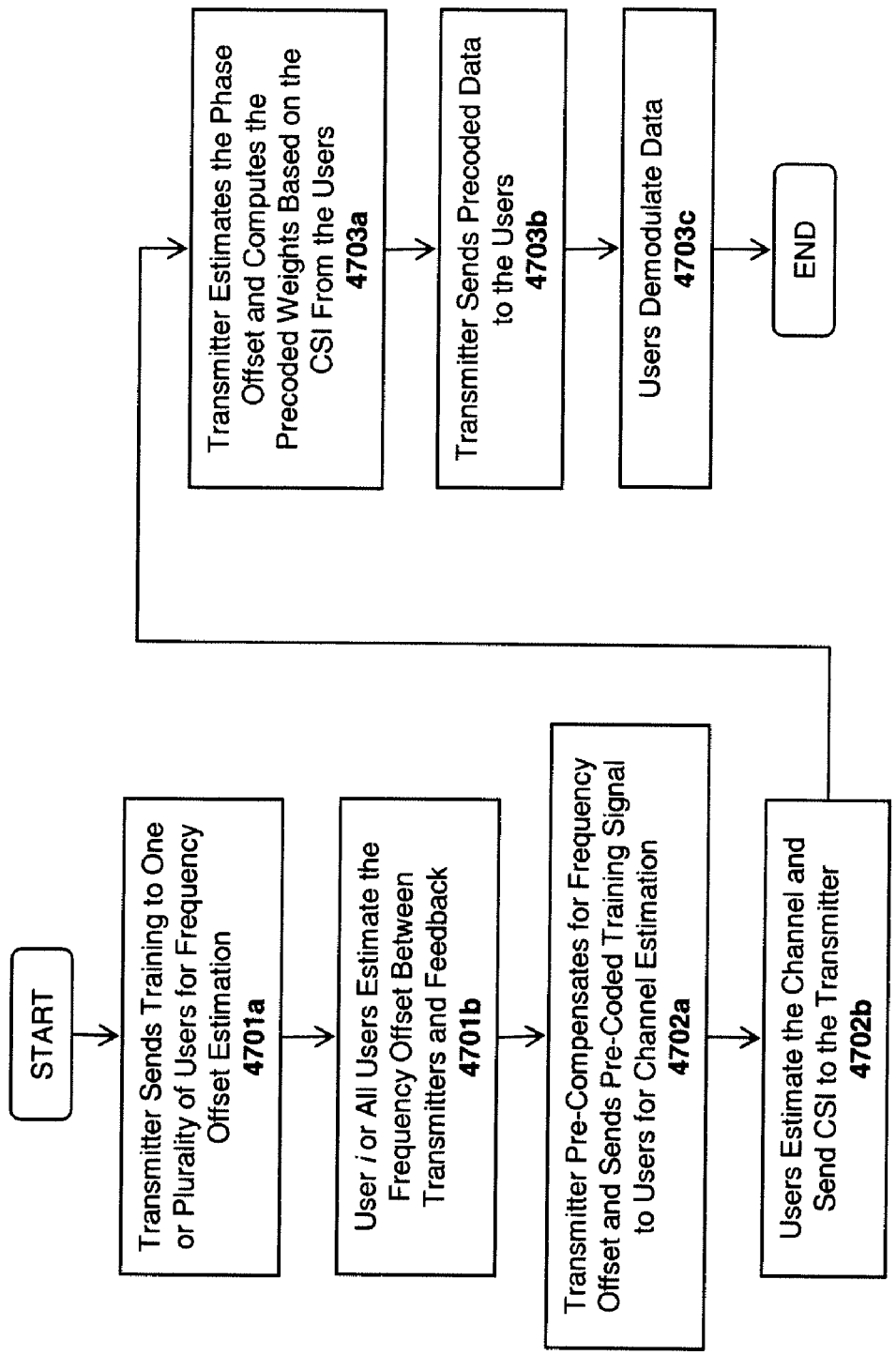
FIG. 47 illustrates a method according to one embodiment of the invention.

A method according to one embodiment of the invention is illustrated in FIG. 47. The method includes the following general steps (which include sub-application steps, as illustrated): training period for frequency offset estimation 4701; training period for channel estimation 4702; data transmission via DIDO precoding with compensation 4703. These steps are described in detail below.

(a) Training Period for Frequency Offset Estimation (4701)

During the first training period the base station sends one or more training sequences from each transmit antennas to one of the users (4701a). As described herein "users" are wireless client devices. For the DIDO 2×2 case, the signal received by the m-th user is given by $$r_m[t]=e^{j\Delta\omega_{m1}T_s(t-t_{m1})}h_{m1}p_1[t]+e^{j\Delta\omega_{m2}T_s(t-t_{m2})}h_{m2}p_2[t] \quad (6)$$

where $p_1$ and $p_2$ are the training sequences transmitted from the first and second antennas, respectively.

The m-th user may employ any type of frequency offset estimator (i.e., convolution by the training sequences) and estimates the offsets $\Delta\omega_{m1}$ and $\Delta\omega_{m2}$. Then, from these values the user computes the frequency offset between the two transmit antennas as $$\Delta\omega_T=\Delta\omega_{m2}-\Delta\omega_{m1}=\omega_{T1}-\omega_{T2} \quad (7)$$

Finally, the value in (7) is fed back to the base station (4701b).

Note that $p_1$ and $p_2$ in (6) are designed to be orthogonal, so that the user can estimate $\Delta\omega_{m1}$ and $\Delta\omega_{m2}$. Alternatively, in one embodiment, the same training sequence is used over two consecutive time slots and the user estimates the offset from there. Moreover, to improve the estimate of the offset in (7) the same computations described above can be done for all users of the DIDO systems (not just for the m-th user) and the final estimate may be the (weighted) average of the values obtained from all users. This solution, however, requires more computational time and amount of feedback. Finally, updates of the frequency offset estimation are needed only if the frequency offset varies over time. Hence, depending on the stability of the clocks at the transmitter, this step 4701 of the algorithm can be carried out on a long-term basis (i.e., not for every data transmission), resulting in reduction of feedback overhead.

(b) Training Period for Channel Estimation (4702)

During the second training period, the base station first obtains the frequency offset feedback with the value in (7) from the m-th user or from the plurality of users. The value in (7) is used to pre-compensate for the frequency offset at the transmit side. Then, the base station sends training data to all the users for channel estimation (4702*a*).

For DIDO 2×2 systems, the signal received at the first user is given by $$r_1[t] = e^{j\Delta\omega_{11}T_s(t-\tilde{t}_{11})} h_{11} p_1[t] + e^{j\Delta\omega_{12}T_s(t-\tilde{t}_{12})} h_{12} e^{-j\Delta\omega_T T_s t} p_2[t] \quad (8)$$

and at the second user by $$r_2[t] = e^{j\Delta\omega_{21}T_s(t-\tilde{t}_{21})} h_{21} p_1[t] + e^{j\Delta\omega_{22}T_s(t-\tilde{t}_{22})} h_{22} e^{-j\Delta\omega_T T_s t} p_2[t] \quad (9)$$

where $\tilde{t}_{mn} = t_{mn} + \Delta t$ and $\Delta t$ is random or known delay between the first and second transmissions of the base station. Moreover, $p_1$ and $p_2$ are the training sequences transmitted from the first and second antennas, respectively, for frequency offset and channel estimation.

Note that the pre-compensation is applied only to the second antennas in this embodiment.

Expanding (8) we obtain $$r_1[t] = e^{j\Delta\omega_{11}T_s t} e^{j\theta_{11}} [h_{11} p_1[t] + e^{j(\theta_{12}-\theta_{11})} h_{12} p_2[t]] \quad (10)$$

and similarly for the second user $$r_2[t] = e^{j\Delta\omega_{21}T_s t} e^{j\theta_{21}} [h_{21} p_1[t] + e^{j(\theta_{22}-\theta_{21})} h_{22} p_2[t]] \quad (11)$$

where $\theta_{mn} = -\Delta\omega_{mn} T_s \tilde{t}_{mn}$.

At the receive side, the users compensate for the residual frequency offset by using the training sequences $p_1$ and $p_2$. Then the users estimate via training the vector channels (4702*b*)

$$h_1 = \begin{bmatrix} h_{11} \\ e^{j(\theta_{12}-\theta_{11})} h_{12} \end{bmatrix} \quad h_2 = \begin{bmatrix} h_{21} \\ e^{j(\theta_{22}-\theta_{21})} h_{22} \end{bmatrix} \quad (12)$$

These channel in (12) or channel state information (CSI) is fed back to the base station (4702*b*) that computes the DIDO precoder as described in the following subsection.

(c) DIDO Precoding with Pre-compensation (4703)

The base station receives the channel state information (CSI) in (12) from the users and computes the precoding weights via block diagonalization (BD) (4703*a*), such that $$w_1^T h_2 = 0, \; w_2^T h_1 = 0 \quad (13)$$

where the vectors $h_1$ are defined in (12) and $w_m = [w_{m1}, w_{m2}]$. Note that the invention presented in this disclosure can be applied to any other DIDO precoding method besides BD. The base station also pre-compensates for the frequency offset by employing the estimate in (7) and phase offset by estimating the delay ($\Delta t_o$) between the second training transmission and the current transmission (4703*a*). Finally, the base station sends data to the users via the DIDO precoder (4703*b*).

After this transmit processing, the signal received at user 1 is given by $$r_1[t] = e^{j\Delta\omega_{11}T_s(t-\tilde{t}_{11}-\Delta t_o)} h_{11} (w_{11} x_1[t] + w_{21} x_2[t]) \quad (14)$$

$$= e^{j\Delta\omega_{12}T_s(t-\tilde{t}_{12}-\Delta t_o)} h_{12} e^{-j\Delta\omega_T T_s(t-\Delta t_o)} [w_{12} x_1[t] + w_{22} x_2[t]]$$

-continued
$$= \gamma_1[t] [h_{11}(w_{11} x_1[t] + w_{21} x_2[t]) +$$
$$e^{j(\Delta\omega_{11} \tilde{t}_{11} - \Delta\omega_{12} \tilde{t}_{12})T_s} h_{12}(w_{12} x_1[t] + w_{22} x_2[t])]$$
$$= \gamma_1[t][(h_{11} w_{11} + e^{j(\theta_{12}-\theta_{11})} h_{12} w_{12}) x_1[t] +$$
$$(h_{11} w_{21} + e^{j(\theta_{12}-\theta_{11})} h_{12} w_{22}) x_2[t]]$$

where $\gamma_1[t] e^{j\Delta\omega_{11} T_s(t-\tilde{t}_{11}-\Delta t_o)}$. Using the property (13) we obtain $$r_1[t] = \gamma_1[t] w_1^T h_1 x_1[t]. \quad (15)$$

Similarly, for user 2 we get $$r_2[t] = e^{j\Delta\omega_{21}T_s(t-\tilde{t}_{21}-\Delta t_o)} h_{21}[w_{11} x_1[t] + w_{21} x_2[t]] +$$
$$e^{j\Delta\omega_{22}T_s(t-\tilde{t}_{22}-\Delta t_o)} h_{22} e^{-j\Delta\omega_T T_s(t-\Delta t_o)} [w_{12} x_1[t] +$$
$$w_{22} x_2[t]] \quad (16)$$

and expanding (16)

$$r_2[t] = \gamma_2[t] w_2^T h_2 x_2[t] \quad (17)$$

where $\gamma_2[t] e^{j\Delta\omega_{21} T_s(t-\tilde{t}_{21}-\Delta t_o)}$.

Finally, the users compute the residual frequency offset and the channel estimation to demodulate the data streams $x_1[t]$ and $x_2[t]$ (4703*c*).

Generalization to DIDO N×M

In this section, the previously described techniques are generalized to DIDO systems with N transmit antennas and M users.

i. Training Period for Frequency Offset Estimation

During the first training period, the signal received by the m-th user as a result of the training sequences sent from the N antennas is given by $$r_m[t] = \sum_{n=1}^{N} e^{j\Delta\omega_{mn} T_s(t-t_{mn})} h_{mn} p_n[t] \quad (18)$$

where $p_n$ is the training sequences transmitted from the n-th antenna.

After estimating the offsets $\Delta\omega_{mn}$, $\forall n=1, \ldots, N$, the m-th user computes the frequency offset between the first and the n-th transmit antenna as $$\Delta\omega_{T,1n} = \Delta\omega_{mn} - \Delta\omega_{m1} = \omega_{T1} - \omega_{Tn}. \quad (19)$$

Finally, the values in (19) are fed back to the base station.

ii. Training Period for Channel Estimation

During the second training period, the base station first obtains the frequency offset feedback with the value in (19) from the m-th user or from the plurality of users. The value in (19) is used to pre-compensate for the frequency offset at the transmit side. Then, the base station sends training data to all the users for channel estimation.

For DIDO N×M systems, the signal received at the m-th user is given by $$r_m[t] = e^{j\Delta\omega_{m1} T_s(t-\tilde{t}_{m1})} h_{m1} p_1[t] + \quad (20)$$
$$\sum_{n=2}^{N} e^{j\Delta\omega_{mn} T_s(t-\tilde{t}_{mn})} h_{mn} e^{-j\Delta\omega_{T,1n} T_s t} p_n[t]$$
$$= e^{j\Delta\omega_{m1} T_s(t-\tilde{t}_{m1})} \left[ h_{m1} p_1[t] + \sum_{n=2}^{N} e^{j(\theta_{mn}-\theta_{m1})} h_{mn} p_n[t] \right]$$

-continued $$= e^{j\Delta\omega_{m1}T_s(t-\tilde{t}_{m1})}\sum_{n=1}^{N}e^{j(\theta_{mn}-\theta_{m1})}h_{mn}p_n[t]$$

where $\theta_{mn}=-\omega_{mn}T_s\tilde{t}_{mn}, \tilde{t}_{mn}=t_{mn}+\Delta t$ and $\Delta t$ is random or known delay between the first and second transmissions of the base station. Moreover, $p_n$ is the training sequence transmitted from the n-th antenna for frequency offset and channel estimation.

At the receive side, the users compensate for the residual frequency offset by using the training sequences $p_n$. Then, each users m estimates via training the vector channel $$h_m = \begin{bmatrix} h_{m1} \\ e^{j(\theta_{m2}-\theta_{m1})}h_{m2} \\ \vdots \\ e^{j(\theta_{mN}-\theta_{m1})}h_{mN} \end{bmatrix} \quad (21)$$

and feeds back to the base station that computes the DIDO precoder as described in the following subsection.

iii. DIDO Precoding with Pre-Compensation

The base station receives the channel state information (CSI) in (12) from the users and computes the precoding weights via block diagonalization (BD), such that $$w_m^T h_l = 0, \forall m \neq l, m \neq 1, \ldots, M \quad (22)$$

where the vectors $h_m$ are defined in (21) and $w_m = [w_{m1}, w_{m2}, \ldots, w_{mN}]$. The base station also pre-compensates for the frequency offset by employing the estimate in (19) and phase offset by estimating the delay ($\Delta t_o$) between the second training transmission and the current transmission. Finally, the base station sends data to the users via the DIDO precoder.

After this transmit processing, the signal received at user i is given by $$r_i[t] = e^{j\Delta\omega_{i1}T_s(t-\tilde{t}_{i1}-\Delta t_o)}h_{i1}\sum_{m=1}^{M}w_{m1}x_m[t] + +$$

$$\sum_{n=2}^{N}e^{j\Delta\omega_{in}T_s(t-\tilde{t}_{in}-\Delta t_o)}h_{in}e^{-j\Delta\omega_{T,1n}T_s(t-\Delta t_o)}\sum_{m=1}^{M}w_{mn}x_m[t]$$

$$= e^{j\Delta\omega_{i1}T_s(t-\Delta t_o)}e^{-j\Delta\omega_{i1}T_s\tilde{t}_{i1}}h_{i1}\sum_{m=1}^{M}w_{m1}x_m[t] +$$

$$\sum_{n=2}^{N}e^{j\Delta\omega_{i1}T_s(t-\Delta t_o)}e^{-j\Delta\omega_{in}T_s\tilde{t}_{in}}h_{in}\sum_{m=1}^{M}w_{mn}x_m[t]$$

$$= \gamma_i[t]\left[h_{i1}\sum_{m=1}^{M}w_{m1}x_m[t] + \sum_{n=2}^{n}e^{j(\theta_{in}-\theta_{i1})}h_{in}\sum_{m=1}^{M}w_{m1}x_m[t]\right]$$

$$= \gamma_i[t]\left[\sum_{n=1}^{N}e^{j(\theta_{in}-\theta_{i1})}h_{in}\sum_{m=1}^{M}w_{mn}x_m[t]\right]$$

$$= \gamma_i[t]\sum_{m=1}^{M}\left[\sum_{n=1}^{N}e^{j(\theta_{in}-\theta_{i1})}h_{in}w_{mn}\right]x_m[t]$$

$$= \gamma_i[t]\sum_{m=1}^{M}w_m^T h_i x_m[t]$$

Where $\gamma_i[n]=e^{j\Delta\omega_{i1}T_s(t-\tilde{t}_{i1}-\Delta t_o)}$. Using the property (22) we obtain $$r_i[t]=\gamma_i[t]w_i^T h_i x_i[t] \quad (24)$$

Finally, the users compute the residual frequency offset and the channel estimation to demodulate the data streams $x_i[t]$.

Results

Figure 48:
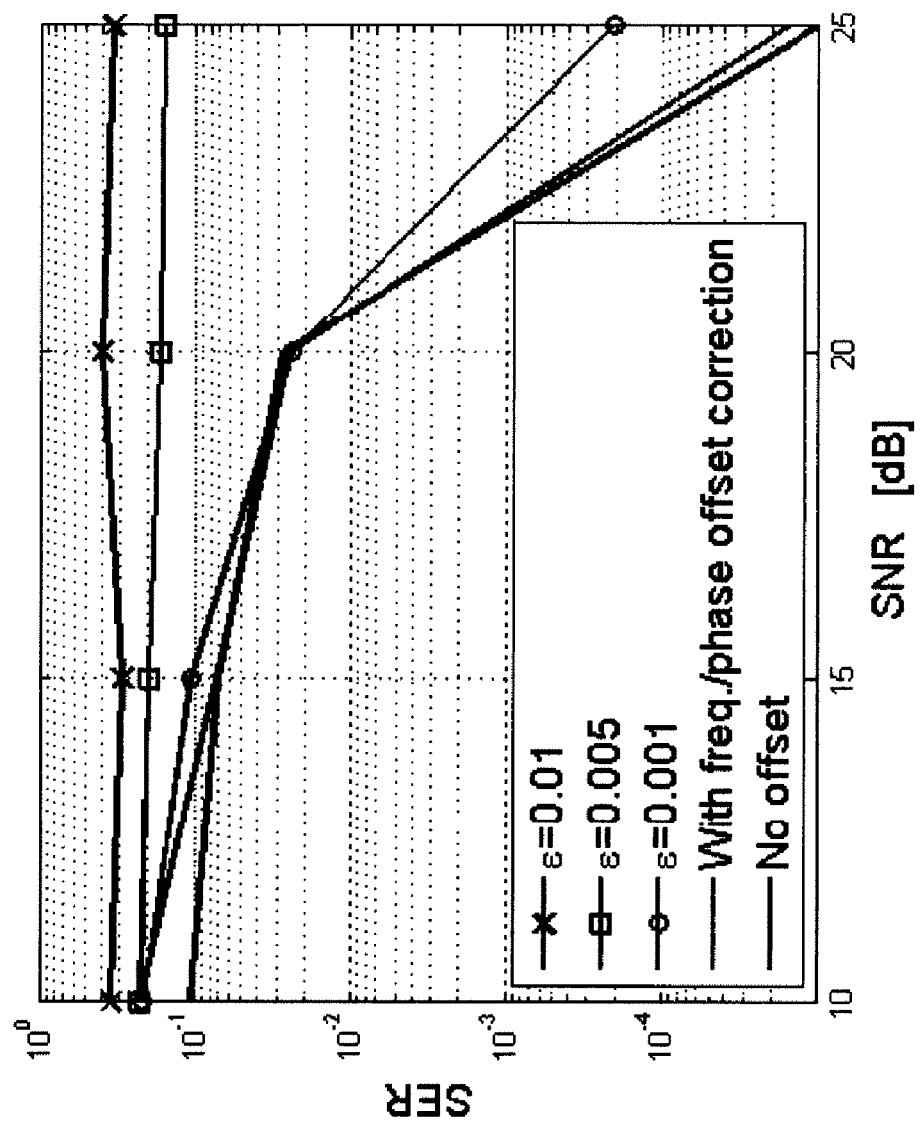
FIG. 48 illustrates SER results of DIDO 2×2 systems with and without frequency offset.

FIG. 48 shows the SER results of DIDO 2×2 systems with and without frequency offset. It is possible to see that the proposed method completely cancels the frequency/phase offsets yielding the same SER as systems without offsets.

Next, we evaluate the sensitivity of the proposed compensation method to frequency offset estimation errors and/or fluctuations of the offset in time. Hence, we re-write (14) as $$r_1[t]=e^{j\Delta\omega_{11}T_s(t-\tilde{t}_{11}-\Delta t_o)}h_{11}[w_{11}x_1[t]+w_{21}x_2[t]]+e^{j\Delta\omega_{12}T_s(t-\tilde{t}_{12}-\Delta t_o)}h_{12}e^{-j(\Delta\omega_T+2\Pi\epsilon)T_s(t-\Delta t_o)}[w_{12}x_1[t]+w_{22}x_2[t]] \quad (25)$$

where $\epsilon$ indicates the estimation error and/or variation of the frequency offset between training and data transmission. Note that the effect of $\epsilon$ is to destroy the orthogonality property in (13) such that the interference terms in (14) and (16) are not completely pre-canceled at the transmitter. As a results of that, the SER performance degrades for increasing values of $\epsilon$.

FIG. 48 shows the SER performance of the frequency offset compensation method for different values of $\epsilon$. These results assume $T_s=0.3$ ms (i.e., signal with 3 KHz bandwidth). We observe that for $\epsilon=0.001$ Hz (or less) the SER performance is similar to the no offset case.

f. Description of One Embodiment of an Algorithm for Time and Frequency Offset Estimation Hereafter, we describe additional embodiments to carry out time and frequency offset estimation (4701b in FIG. 47). The transmit signal structure under consideration is illustrated in H. Minn, V. K. Bhargava, and K. B. Letaief, "A robust timing and frequency synchronization for OFDM systems," IEEE Trans. Wireless Commun., vol. 2, no. 4, pp. 822-839, July 2003, and studied in more detail in K. Shi and E. Serpedin, "Coarse frame and carrier synchronization of OFDM systems: a new metric and comparison," IEEE Trans. Wireless Commun., vol. 3, no. 4, pp. 1271-1284, July 2004. Generally sequences with good correlation properties are used for training. For example, for our system, Chu sequences are used which are derived as described in D. Chu, "Polyphase codes with good periodic correlation properties (corresp.)," IEEE Trans. Inform. Theory, vol. 18, no. 4, pp. 531-532, July 1972. These sequences have an interesting property that they have perfect circular correlations. Let $L_{cp}$ denote the length of the cyclic prefix and let $N_t$ denote the length of the component training sequences. Let $N_t=M_t$, where $M_t$ is the length of the training sequence. Under these assumptions the transmitted symbol sequence for the preamble can be written as $$s[n]=t[n-N_t] \text{ for } n=-1,\ldots,-L_{cp}$$

$$s[n]=t[n] \text{ for } n=0,\ldots,N_t-1$$

$$s[n]=t[n-N_t] \text{ for } n=N_t,\ldots,2N_t-1$$

$$s[n]=-t[n-2N_t] \text{ for } n=2N_t,\ldots,3N_t-1$$

$$s[n]=t[n-3N_t] \text{ for } n=3N_t,\ldots,4N_t-1.$$

Note that the structure of this training signal can be extended to other lengths but repeating the block structure. For example, to use 16 training signals we consider a structure such as:

[CP,B,B,−B,B,B,−B,B,−B,−B,B,−,B,B,−B,B,].

By using this structure and letting $N_t=4 M_t$ all the algorithms to be described can be employed without modification. Effectively we are repeating the training sequence. This is especially useful in cases where a suitable training signal may not be available.

Consider the following received signal, after matched filtering and downsampling to the symbol rate:

$$r[n] = e^{2\pi\epsilon n}\sum_{l=0}^{L} h[l]s[n-l-\Delta] + v[n]$$

where $\epsilon$ is the unknown discrete-time frequency offset, $\Delta$ is the unknown frame offset, $h[l]$ are the unknown discrete-time channel coefficients, and $v[n]$ is additive noise. To explain the key ideas in the following sections the presence of additive noise is ignored.

i. Coarse Frame Synchronization

The purpose of coarse frame synchronization is to solve for the unknown frame offset $\Delta$. Let us make the following definitions $$r_1[n] := [r[n], r[n+1], \ldots, r[n+N_t-1]]^T,$$

$$\bar{r}_1[n] := [r[n+L_{cp}], r[n+1], \ldots, r[n+N_t-1]]^T,$$

$$r_2[n] := [r[n+N_t], r[n+1+N_t], \ldots, r[n+2N_t-1]]^T,$$

$$\bar{r}_2[n] := [r[n+L_{cp}+N_t], r[n+1+L_{cp}+N_t], \ldots, r[n+L_{cp}+2N_t-1]]^T,$$

$$r_3[n] := [r[n+2N_t], r[n+1+2N_t], \ldots, r[n+3N_t-1]]^T,$$

$$\bar{r}_3[n] := [r[n+L_{cp}+2N_t], r[n+L_{cp}+1+2N_t], \ldots, r[n+L_{cp}+3N_t-1]]^T,$$

$$r_4[n] := [r[n+3N_t], r[n+1+3N_t], \ldots, r[n+4N_t-1]]^T,$$

$$\bar{r}_4[n] := [r[n+L_{cp}+3N_t], r[n+L_{cp}+1+3N_t], \ldots, r[n+L_{cp}+4N_t-1]]^T,$$

The proposed coarse frame synchronization algorithm is inspired from the algorithm in K. Shi and E. Serpedin, "Coarse frame and carrier synchronization of OFDM systems: a new metric and comparison," IEEE Trans. Wireless Commun., vol. 3, no. 4, pp. 1271-1284, July 2004, derived from a maximum likelihood criterion.

Method 1—Improved Coarse Frame Synchronization: the Coarse Frame Synchronization Estimator Solves the Following Optimization $$\Delta = \underset{k \in \mathbb{Z}}{\operatorname{argmax}} \frac{|P_1(k)| + |P_2(k)| + |P_3(k)|}{\|r_1\|^2 + \|r_2\|^2 + \|r_3\|^2 + \|r_4\|^2 + \frac{1}{2}(\|\bar{r}_1\|^2 + \|\bar{r}_2\|^2 + \|\bar{r}_3\|^2 + \|\bar{r}_4\|^2)}$$

where $$P_1[k] = r_1^*[k]r_2[k] - r_3^*[k]r_4[k] - \bar{r}_2^*[k]\bar{r}_3[k]$$

-continued $$P_2[k] = r_2^*[k]r_4[k] - r_1^*[k]r_3[k]$$

$$P_3[k] = \bar{r}_1^*[k]\bar{r}_4[k].$$

Let the corrected signal be defined as $$r_c[n] = r[n - \hat{\Delta} - \lceil L_{cp}/4 \rceil].$$

The additional correction term is used to compensate for small initial taps in the channel and can be adjusted based on the application. This extra delay will be included henceforth in the channel.

ii. Fractional Frequency Offset Correction

The fractional frequency offset correction follows the coarse frame synchronization block.

Method 2—Improved Fractional Frequency Offset Correction: the Fractional Frequency Offset is the Solution to $$\hat{\epsilon}_f = \frac{\text{phase } P_1[\hat{\Delta}]}{2\pi N_t}.$$

This is known as a fractional frequency offset because the algorithm can only correct for offsets $$|\hat{\epsilon}_f| < \frac{1}{2N_t}.$$

This problem will be solved in the next section. Let the fine frequency offset corrected signal be defined as $$r_f[n] = e^{-j2\pi\hat{\epsilon}_f}r_c[n].$$

Note that the Methods 1 and 2 are an improvement to K. Shi and E. Serpedin, "Coarse frame and carrier synchronization of OFDM systems: a new metric and comparison," IEEE Trans. Wireless Commun., vol. 3, no. 4, pp. 1271-1284, July 2004 that works better in frequency-selective channels. One specific innovation here is the use of both r and $\bar{r}$ as described above. The use of $\bar{r}$ improves the prior estimator because it ignores the samples that would be contaminated due to inter-symbol interference.

iii. Integer Frequency Offset Correction

To correct for the integer frequency offset, it is necessary to write an equivalent system model for the received signal after fine frequency offset correction. Absorbing remaining timing errors into the channel, the received signal in the absence of noise has the following structure:

$$r_f[n] = e^{j2\pi\frac{nk}{N_s}}\sum_{l=0}^{L_{cp}} g[l]s[n-l]$$

for n=0, 1, ..., $4N_t-1$. The integer frequency offset is k while the unknown equivalent channel is g[l].

Method 3—Improved Integer Frequency Offset Correction: the Integer Frequency Offset is the Solution to $$\hat{k} = \arg\max_{m=0,1,\ldots,N_t-1} r^*D[k]S(S^*S)^{-1}S^*D[k]^*r$$

where

-continued $$r = D[k]Sg$$

$$D[k] := \text{diag}\left\{1, e^{j2\pi\frac{n1}{N_t}}, \ldots, e^{j2\pi\frac{n(4N_t-1)}{N_t}}\right\}$$

$$S := \begin{bmatrix} s[0] & s[-1] & \cdots & \cdots & s[-L_{ep}] \\ s[1] & s[0] & s[-1] & \cdots & s[-L_{ep}+1] \\ s[4N_t-1] & s[4N_t-2] & s[4N_t-3] & \cdots & s[4N_t-1-L_{ep}] \end{bmatrix}$$

$$g := \begin{bmatrix} g[0] \\ g[1] \\ \vdots \\ g[L_{ep}] \end{bmatrix}$$

This gives the estimate of the total frequency offset as $$\hat{\epsilon} = \frac{\hat{k}}{N_t} + \hat{\epsilon}_f.$$

Practically, Method 3 has rather high complexity. To reduce complexity the following observations can be made. First of all, the product $S^{S(S*S)^{-1}S*}$ can be precomputed. Unfortunately, this still leaves a rather large matrix multiplication. An alternative is to exploit the observation that with the proposed training sequences, $S^*S \approx I$. This leads to the following reduced complexity method.

Method 4—Low-Complexity Improved Integer Frequency Offset Correction: a Low Complexity Integer Frequency Offset Estimator Solves $$\hat{k} = \arg\max_{m=0,1,\ldots,N_t-1} (S^*D[k]^*r)^*(S^*D[k]^*r).$$

iv. Results

In this section we compare the performance of the different proposed estimators.

First, in FIG. 50 we compare the amount of overhead required for each method. Note that both of the new methods reduce the overhead required by 10× to 20×. To compare the performance of the different estimators, Monte Carlo experiments were performed. The setup considered is our usual NVIS transmit waveform constructed from a linear modulation with a symbol rate of 3K symbols per second, corresponding to a passband bandwidth of 3 kHz, and raised cosine pulse shaping. For each Monte Carlo realization, the frequency offset is generated from a uniform distribution on $[-f_{max}, f_{max}]$.

Figure 51:
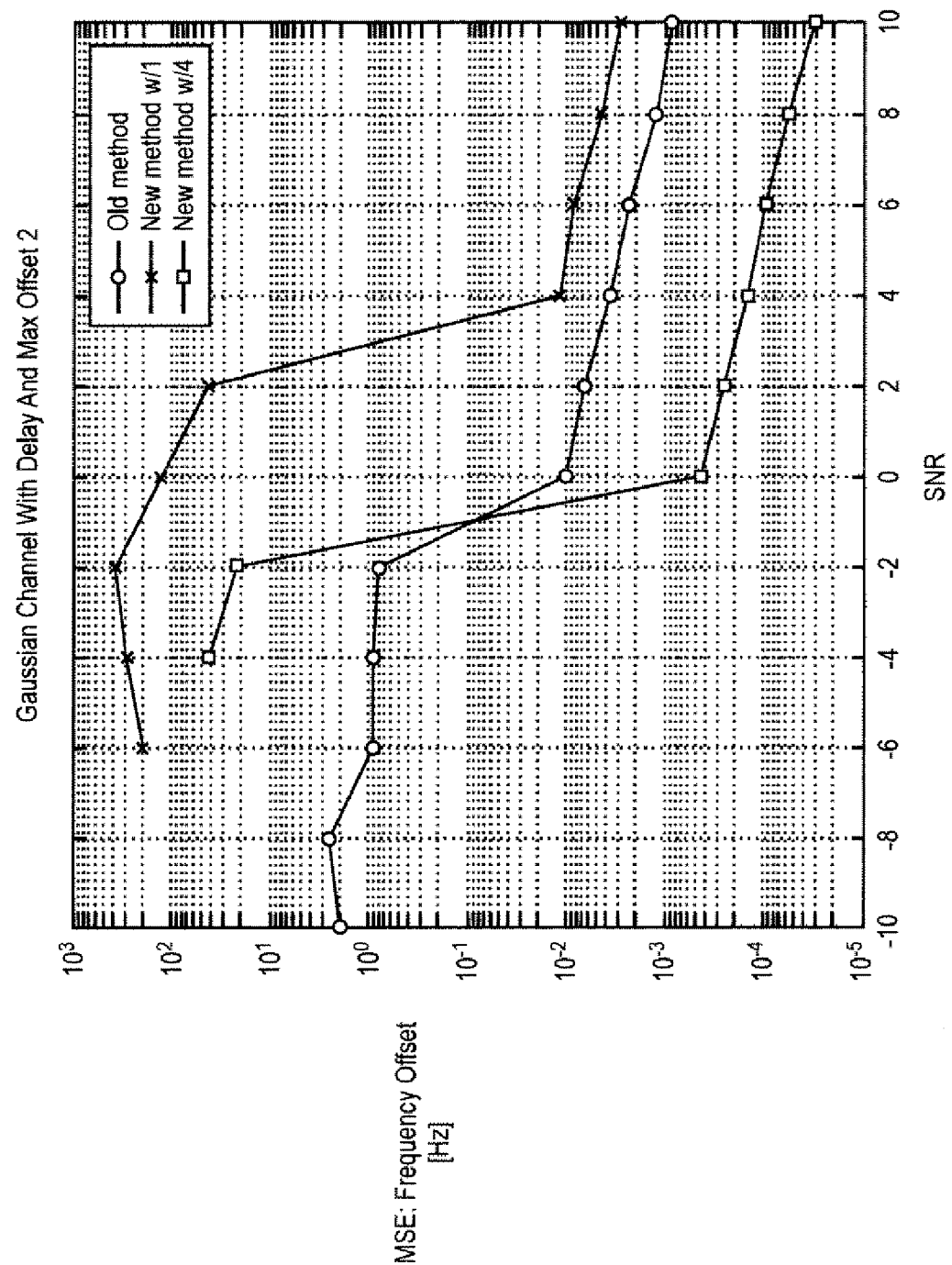
FIG. 51 illustrates a simulation with a small frequency offset of $f_{max}$=2 Hz and no integer offset correction.

A simulation with a small frequency offset of $f_{max}=2$ Hz and no integer offset correction is illustrated in FIG. 51. It can be seen from this performance comparison that performance with $N_t/M_t=1$ is slightly degraded from the original estimator, though still substantially reduces overhead. Performance with $N_t/M_t=4$ is much better, almost 10 dB. All the curves experience a knee at low SNR points due to errors in the integer offset estimation. A small error in the integer offset can create a large frequency error and thus a large mean squared error. Integer offset correction can be turned off in small offsets to improve performance.

Figure 52:
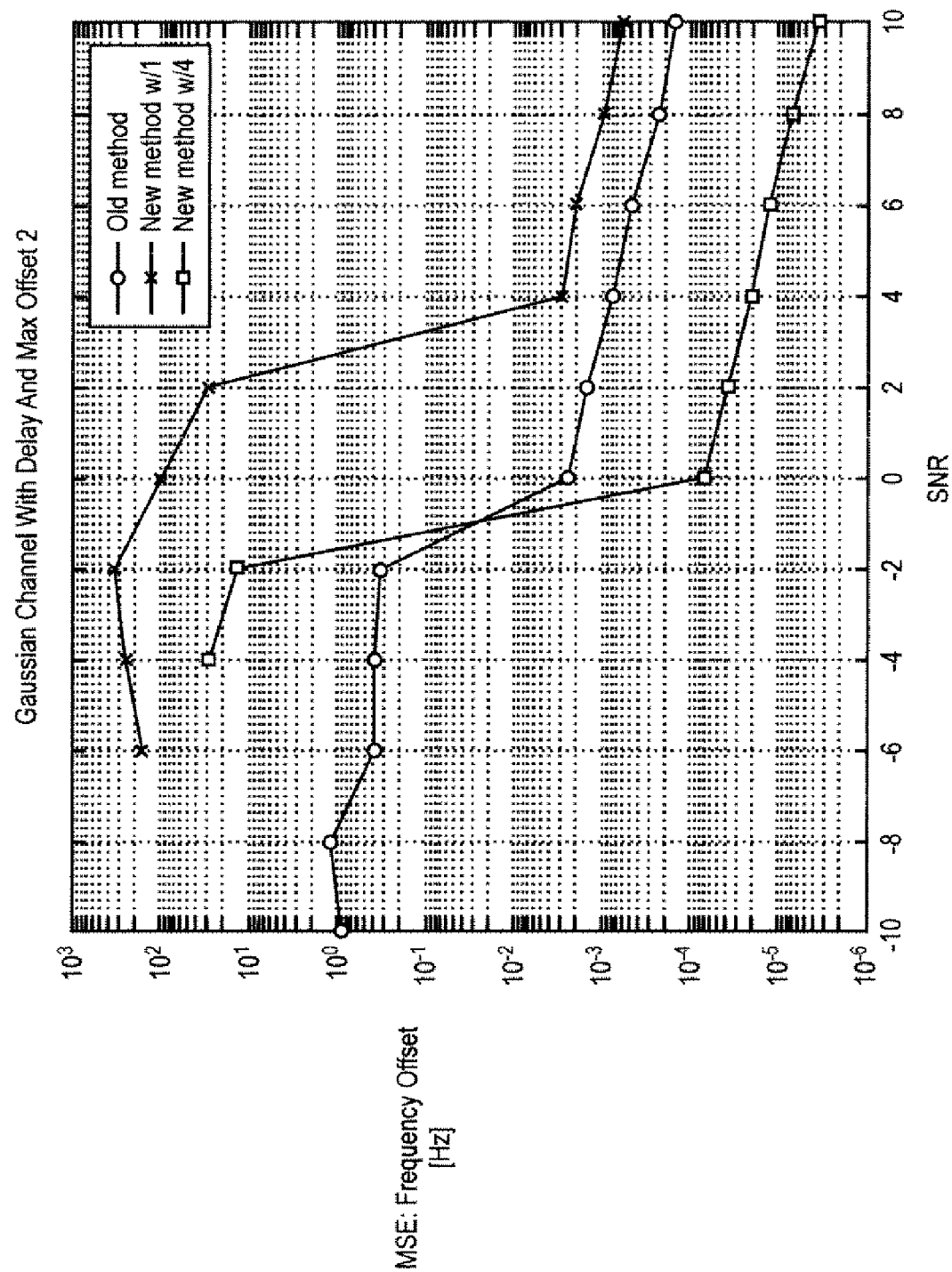
FIG. 52 illustrates results when turning off the integer offset estimator.

In the presence of multipath channels, the performance of frequency offset estimators generally degrades. Turning off the integer offset estimator, however, reveals quite good performance in FIG. 52. Thus, in multipath channels it is even more important to perform a robust coarse correction followed by an improved fine correction algorithm. Notice that the offset performance with $N_t/M_t=4$ is much better in the multipath case.

Embodiments of the invention may include various steps as set forth above. The steps may be embodied in machine-executable instructions which cause a general-purpose or special-purpose processor to perform certain steps. For example, the various components within the Base Stations/APs and Client Devices described above may be implemented as software executed on a general purpose or special purpose processor. To avoid obscuring the pertinent aspects of the invention, various well known personal computer components such as computer memory, hard drive, input devices, etc., have been left out of the figures.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, certain modules such as the Coding, Modulation and Signal Processing Logic 903 described above may be implemented on a programmable digital signal processor ("DSP") (or group of DSPs) such as a DSP using a Texas Instruments' TMS320x architecture (e.g., a TMS320C6000, TMS320C5000, . . . etc). The DSP in this embodiment may be embedded within an add-on card to a personal computer such as, for example, a PCI card. Of course, a variety of different DSP architectures may be used while still complying with the underlying principles of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

Moreover, throughout the foregoing description, numerous publications were cited to provide a more thorough understanding of the present invention. All of these cited references are incorporated into the present application by reference.

What is claimed is:

1. A method for dynamically adapting the communication characteristics of a multiple antenna system (MAS) with multi-user (MU) transmissions ("MU-MAS"):

transmitting a training signal from each antenna of a base station to each of a plurality of wireless client devices, each of the client devices analyzing each training signal to generate channel characterization data, and receiving the channel characterization data at the base station;

computing a plurality of MU-MAS precoder weights based on the channel characterization data, the combined MU-MAS precoder weights comprising a MU-MAS channel matrix;

determining instantaneous or statistical channel quality ("link quality metric") for the wireless client devices using mutual information of MU-MAS links or singular values of the MU-MAS composite channel matrix;

determining a subset of users and a MU-MAS transmission mode based on the link quality metric;

precoding data using the MU-MAS precoder weights to generate precoded data signals for each antenna of the base station; and transmitting the precoded data signals through each antenna of the base station to each respective client device within the selected subset.

2. The method as in claim 1 wherein the multiple antenna system is a TDD system, the method further comprising:

transmitting a training signal from each antenna of the users to each of a plurality of antennas at the base station, the base station analyzing each training signal to generate channel characterization data.

3. The method as in claim 1 further comprising:

defining different link-quality regions for two or more different MU-MAS modes based on the instantaneous channel quality metrics.

4. The method as in claim 1 wherein the MU-MAS transmission modes includes different combinations of antenna selection/diversity or multiplexing, modulation/coding schemes (MCSs) and array configurations/geometries.

5. The method as in claim 1 wherein the link quality metric is estimated in the time, frequency and/or space domains.

6. The method as in claim 1 wherein the link quality metric includes the signal to noise ratio (SNR) of the signals received at the client devices.

7. The method of claim 1 wherein the MU-MAS system is a distributed-input distributed-output (DIDO) communication system and wherein the MU-MAS transmission mode is a DIDO transmission mode based on the link quality metric and wherein the MU-MAS precoder weights are DIDO precoder weights.

8. A system for dynamically adapting the communication characteristics of a MU-MAS communication system comprising:

one or more coding modulation units to encode and modulate information bits for each of a plurality of wireless client devices to produce encoded and modulated information bits;

one or more mapping units to map the encoded and modulated information bits to complex symbols; and a MU-MAS configurator unit to determine a subset of users and a MU-MAS transmission mode based on channel characterization data obtained through feedback from the wireless client devices and to responsively control the coding modulation units and mapping units;

a MU-MAS precoding unit operating under control of the MU-MAS configurator unit to compute precoding weights for precoding data signals prior to transmission to the client devices;

wherein the MU-MAS configurator unit determines instantaneous or statistical channel quality ("link quality metric") for the wireless client devices using mutual information of MU-MAS links or singular values of the MU-MAS channel matrix.

9. The system as in claim 8 wherein the MU-MAS configurator unit determines a subset of users and a MU-MAS transmission mode based on channel characterization data estimated at the base station by processing training signals from the client devices and exploiting channel reciprocity.

10. The system as in claim 8 further comprising:

one or more orthogonal frequency division multiplexing (OFDM) units to receive the precoded signals from the precoding unit and to modulate the precoded signals according to an OFDM standard.

11. The system as in claim 10 wherein the OFDM standard comprises computing an inverse fast Fourier transform (IFFT) and adding a cyclic prefix.

12. The system as in claim 10 further comprising one or more D/A units to perform digital to analog (D/A) conversion on the output of the OFDM units to generate an analog baseband signal; and one or more radio frequency (RF) units to upconvert the baseband signal to radio frequency and transmit the signals using a corresponding one or more transmit antennas.

13. The system as in claim 8 wherein the MU-MAS precoding unit is implemented as a minimum mean square error (MMSE), a weighted MMSE, a zero-forcing (ZF) or a block diagonalization (BD) precoder.

14. The system as in claim 8 wherein the MU-MAS system is a DIDO system and wherein the MU-MAS configurator unit is a DIDO configurator unit to determine a subset of users and a DIDO transmission mode based on channel characterization data obtained through feedback from the wireless client devices and to responsively control the coding modulation units and mapping units.

15. The system as in claim 14 wherein the MU-MAS configurator unit is a DIDO configurator unit to determine a subset of users and a DIDO transmission mode based on channel characterization data estimated at the base station by processing training signals from the client devices and exploiting channel reciprocity.

* * * * *